Aug. 27, 1974   R. J. DROZDOWSKI ET AL   3,832,135
AUTOMATIC CLINICAL ANALYZER
Filed April 5, 1972                    37 Sheets-Sheet 21
FIG. 21a
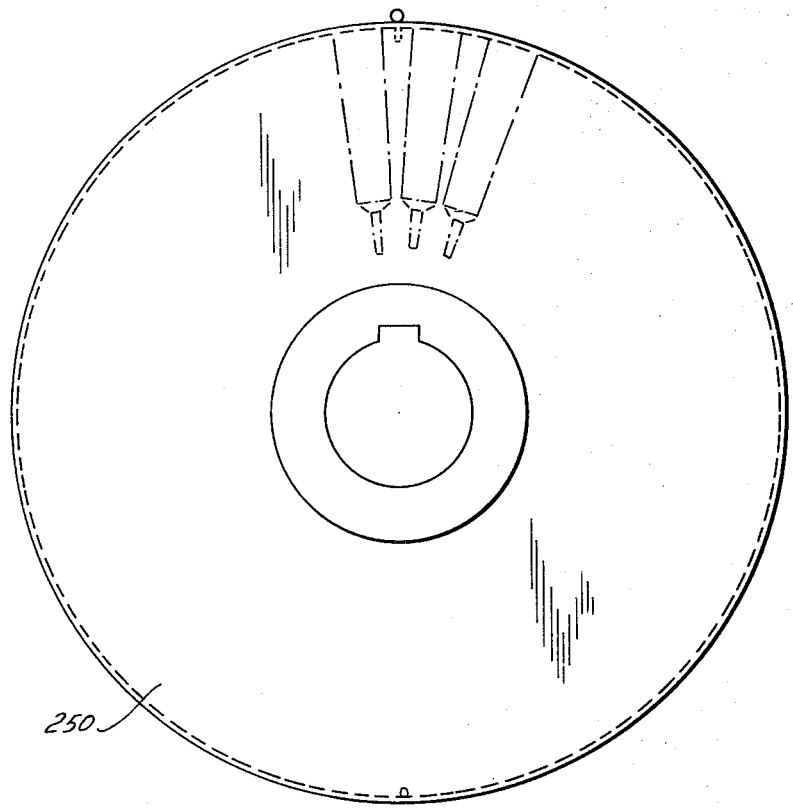
FIG. 21b
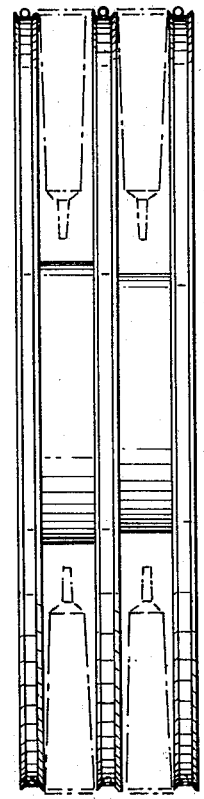
FIG. 21c
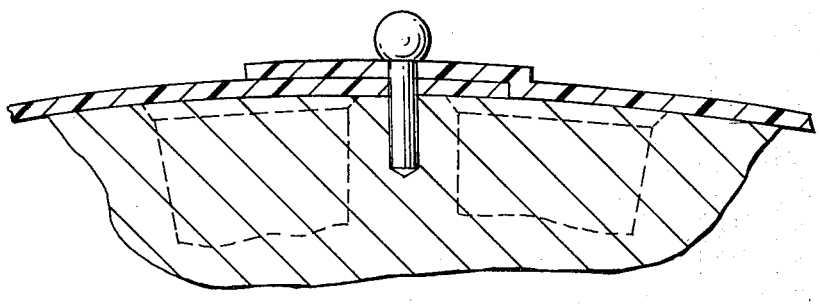
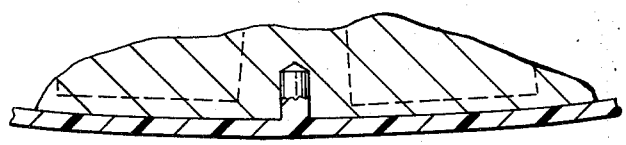
INVENTOR.
BY
ATTORNEYS

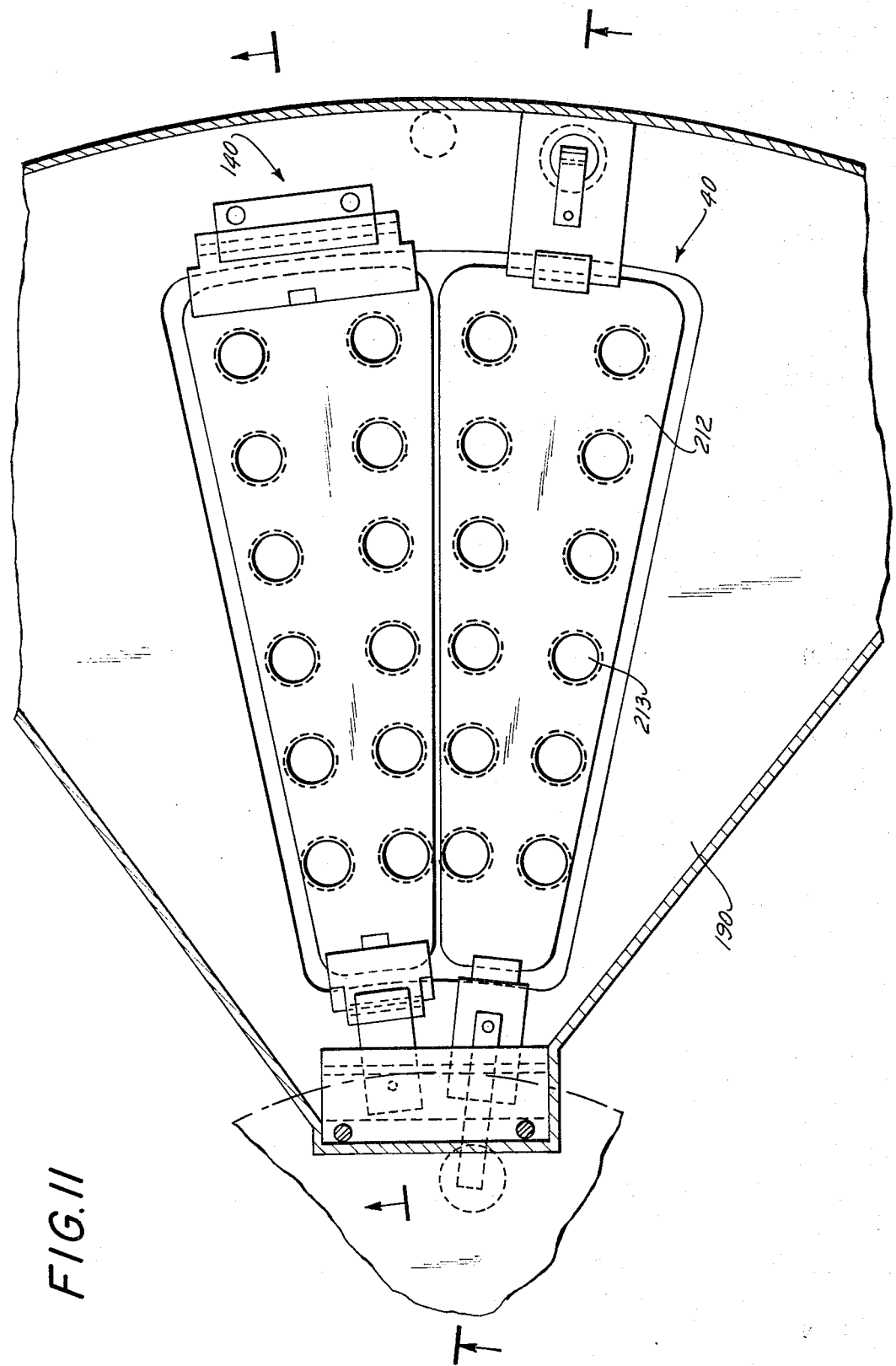

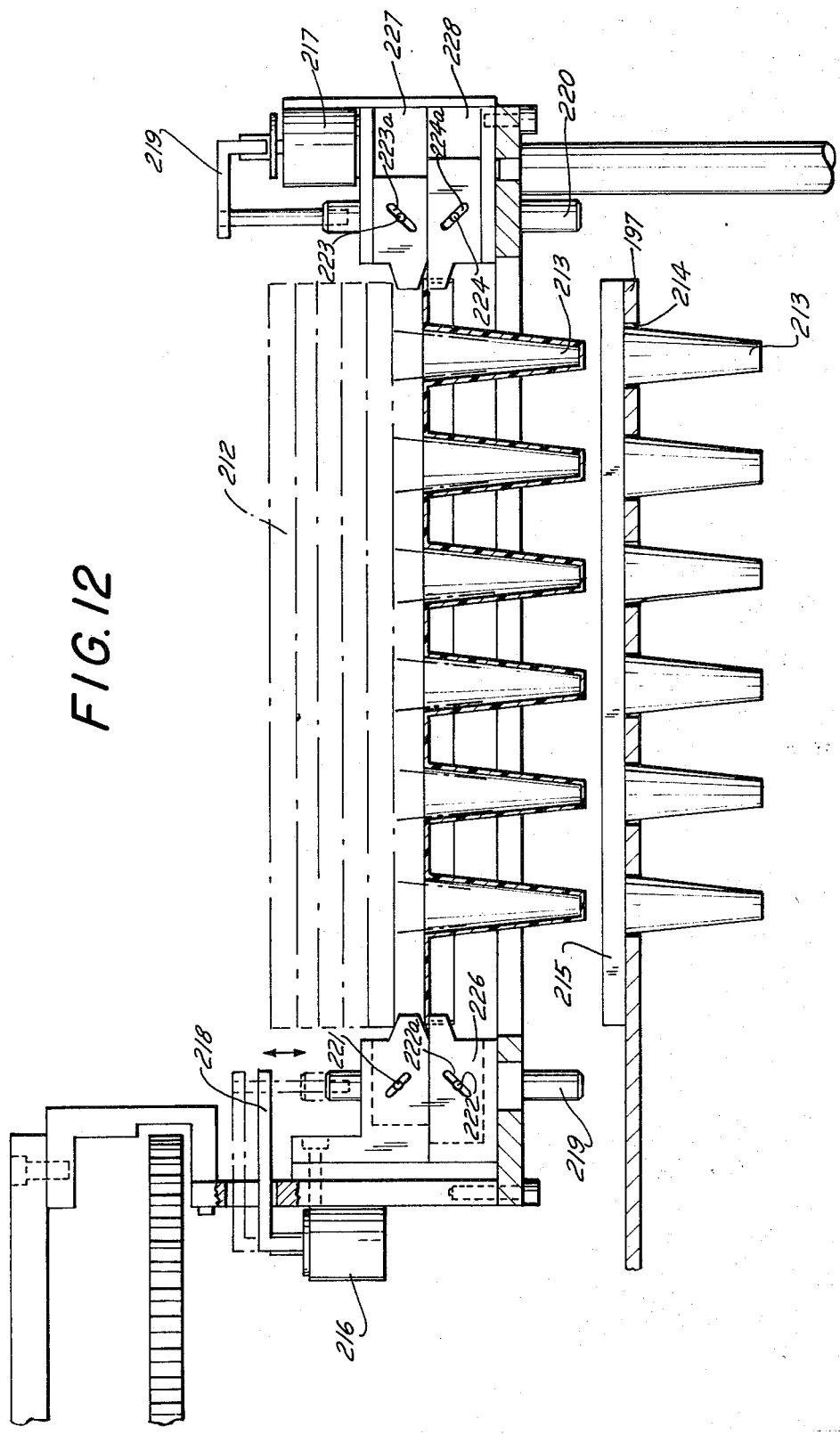

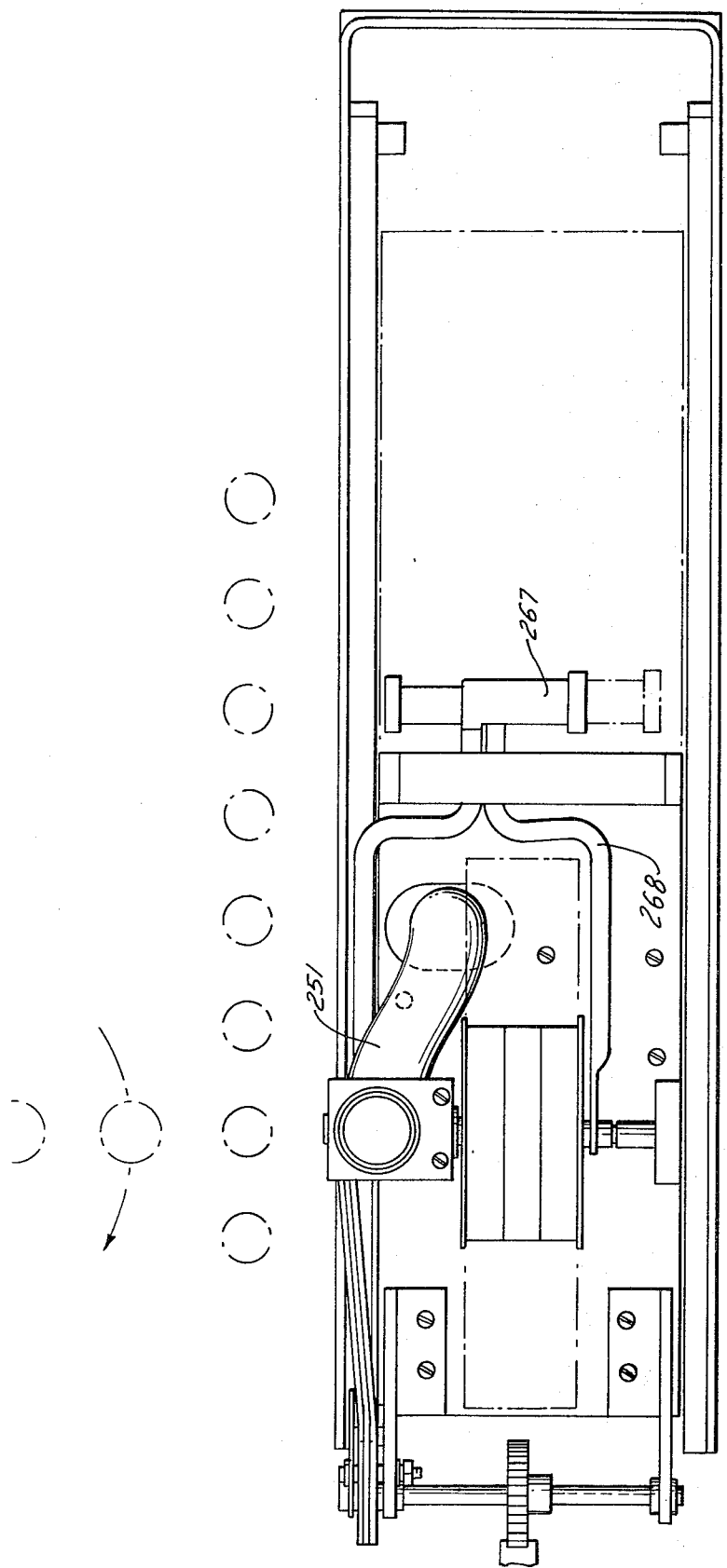

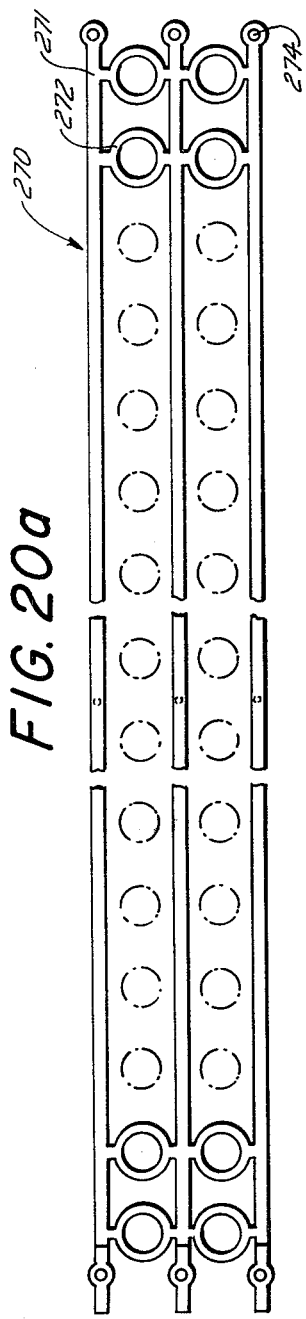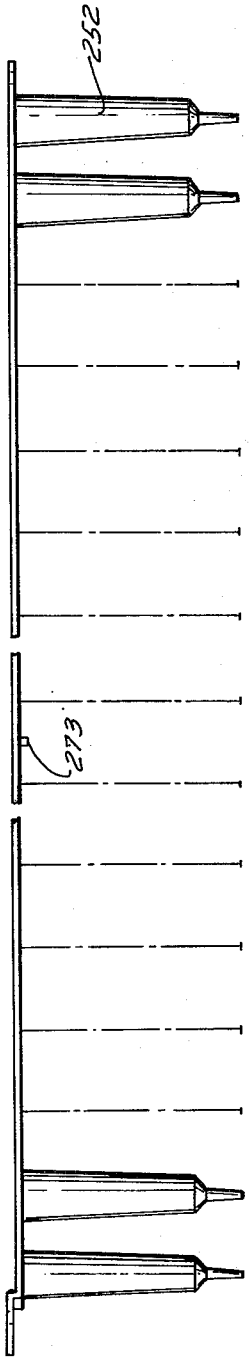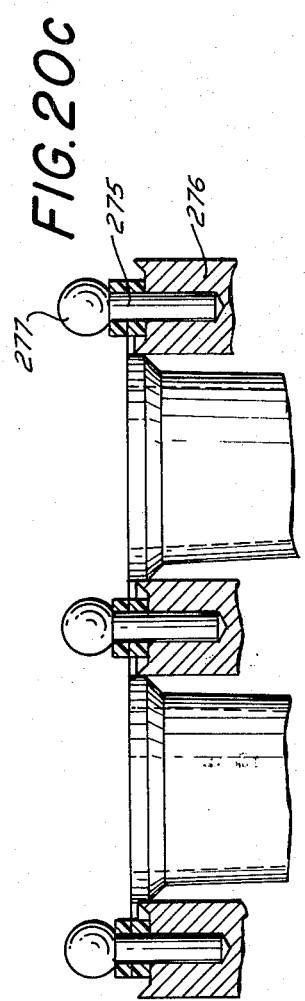

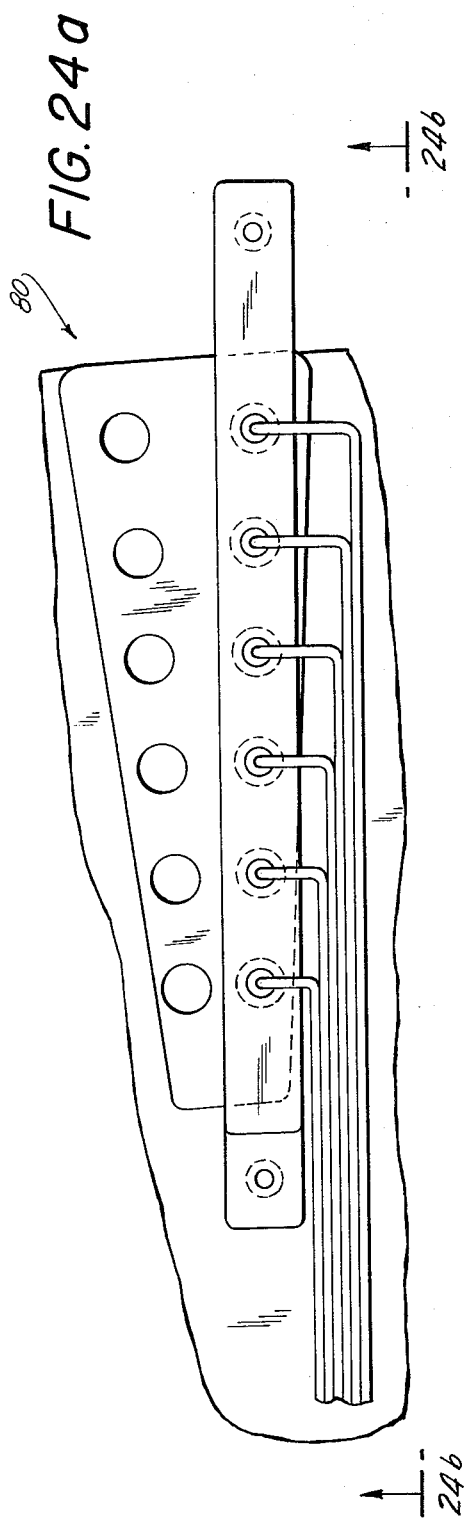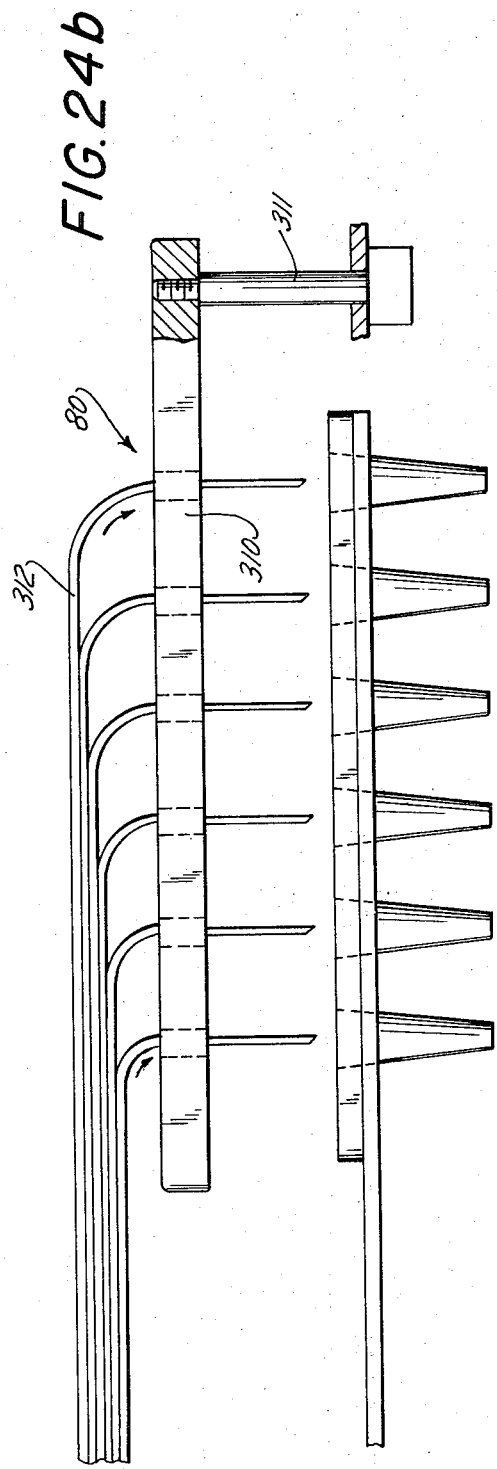

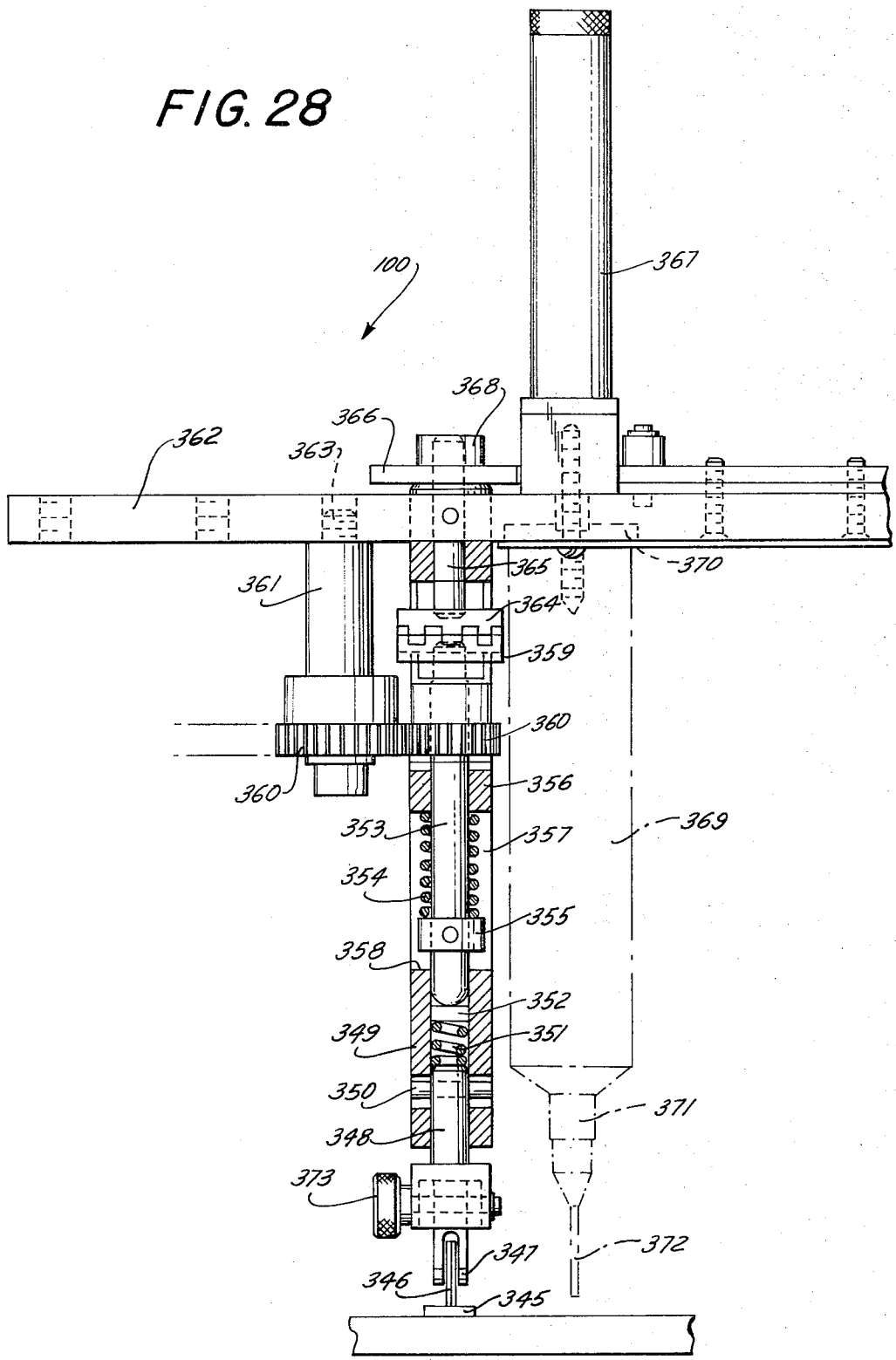

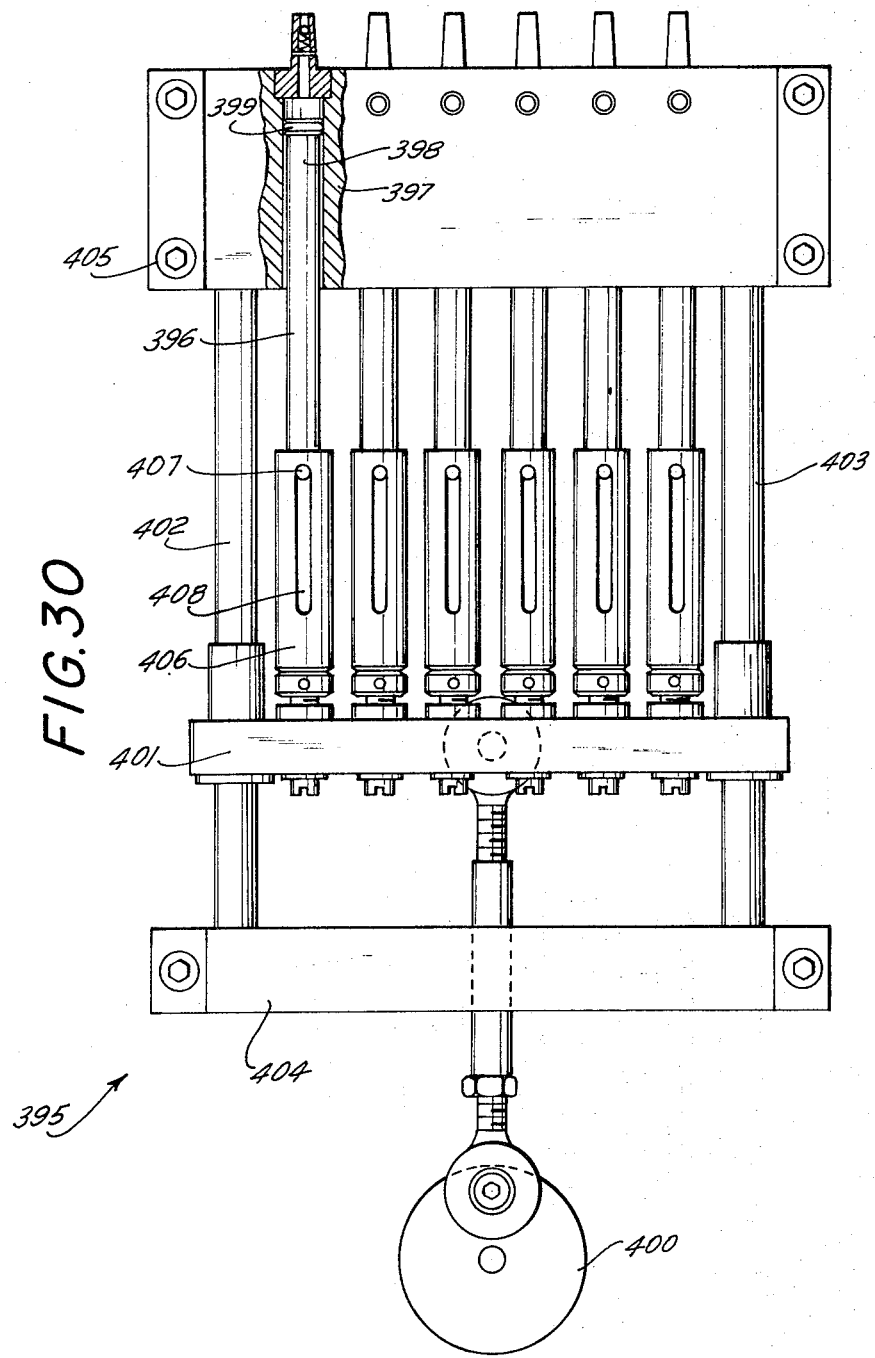

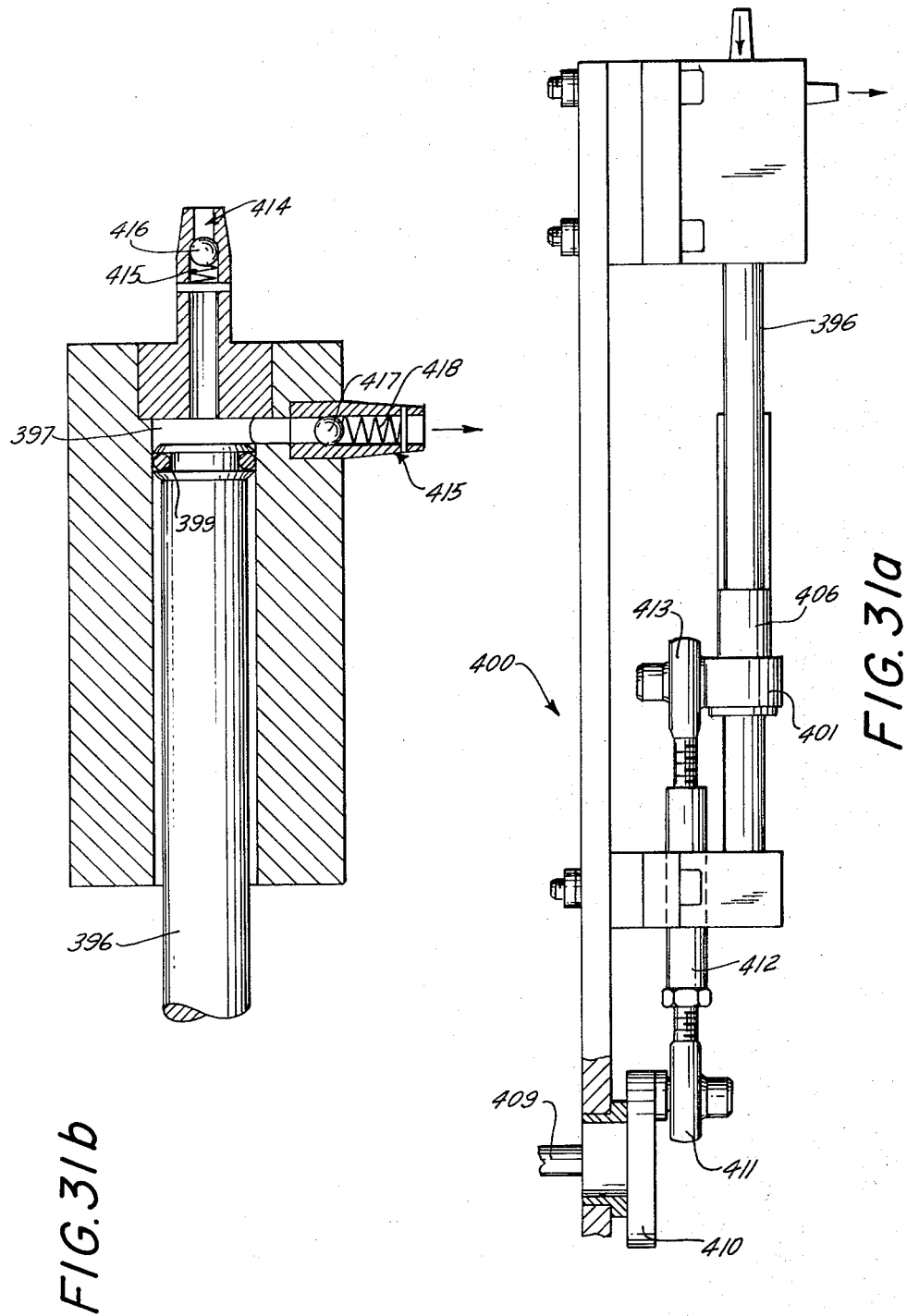

3,832,135
AUTOMATIC CLINICAL ANALYZER
Robert J. Drozdowski, Mount Arlington, Peter F. Connolly, Boonton, Italo M. Massaglia, Middletown, and John Rudolph Chlupsa, Paterson, N.J., assignors to Becton, Dickinson and Company, East Rutherford, N.J.
Filed Apr. 5, 1972, Ser. No. 241,113
Int. Cl. G01n 1/14, 1/18
U.S. Cl. 23—230 R            11 Claims

ABSTRACT OF THE DISCLOSURE

An automatic clinical analyzer for automatically transporting an identifiable sample of fluid to be tested to a distribution point where the sample is aliquoted to a series of reaction cups for conducting a series of desired tests on the sample and accumulating the results of the test for coordination of the test results with the identifiable sample.

BACKGROUND OF THE INVENTION

In the medical field, particularly in the area of blood analysis, it has been found to be extremely advantageous if the blood can automatically be tested thereby necessitating only a minimum amount of manual activity. The automation of fluid testing particularly in the field of blood analysis has become extremely desirable for various reasons. For instance, with the multiplicity of blood tests being carried out and the continued expanding condition of hospitals and clinical laboratories, it has been found that automation will save a great deal of time. This is particularly true where a great number of tests are to be conducted on an individual patient's blood and a large number of patients are to be tested daily.

There are many different types of semi-automatic and automated machinery available, however, all of the systems require a great deal of manual activity from actual collecting of the blood in the collection tube until the final test results are recorded. It should also be kept in mind that the more manual activity involved during the testing procedure, the greater the chance of error or confusion of patient samples. Naturally, this is extremely undesirable since incorrect diagnosis or other extremely deleterious effects could occur if patient samples are confused during the testing procedure.

In the sampling process the fluid from the patient must be handled and worked on in a variety of different ways in order to properly test the fluid in accordance with a number of common testing procedures. Naturally, with the multiplicity of handling steps involved it is extremely advantageous if human error could be held to a minimum. In this respect, the greater the handling by humans the greater the chance for confusion of samples during the testing procedures. Therefore, if a sample could be identified automatically and then handled automatically throughout the testing procedure until test results are obtained and then the test results coordinated automatically with the identified sample to assure that the results relate to the proper patient. In other words, the most desirable system would be one in which a fluid sample, such as blood, is introduced to the instrument and thereafter no human function is necessary until the test results, properly identified with the sample being tested, are presented by the machine for laboratory analysis. An analysis system of that type would minimize the danger of human error as well as providing other disadvantages not present when samples are handled and tested manually.

For example, another advantage is that there is no necessity for a laboratory technician to handle the sample during the testing and therefore there is little danger of contamination. Additionally, a completely automated system is desirable from the standpoint of speed and precision and for the simultaneous handling of a multiplicity of samples in an automated sequence. Naturally, the handling of a plurality of samples in automated sequence and would require a timed relationship between all phases of the automatic analyzer. By being able to test a large number of samples in rapid and sequential fashion without individual manual handling being necessary enables a testing facility to operate more effiicently and to handle a larger number of patient samples in a given time span. In today's crowded hospitals where fluid such as blood is sampled often for many different types of tests in order to accommodate the large volume of tests to be conducted, an automated system which will rapidly and efficiently handle a significantly larger number of samples in a given time span than manual testing procedures would be extremely desirable. Under present conditions it is also desirable to employ a substantially complete automated system in order to minimize the above discussed dangers of contamination during manual handling as well as minimizing the possibility of human error leading to sample confustion or mix-up.

Finally, it should also be kept in mind that in view of the concept of a complete automated system and one which handles a large number of samples in a relatively short time period to conduct a plurality of different tests it would be of course be advantageous to have a system whereby a large portion of the sample handling hardware be of a disposable nature so that it would be easy to replace a variety of different types of containers for handling the fluid sample during the testing operation in the analyzer as each particular sample is placed in the analyzer, tested and removed therefrom upon completion of the test. Naturally, with the disposable elements or containers being part of the analyzer itself, the most effective system would employ automation to provide and remove the containers for the samples as required. Once again, synchronization of these procedures should be part of the system along with the synchronization of the remainder of the analyzer system thereby providing one complete automated clinical analyzer for taking a fluid sample and handling it during a testing procedure while retaining identification of the same so that the test results may be automatically coordinated with the identified sample to provide an automatic read-out of the test results.

SUMMARY OF THE INVENTION

With the above discussion in mind, it is among the primary objectives of this invention to provide a completely automatic clinical analyzer whereby a fluid sample from a patient is automatically brought into association with the testing apparatus, the sample is retained in the identified sample container and placed in position for the testing process, the sample is distributed as desired for a number of tests into required position on the analyzer, the tests are conducted and the results are coordinated with the original sample identification so that the information is presented to the person or persons conducting the tests. The analyzer is completely automated so that no manual operations are necessary from the time the samples are positioned so that they may be brought into relationship with the analyzer until the actual data results are presented to the operator at completion of the tests with the results being coordinated with the original identified sample. The entire automatic clinical analyzer system is designed to operate in synchronous fashion so that a plurality of samples may be simultaneously and sequentially going through the various testing operations in the analyzer. In this manner, the analyzer automatically tests a plurality of samples in rapid sequence simultaneously with each sample being at a different stage sequentially in the testing procedure and which performs a plurality of different tests on each sample.

In particular, the automatic clinical analyzer as presented herein provides an automatic conveying means for bringing each individual sample in sequence into relationship to the testing part of the system so that the fluid held in each sample container or tube may be automatically removed therefrom for testing purposes.

Another objective of the invention is to provide an automatic tray dispenser as part of the system for automatically providing a disposable tray containing a predetermined number of reaction cups into position for association with a sample container to receive predetermined aliquots of the same in each reaction cup dependent upon the number of tests to be conducted.

An additional objective is to provide an automatic means on the analyzer for providing and attaching a disposable fluid container tip to an automatic pick-up head so that for each sample a new transfer and dispenser tip will be positioned on the pick-up head for transferring the fluid from the sample container in predetermined aliquots into prepositioned reaction cups. A further objective is to provide an automatic pickup head for aliquoting predetermined amounts of sample from the sample container into prepositioned reaction cups for the desired number of tests to be conducted on the sample.

A further objective is to provide an automatic ejection means on the analyzer for ejecting a disposable tip for containing fluid from the automatic pick-up head subsequent to transfer of aliquots of fluid from a sample container into the desired number of reaction cups.

Still a further objective of the invention is to provide automatic means on the anlyzer for dispensing and mixing diluent with the sample aliquot contained in each reaction cup prior to actual testing of the aliquots of sample.

A further objective of the invention is to provide automatic means as part of the analyzer system for identifying and storing information contained on the sample container from which aliquots of fluid have been removed for testing purposes in order to later retrieve the stored final test results obtained from the analyzer.

A further objective of the invention is to provide automatic means on the analyzer for dispensing and mixing the desired reagents with aliquots of sample fluid contained in a specific number of reaction cups for the purpose of conducting a multiplicity of tests simultaneously for a particular sample.

Another objective of the invention is to provide means on the analyzer for incubating the sample/fluid/reagent mixture contained in each reaction cup for a predetermined period of time at a predetermined temperature with the time and temperature being determined by the particular test to be conducted on the particular aliquot in a reaction cup.

Another objective of the invention is to provide automatic pump means for automatically removing a fully incubated mixture in a plurality of reaction cups in parallel for transmittal to a testing means. Additionally, automatic testing means are provided on the analyzer for receiving each incubated aliquot mixture and automatically providing test results.

The analyzer also provides automatic means for coordinating test results with stored identification information and visually presenting these coordinated test results for an identified fluid sample for viewing by an operator.

The analyzer of this system also provides an automatic ejection means for removing a disposable tray containing a predetermined number of reaction cups from the analyzer subsequent to removal of the fluid mixture contained therein to the testing means.

Finally, the automatic clinical analyzer of this system provides a timed drive means which sequentially coordinates each step in the testing process of a sample of fluid to be tested from introduction of the sample to the analyzer through testing and until test results have been obtained and are visually available to the operator. The automatic synchronized drive means permits control of the testing and incubation time as well as permitting a number of samples to be tested in order sequentially whereby a number of samples may be passing through the analyzer simultaneously with each sample being at a different stage in the testing procedure. Additionally, the analyzer provides a method for automatically handling and testing a fluid sample from initiation of a tube containing the sample to the analyzer through the actual testing procedure and until an automatic read-out is provided for visual observation of the test results coordinated with information identifying the sample which had previously been automatically stored until the testing procedure had been completed. The entire method of testing and apparatus which is utilized in conducting the tests, identifying the initial sample and coordinating the test results with the identified sample is entirely automatic so that no manual handling is required subsequent to placing the tube containing the sample into the automatic clinical analyzer.

Therefore, in summary, an automatic clinical analyzer is provided for automatically transporting an identifiable sample of fluid to be tested to a distribution point where the sample is aliquoted to a series of reaction locations for conducting a series of desired tests on the same sample and accumulating the results of the tests for coordinating the test results with the identifiable sample. Means are provided on the analyzer for conveying at least one identifiable sample tube to a pick-up station. Means are provided for conveying the tube from the pick-up station to an identification station. Means are provided for presenting a plurality of reaction cups adjacent to the pick-up station where transfer means are utilized to transfer predetermined aliquots of the sample into the reaction cups. Means are provided for dispensing diluent into the reaction cups and for mixing the diluent and the aliquots therein. Additional means are provided for dispensing a predetermined number of reagents into predetermined reaction cups and for mixing the reagents and the aliquots in the respective reaction cups. Retention means is provided for retaining the mixture of aliquots and reagents in the respective reaction cups for a predetermined incubation period. Identification and storage means are present on the analyzer for identifying the tube at the identification station and for storing the identification information. Pump means are present to remove the mixture from the reaction cups in parallel after the desired incubation time. Testing means are connected to the pick-up means to receive and test the mixture from the reaction cups. Read-out means are present and responsive to the test results from the testing means to cooperate with the storage means in coordinating the identified tube with the appropriate test results therefor and to transmit the resultant data for read-out. Finally, time drive means are present on the analyzer inter-connected with the conveying means, the reaction cup providing means, the sample dispensing tip means, the transferring means, the diluent dispensing and mixing means, the reagent dispensing and mixing means, the retaining means, the identifying and storage means, the pump means, the testing means, and the read-out means to provide synchronized interaction therebetween and thereby permit automatic handling and testing of an identifiable sample of fluid by the analyzer.

It should also be kept in mind that a method is provided herein for automatically transporting an identifiable sample of fluid to be tested to a distribution point where the sample is aliquoted to a series of reaction locations for conducting a series of desired tests on the same sample and accumulating the results of the test and coordinating the test results with the identifiable sample for automatic read-out.

With the above objectives in mind, reference is had to the attached drawings.

BRIEF DESCRIPTION OF THE DRAWINGS

In the drawings:

FIG. 11 is a fragmentary top plan view of the automatic clinical analyzer showing the tray dispensing and tray ejection portions thereof;

FIG. 12 is a fragmentary side elevation view of the automatic clinical analyzer showing the tray dispensing portion thereof;

FIG. 19 is a fragmentary top plan view of the tip dispensing portion of the automatic clinical analyzer;

FIGS. 20a–20c are fragmentary views of a strip of tips for use with the automatic clinical analyzer and the means for removing each individual tip for use with the analyzer;

FIGS. 21a–21c show the mechanism on the mechanism on the analyzer for retaining the strips of disposable tips in position for use and the manner in which the strips of tips are so positioned;

FIGS. 24a and 24b are fragmentary top plan and side elevation views respectively of the diluent dispensing portion of the automatic clinical analyzer;

FIG. 28 is a fragmentary partially sectional side elevation view of a reagent dispensing portion of the automatic clinical analyzer;

FIG. 30 is a fragmentary partially sectional top plan view of pump means on the automatic clinical analyzer;

FIGS. 31a and 31b respectively are a fragmentary plan view of a portion of the pump system and an exploded sectional fragmentary view thereof of the pump system used with the automatic clinical analyzer;

DESCRIPTION OF THE PREFERRED EMBODIMENT

General Description of the System

Figure 1:
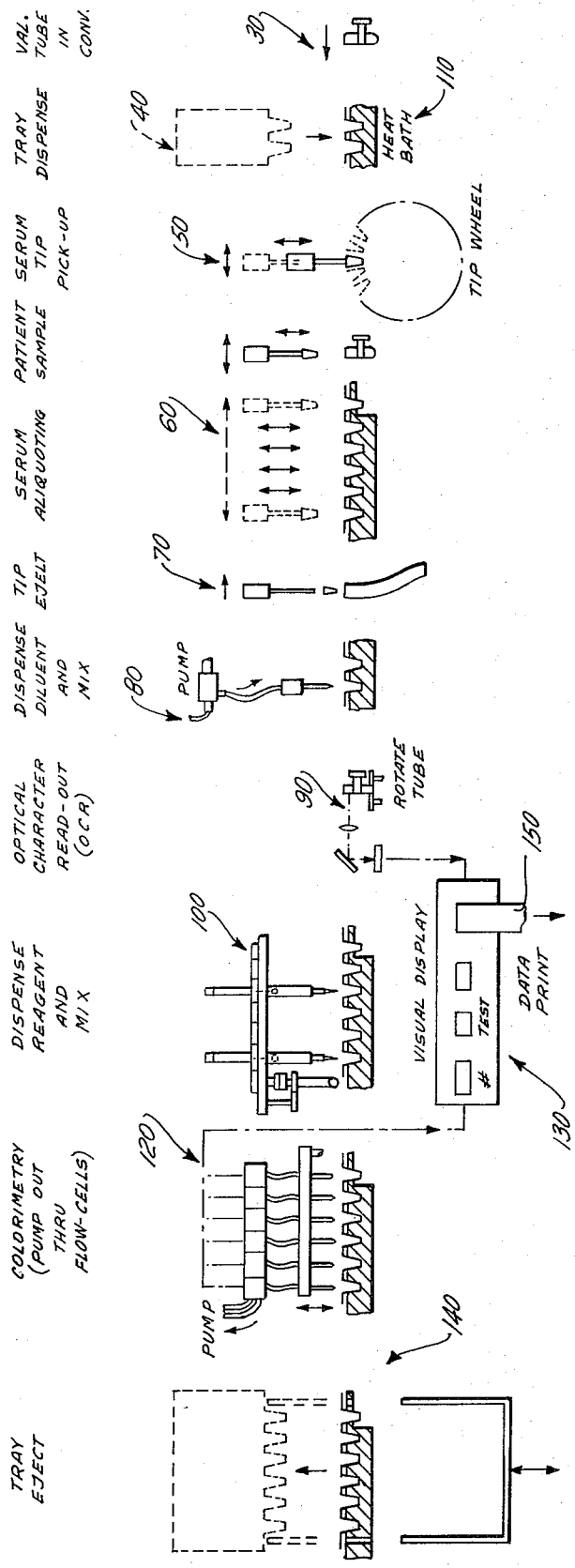
FIG. 1 is a linear sequential schematic showing the sequence of operations in the automatic clinical analyzer.

FIG. 1 shows a general schematic sequence of operations which take place during operation of the analytical chemistry system. In viewing the steps of FIG. 1, the operational sequence takes place from right to left as a particular sample of fluid is analyzed. Although the system is adaptable for use with many different types of fluid for analysis, for descriptive purposes in the embodiment shown, the fluid to be analyzed is blood serum or plasma. The blood serum or plasma is introduced to the system in test tube-like containers and is in blood serum form for presentation to the embodiment of the analyzer shown herein.

In considering the analyzer 20, each individual tube or container which holds the blood serum is properly indexed with respect to the remainder of the analyzer by means of conveying system 30. A tray dispensing mechanism 40 is present on the analyzer for dispensing a disposable tray having a predetermined number of depressions therein for forming a predetermined number of reaction cups. The tray described herein contains twelve reaction cups each designed to receive an aliquot of the sample of blood serum contained in a given tube or container.

A serum dispensing means is present on the analyzer 20 and utilizes a disposable tip for handling each individual sample in transferring it from the blood serum container into the reaction cups. Tip dispensing and providing means 50 is present so that the serum dispensing means 60 can pick up a dispensing tip and then transport the blood serum from the container into contact with each of the reaction cups and deposit an aliquot sample of the blood serum in a predetermined amount into each reaction cup in the disposable tray. Tip ejection means 70 are then provided to remove the disposable tip from the remainder of the serum dispensing means so that a new tip can be picked up for the next successive sample of blood serum brought into position for analysis by the conveying system. It should be kept in mind that the blood serum is only contacted by the disposable tip in transit so that no contamination of the remainder of the dispensing means occurs during aliquoting of blood serum into the reaction cups.

At the next station on the analyzer, diluent dispensing and mixing means are provided to position a predetermined amount diluent into each reaction cup and thereafter mix the combined diluent and reaction cups in preparing the predetermined number of aliquots contained in the reaction cups for the desired number of tests. As stated above, the diluent dispensing occurs at a later station on the analyzer. Additionally, the diluent can be supplied to the reaction cups prior to dispensing of the aliquots of serum in a similar manner. At the initial indexing station where the blood serum in its initial container is brought into proper relationship with respect to the serum dispenser, a number of operations occur at that particular station. The serum tip pick-up, the pick-up of the blood serum from its container, the aliquoting of the serum into the respective reaction cups and the tip eject all occur while the particular blood serum container is indexed at the blood pick-up station. Thereafter, the tray full of samples is indexed into position at the diluent dispenser and mixing station. At that point, the apparatus for dispensing the diluent and mixing it with the blood serum aliquots in the reaction cups is carried out as discussed above. In the embodiment shown, a measured quantity of distilled water or deionized water is simultaneously injected into each of the reaction cups in the tray to dilute the reaction mixture aliquoted therein.

As the tray of reaction cups is being indexed into position for receiving the sample aliquots and for receiving the desired reagent thereafter, the container which is still located on the conveyor system 30 and which has had the desired amount of blood serum removed therefrom for aliquoting into the reaction cups on the tray is transported by the conveyor system to an optical character read-out station. After optical character read-out (OCR) at the OCR station, apparatus is present to identify indicia on the outer surface of the container and for storing the identifying information for later coordination with test results on the blood serum previously taken therefrom at the termination of the testing cycle. In this manner, proper identification is possible between the test results and the original sample introduced into analyzer 20 for testing purposes.

After the tray of aliquot samples has been mixed with the diluent, the tray then continues in the timing sequence and is properly indexed for the addition of all the desired reagents positioned radially about the circumference of the reaction table. Analyzer 20 is designed so that the tray of reaction cups is transported in a circular direction by an indexed turntable-like arrangement. Rotation of the turntable is timed so that by positioning reagent dispensing and mixing means 100 at the desired position on the circumferential path of the circular apparatus, introduction of reagents for a desired test can be closely controlled from a time standpoint. In this manner, with a number of different reaction wells, a number of reagent dispensing apparatus can be positioned at desired points about the circumference of the reaction table in a radial manner so that they can be introduced at the necessary point of time with respect to a particular reaction well. Therefore, a number of different tests can be carried out on the same sample which has been aliquoted into a predetermined number of reaction cups in one circumferential trip about the reaction table. For example, with the apparatus as shown in the particular embodiment, one revolution of the reaction table is set for a 30-minute test period. Therefore if a particular test requires 15 minutes in incubation, the reagent is added at the 15-minute point which means that there are 15 minutes left before the testing apparatus is employed to remove the mixture from the reaction cups to read the results. The timing cycle can be revised as desired in a conventional manner. Heating coils are positioned beneath the reaction table to provide the necessary heat bath apparatus 110 for incubation of the reaction mixture present in each reaction cup.

When a cycle has been completed, the tray of aliquot sample mixtures which have been tested in the desired manner for the desired length of time is then brought into position at the removal station. When the tray is thus indexed, pumping and testing means 120 is introduced into all of the reaction wells simultaneously and each aliquot mixture is pumped out simultaneously and passed through a testing apparatus such as a colorimeter where the samples are tested and results obtained. This information is then transported to the data interpretation and storage computer system 130 where it is coordinated with the information previously obtained by means of the OCR system 90 so that a data print-out or written report 140 is visually displayed for the operator. Naturally the written report 140 would coordinate the identification information with the test results which is accomplished by means of computer system 130.

After the reaction cup mixtures have been passed through the flow cells of the colorimeter they then are pumped out to waste and disposed of. This may be done by connecting the system directly to a laboratory drain or alternatively, it would be possible to pump the mixtures into a large jug or container. The choice naturally would depend upon preference. After the reaction mixtures have been drawn up and measured to determine the test results, the empty tray continues around the index path of the circular table to a tray eject station. At that point, the tray eject means 140 is utilized to remove the tray from the analyzer and dispose of it after single use. Naturally, tray dispensing means 40 provides a new tray for each sample to be tested.

Figure 2:
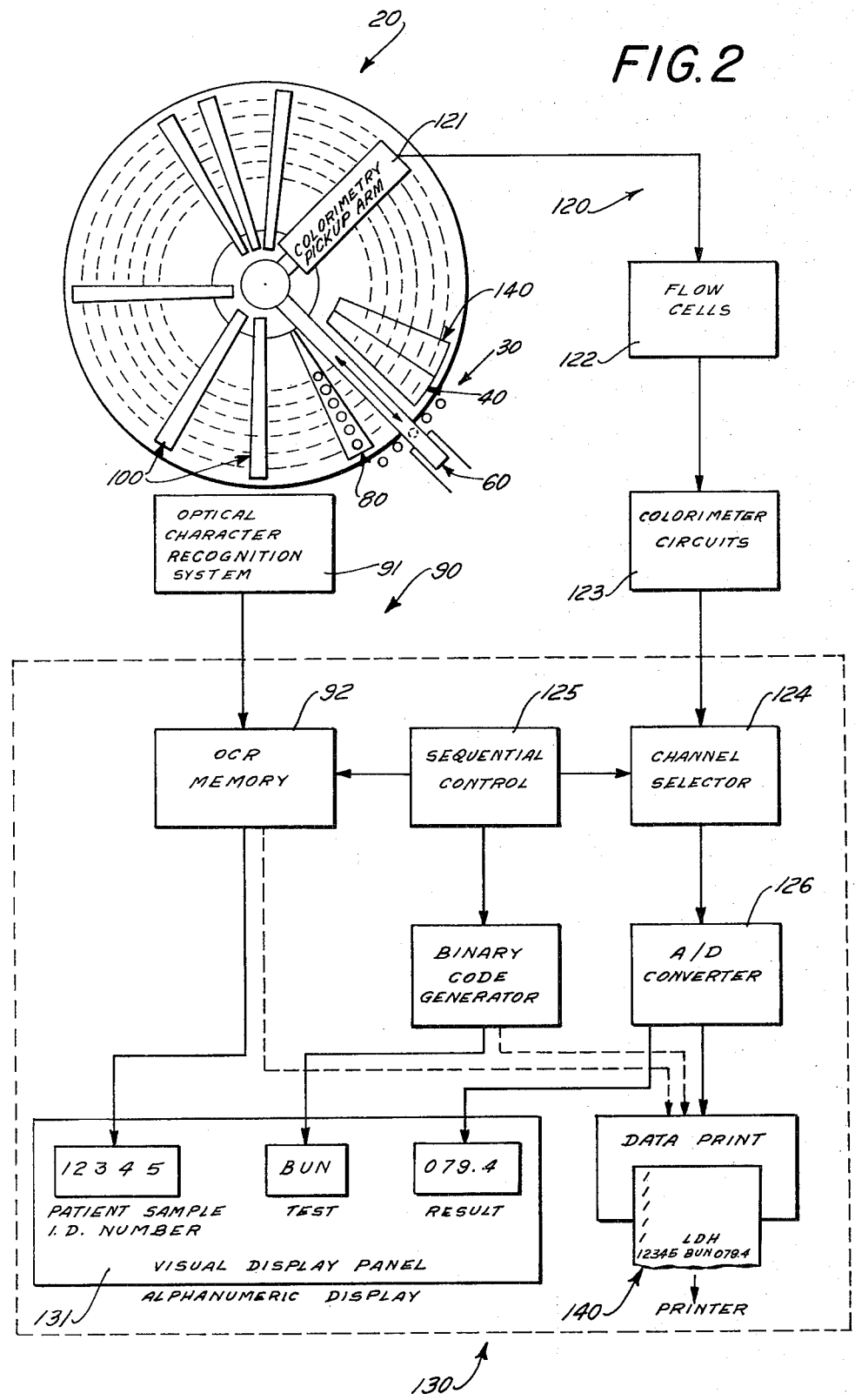
FIG. 2 is a block diagram showing the path of electronic signals in the automatic clinical analyzer.

FIG. 2 shows a combination block diagram and pictorial view of the reaction table portion of analyzer 20 with the block diagram showing the sequence of electronic signals as originated and transported by the OCR system 90 and the colorimetry testing system 120 and the coordination and storage of the respective samples as accomplished by the computer system 130 in order to arrive at the printed read-out 140.

As shown, the optical character recognition system 91 of the OCR apparatus 90 picks up the data from the exterior of the blood serum container and stores that information in the OCR memory bank 92. In respect to the colorimetry and testing apparatus, the reaction cup contents are withdrawn at the colorimetry pick-up area 121, transported through flow cells 122, and then transport it through colorimetry circuits 123 and into the programmer 130. There is one flow cell per test and one colorimetry circuit per test and it is left up to the channel selector 124 in program computer apparatus 130 to sequence them through for analog to digital conversion and to display the results sequentially at the read-out point. To achieve this result a sequence control 125 is employed to coordinate the OCR memory 92 with the information as disseminated by the channel selector. As noted, the information as disseminated from channel selector 124 is directed through analog to digital converter 126 and is thereafter displayed in printed form as part of data print-out 140 or in visual form on alpha-numeric display board 131. In any event the information received from converter 126 is coordinated with the information from the OCR memory bank 92.

Figure 3:
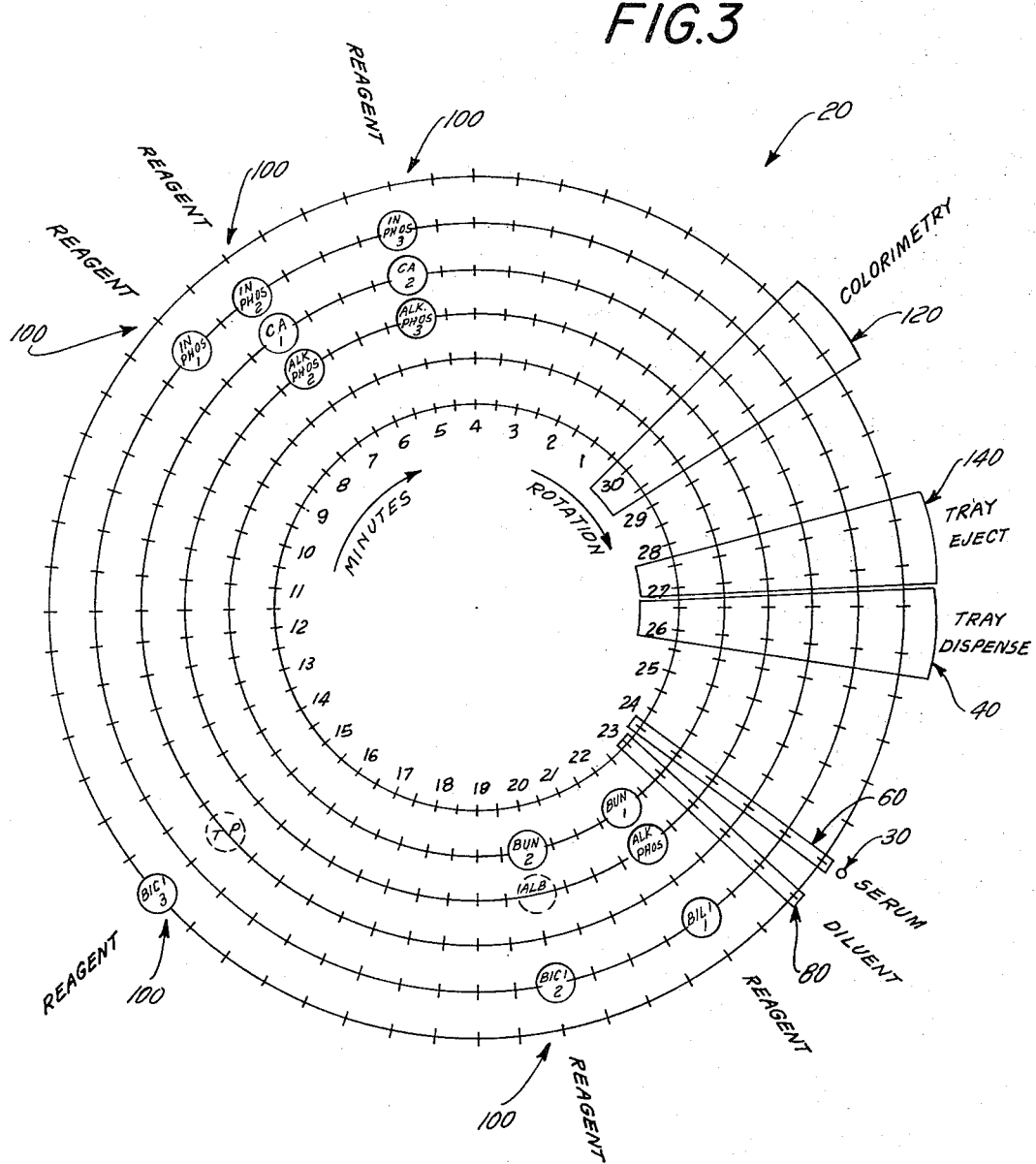
FIG. 3 is a schematic diagram showing the set up of the automatic clinical analyzer for six different chemical tests to be conducted on one fluid sample.

As previously stated, analyzer 20 is designed for use in performing a variety of different tests on a substance such as blood serum depending upon the user's choice. FIG. 3 of the drawing shows a schematic representation of a typical reagent layout for a six test profile. Depicted is the circular turntable-like arrangement of the analyzer of the conveyor system 30 shown being brought into alignment with the serum dispensing station where the serum pick-up and dispensing apparatus 50 is located. Also shown in relative positions are the diluent dispensing apparatus 80, the tray dispensing apparatus 40, the tray ejection apparatus 140 and the colorimetry apparatus 120. Additionally, the various reagents are positioned on the circumference of the circular turntable of analyzer 20 for conducting a six or twelve-test profile. It should be kept in mind that there are generally more than one reagent per test and they are added at various times on the time cycle depending upon required incubation. A set of coordinates is at the minute scale on the circumference of the turntable to indicate the time position in respect to the reaction cycle including the time remaining before you enter the testing station for colorimetry. In the embodiment shown, the typical test profile from serum introduction to the end takes roughly 23 to 23½ minutes. Therefore, the tray eject apparatus 140 and the tray dispensing apparatus can be placed outside that time cycle. This is possible as long as you don't change the 23½ minute cycle for the test arrangement as shown.

Figure 4:
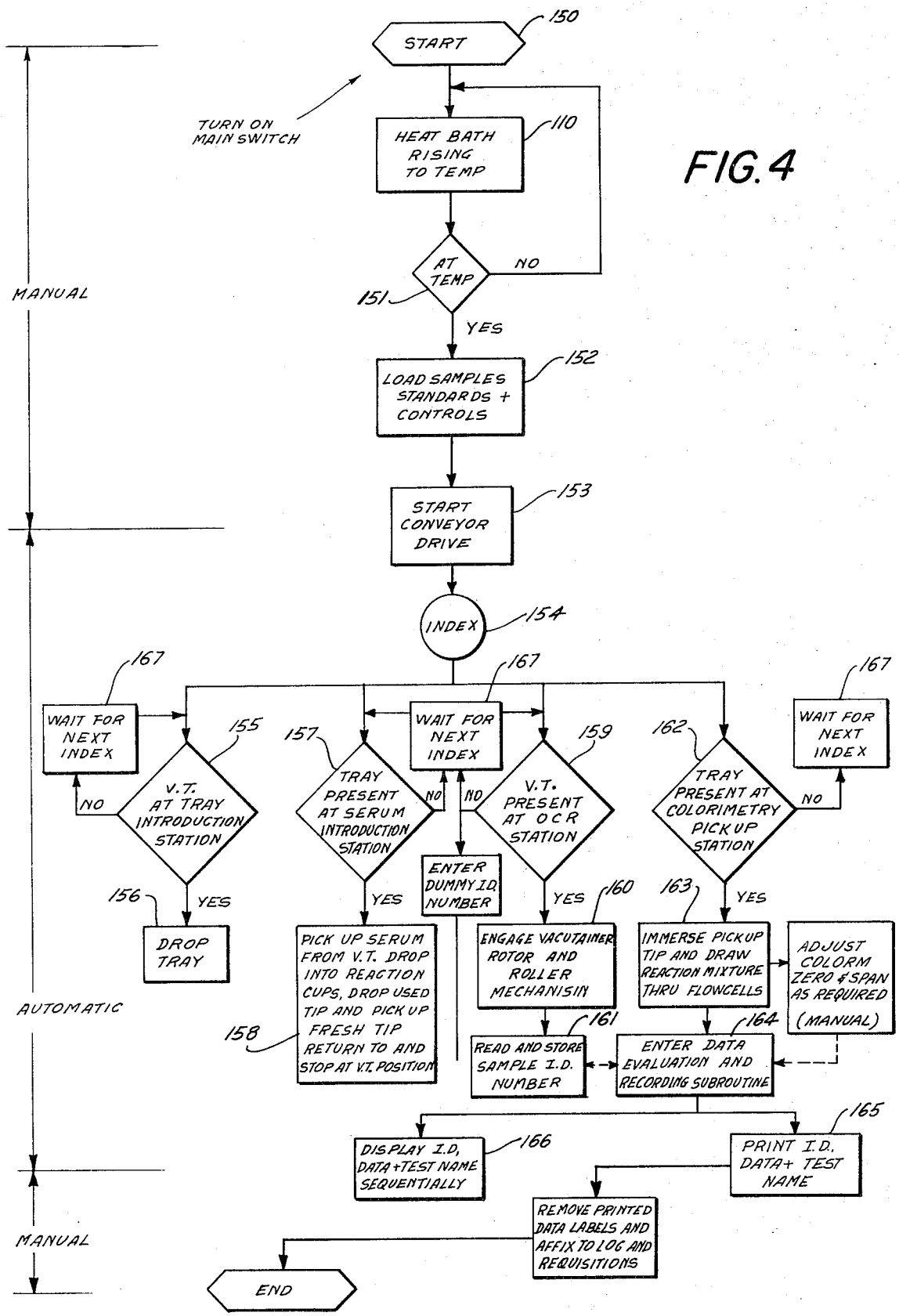
FIG. 4 is an operational block diagram of the automatic clinical analyzer.

With the above discussed index turntable in mind, reference is directed to FIG. 4 which is an operational diagram of the automated clinical analyzer 20. What is shown is the general sequential steps of operations of the analyzer starting from the initial manual functions through the automatic functions and finishing with whatever final manual steps are necessary. The operations as shown in the block diagram of FIG. 4 are indexed in accordance with the movement and operation of the analyzer 20. Looking at the diagram of FIG. 4 from top to bottom gives a general picture of the steps and sequence of steps in the entire analyzer process. As time progresses, the operation progresses further and further down FIG. 4.

Naturally, the first step in operation of analyzer 20 would be for an operator to manually turn on the main switch 150. This initiates the heating of heat bath 110 and the operator would let the heat bath come up to a predetermined temperature which could be monitored either with an automatic temperature controller-indicator or a thermometer or a similar device. When the proper temperatures of heat bath 110 are reached, the operator is prepared to begin testing with analyzer 20. When the proper temperatures are reached as indicated by block 151, the operator proceeds forward in operation. If it has not been reached when he checks the temperatures, as shown by the arrow, the process is held up and the heating bath is permitted to continue to rise until the proper temperatures are reached. Once the temperatures indicated at 151 are reached, the operator will proceed to load samples and intermittently while loading the samples check the analyzer to make sure that proper standards and control are maintained. This is indicated in sequence as box 152 in FIG. 4. The blood samples at the time of loading have previously been centrifuged and are ready to be analyzed by analyzer 20. The standards and controls utilized are those laboratory standards which are designed to calibrate the analyzer 20 and also to check the calibration during operation. An acceptable general sequence of operation will include controls and test samples in sequence. The operator puts in a standard and a control then maybe five or ten samples, then a standard and control container, five or ten more samples and then another standard and control container. In this manner, he will check occasionally to see if the colorimeters are still in calibration.

If all is in order and all the samples to be tested have been loaded properly, the operator can then throw the secondary switch for initiation of operation of the automatic conveyor as indicated by box 153 of FIG. 4. This actuates not only the conveyor but also enables the sequence of events for picking up serum and all other automated operations of analyzer 20. Naturally, the first step is for the machine to index initially and change position as referenced at box 154 of FIG. 4. This automatically causes four different things to happen simultaneously. A tray is introduced by the tray dispensing apparatus 40 at the tray introduction station as indicated by box 155 of FIG. 4. A tray is dropped as indicated by box 156 of FIG. 4 if a sample container is present in the appropriate position on the conveyor. If so, a tray is dropped onto the rotatable turntable of analyzer 20. Simultaneously as discussed in greater detail below, switches will sense if a tray is present and a sample container is present at the serum pick-up station and aliquoting station as indicated at 157. If both of those conditions are satisfied, the serum pick-up and dispensing apparatus 60 goes in operation. Apparatus 60 will pick up a tip with the assistance of serum tip dispenser means 50 automatically and will then automatically move over and down into the blood serum in the container. Thereafter it will draw into the tip the necessary sample quantity and automatically move into position for aliquoting into the reaction cups in the tray in a predetermined manner. Apparatus 60 will then return to the initial position adjacent to the tip pick-up apparatus 50. The tip which has just been used as stripped off as it is coming back by tip eject apparatus 70.

It should be kept in mind that both of these operations are occurring at the same time depending upon whether the correct condition exists, however, the minute you turn on the machine it wants to do all these things simultaneously. So, as indicated in FIG. 4, a tray has been detected at the serum introduction station and a complete cycle of serum dispensing has occurred as indicated at 158. Simultaneously with that, another switch at the OCR gate as indicated at 159 of FIG. 4 detects whether a sample container is at the reading gate. If so, it will engage the rotator in a roller mechanism as indicated at 160 in FIG. 4 and will read and store that sample ID number as indicated at 161 in FIG. 4. If not, it waits for the next indexing position. Similarly, simultaneous with that particular sequence, another microswitch will sense whether a tray is positioned at the colorimetry pick-up station of the rotary portion of analyzer 20. This step is indicated at 162 in FIG. 4. If so, the pick-up tips of testing apparatus 120 will be plunged down simultaneously so that each of six or twelve reaction mixtures will be simultaneously drawn into the colorimeter flow cell. This step is indicated at 163 in FIG. 4. Thereafter, the readings are made and the analog to digital conversion is performed and the results processed by the programmer to be printed out and displayed. These two steps are indicated at 164, 165 and 166 of FIG. 4.

At some point in the test program on anlyzer 20 during a given period of time, all of the above discussed operations will be happening at the same time. This occurs if you keep putting new samples in until eventually you have the initial samples at the testing point. With the embodiment shown, it takes about 23 minutes before this condition is reached, however, every 30 seconds in between each one of these automatic functions has been trying to occur. The Vacutainer rotator mechanism is about four or five index positions past the serum station so that the sample of serum has already been introduced into the reaction trays before the identification data collected by the OCR system has been stored for later coordination. Naturally, as indicated by the arrows, if the condition necessary for the sequential progressive movement of each individual step is not present, the successive functions will not occur and the system will wait for the next index to see if the proper conditions are present. This is demonstrated by box 167 of FIG. 4.

From the above description it is readily apparent that the overall main control system is simple in operation. There are only two controls for the whole machine. The main switch does two things, it starts the heating vat or bath and additionally it provides a series switch for the conveyor drive. In other words, if the conveyor switch is on everything would go on.

Figure 5:
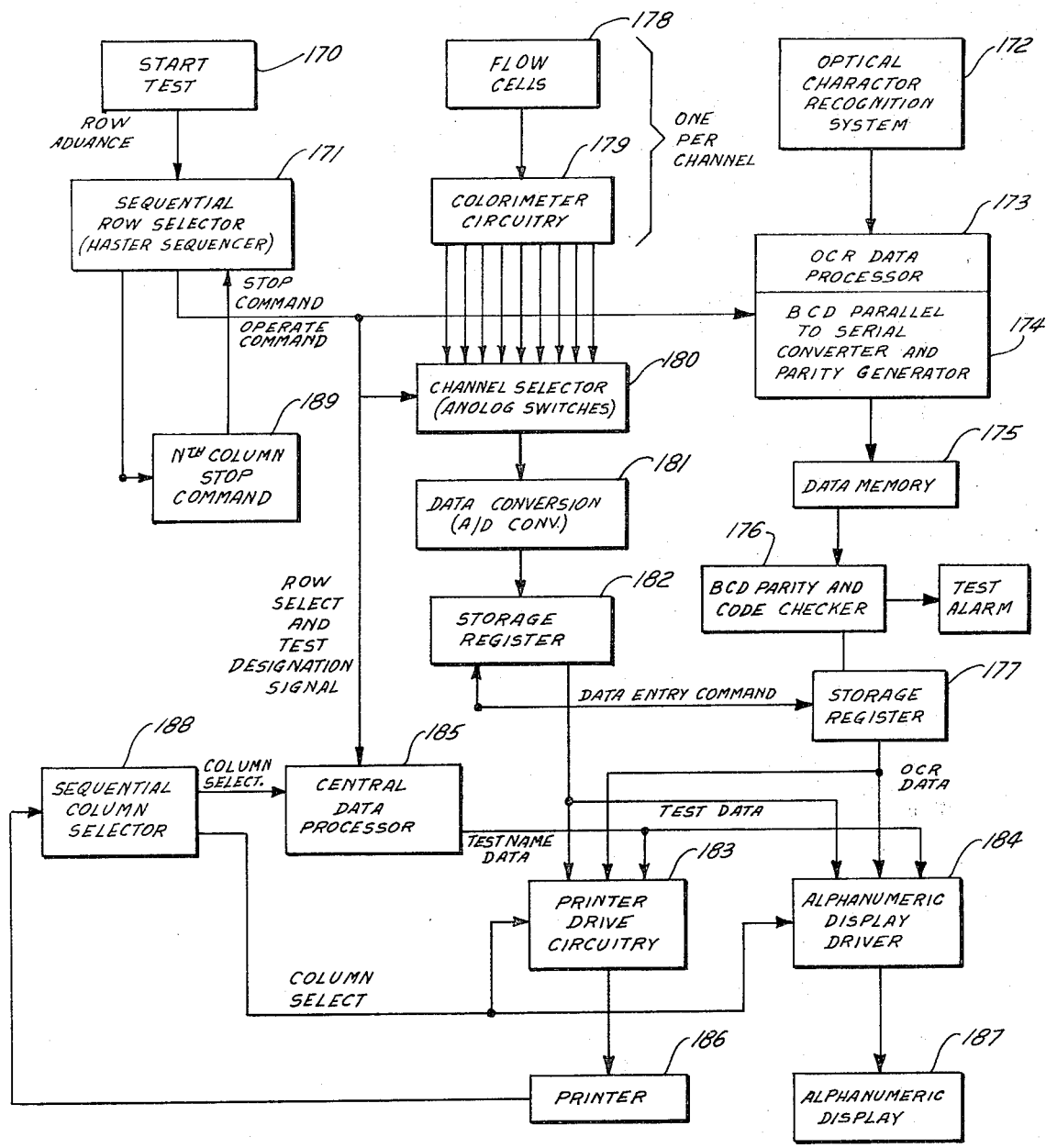
FIG. 5 is a block diagram of the programmer and central data process portion of the automatic clinical analyzer.

Turning to the final overall system figure which is FIG. 5 of the drawings, what is shown is a basic block diagram for the overall programmer, the colorimetry and the OCR system for the analyzer 20. Two major subsystems are tied in together. One is the colorimetry which will be described in detail at a later point in the disclosure and the other is the optical character recognition (OCR) system. The programmer is designed to provide a three dimensional storage system for storing three pieces of data. These three pieces of data are the values from the colorimetry circuit which includes one test value per channel in a twelve channel machine. This provides twelve pieces of test data. Another storage position is provided for the patient's identification that comes from the OCR system and a third storage area is provided for the test names. This would include the name of the test whether it be a test for cholesterol or glucose or whatever other commonly known blood test is utilized. That information is self-generated by the programmer in the central data processor. It is also contemplated that should it be desirable a number of switches may be provided to change the test names and to operate on the central data processing. However, in the presently shown embodiment the apparatus would be set up for particular test names.

Turning to FIG. 5, basically what happens in the programmer at the start of a test is that a signal is received at the start test station 170 that the tray is at the colorimetry station. When the colorimeter pick-up arm is in the tray, the signal actuates the programmer as indicated at 171 in FIG. 5 and the correct sample ID number is available at that time. The OCR system 172 provides the sample ID number for the OCR data processor 173. At that point the sample ID number is taken and shifted into the converter and parity generator 174. The data processor has been shifted from parallel information to serial and it is now in data memory as indicated at 175. In the data memory the ID number has another check performed on it to see that it is a valid number. For this function a code and a parity check bit 176 is provided. From that point, the information goes into the actual ID storage register 177. Storage register 177 retains positive identification with each sample being represented by a separate sample ID number.

Flow cells 178 provide the test data to the colorimetry circuitry 179. The colorimetry circuitry then transports this analog information to the channel selector 180 in the form of one analog line of information per test determination. Selector switch 180 selects each line of information and passes it to an analog to digital converter 181. Thereafter from converter 181 the information is passed into a temporary storage register 182. When the actual counter and central data procesor commands the release of this data, it will also command the release of the test name and the OCR data.

There are three words of data which are then released to the printer drive circuitry 183 and the display circuitry 184. The sequence in which it occurs is governed by the central processor 185 and the counter which is identified as the master sequencer and row selector 171. In use, this embodiment envisions a series of counters that searches through the memory in all three storage areas and commands the appropriate data at the correct time and the correct order. The data displayed is the patient ID number and is printed out as the first word of data, however, the sequencer must discriminate between the printer data 186 and the display 187 circuitry data. It is desirable to have the patient number or the sample number displayed at all times at display 187. At printer 186, it is only printed once at that location, thereafter the test name and the test results are printed. Then the next test name and the appropriate data is displayed and this process is continued until all of the test data for a particular sample has been printed out at 186. We have used the OCR number only once at printer 186. However, in order to assure that we are properly identifying the samples at all times, the alpha numeric display 187 must retain the OCR number while the remaining data is being printed out by the printer circuitry 186. For print out purposes a sequential column selector 188 is provided to disseminate the proper information in connection with printer 186. A common type of an *n*th column stop command 189 is employed in connection with the master sequencer 171 in order to coordinate the programmer in regard to the information being simulated, stored and recorded.

Figure 6:
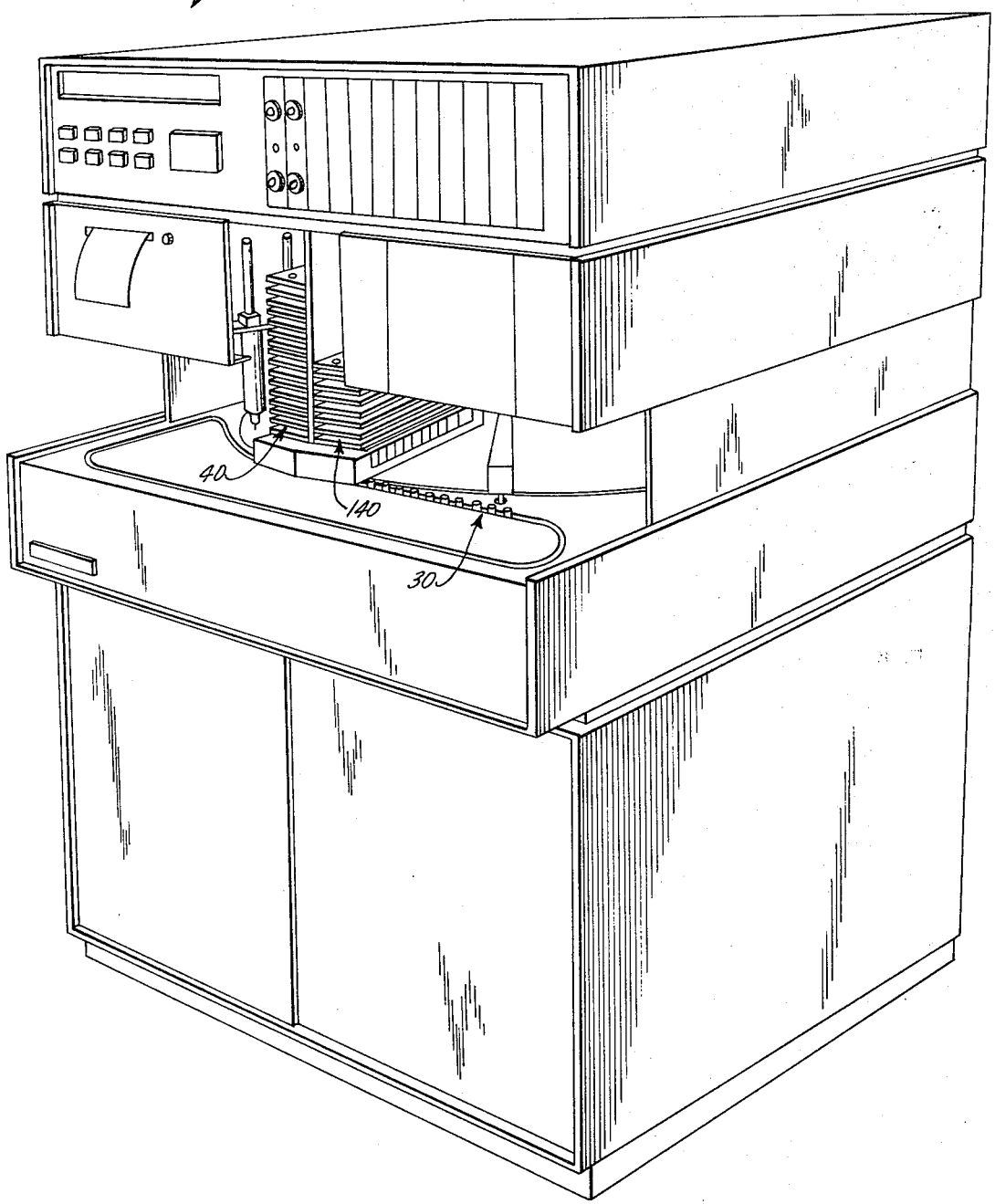
FIG. 6 is a perspective view of the automatic clinical analyzer.
Figure 7:
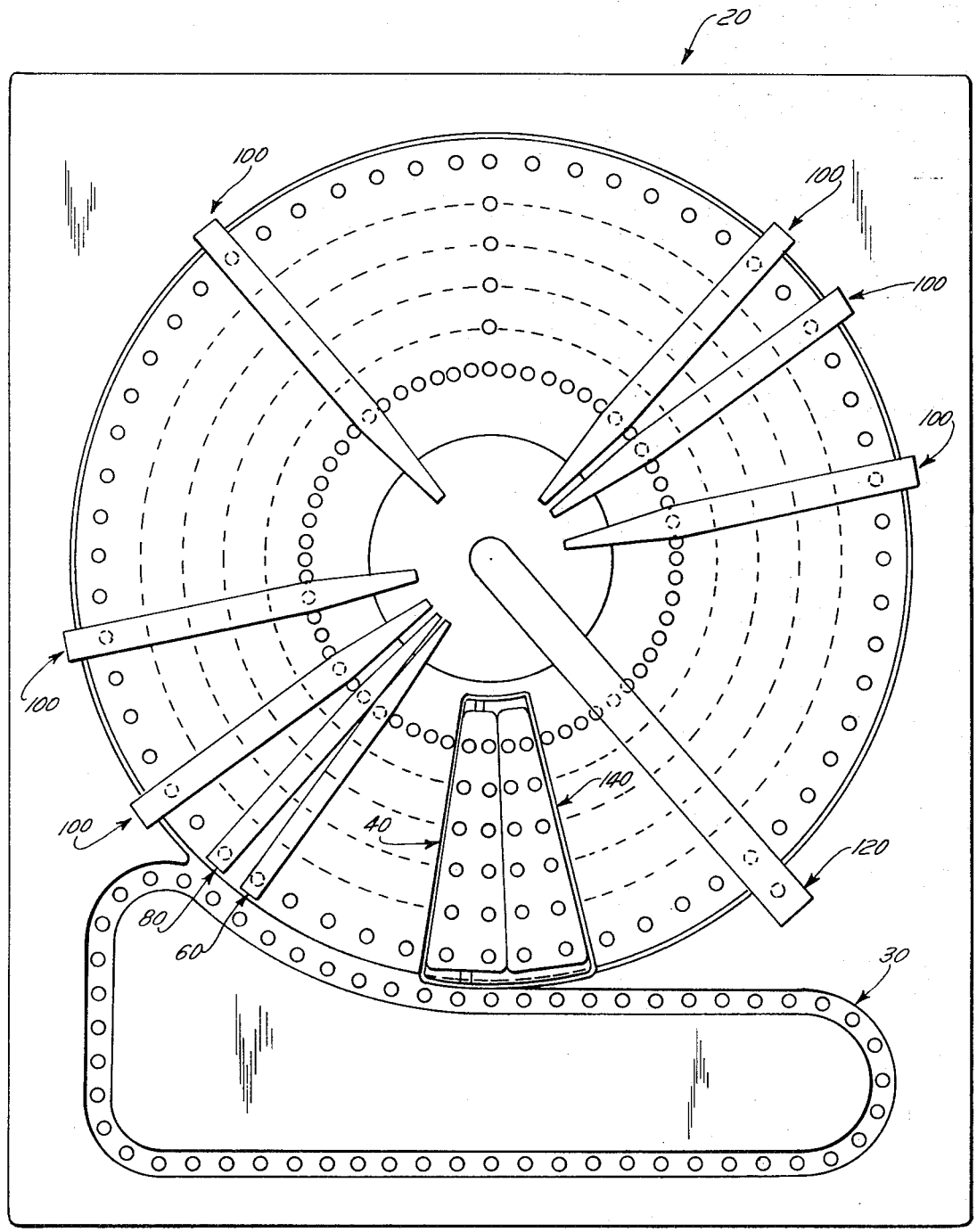
FIG. 7 is a top plan view thereof.

With the general summary of operational sequences involved in analyzer 20, reference is directed to FIG. 6 which shows the external housing for the complete analyzer 20 which is readily adaptable for use in testing blood serum. Similarly, FIG. 7 shows a top view of the apparatus showing the interconnection between various components of the overall analyzer.

Drive Means

Figure 8:
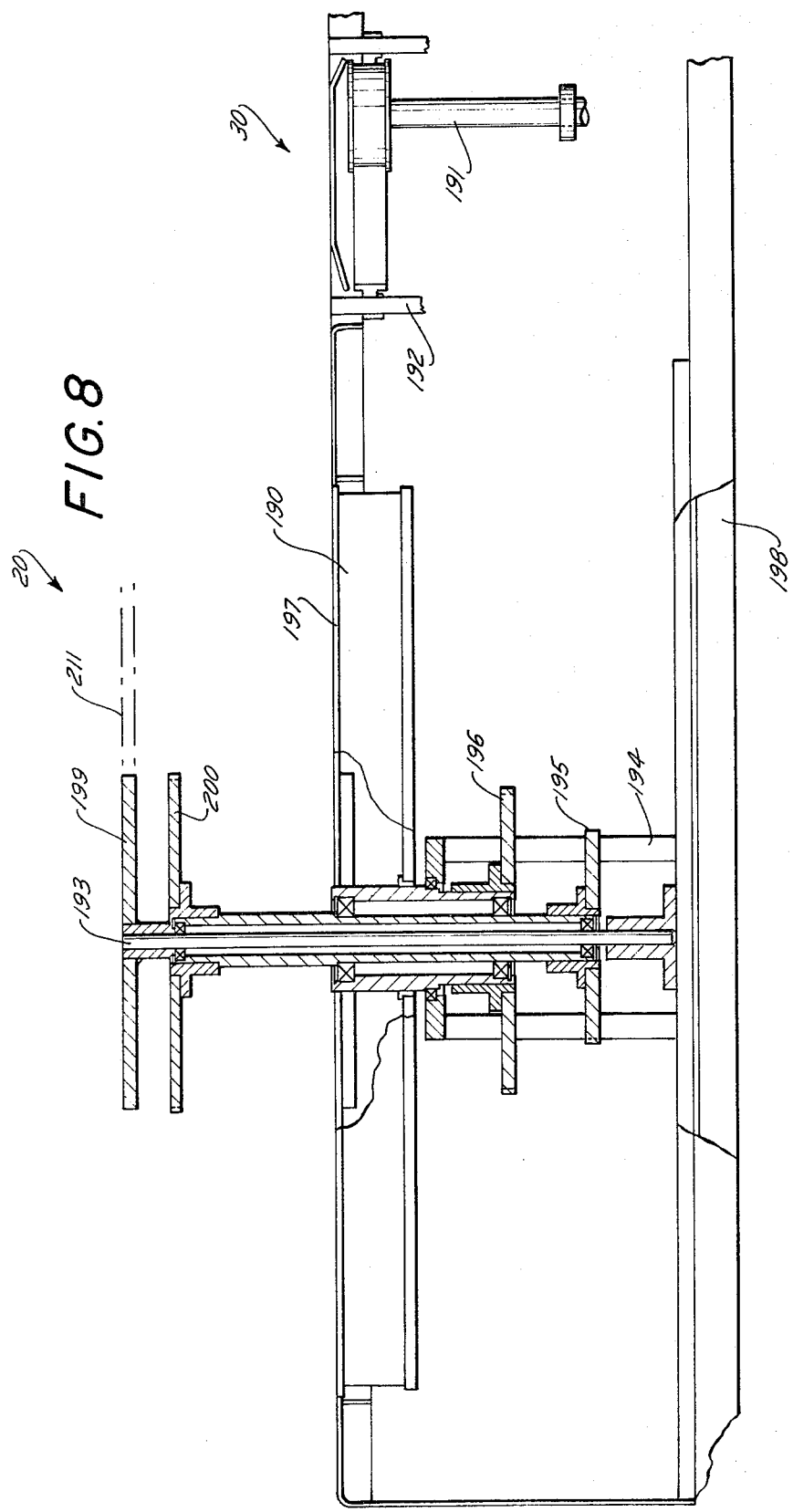
FIG. 8 is a partially sectional side elevation view thereof showing a portion of the drive means of the analyzer.
Figure 9:
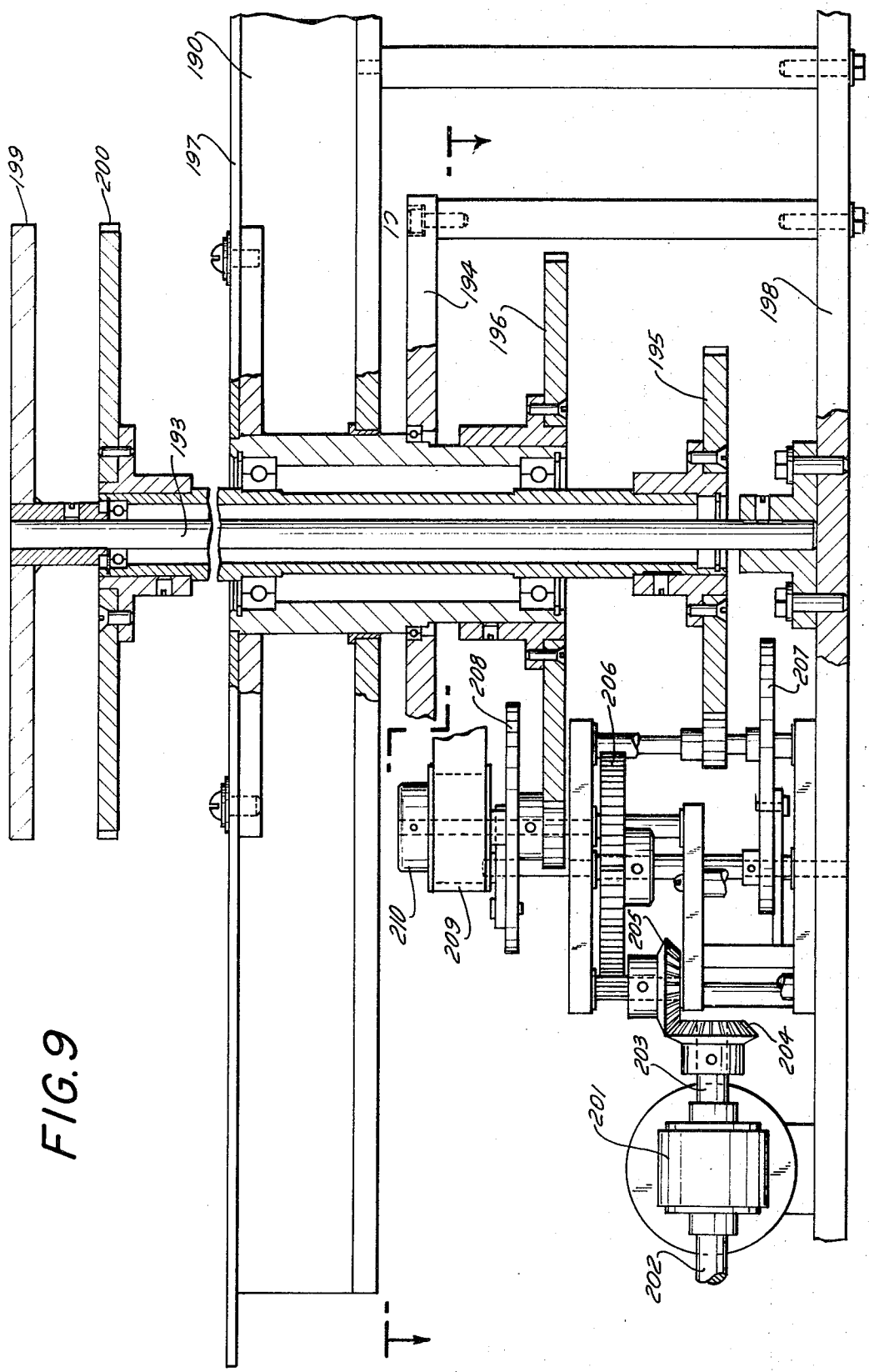
FIG. 9 is a fragmentary partially sectional side elevation view thereof showing the main drive means of the analyzer.
Figure 10:
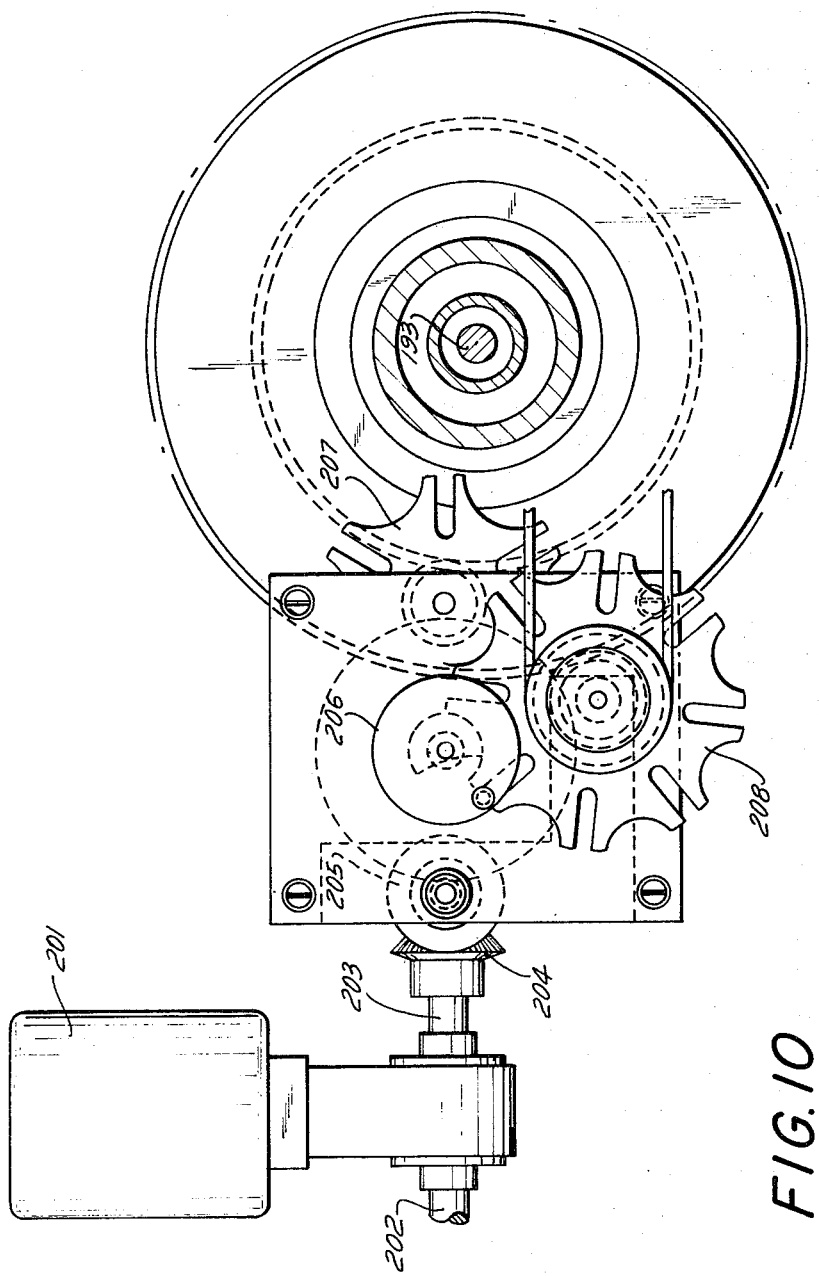
FIG. 10 is a top plan view of a portion of the drive means showing the geneva gear portion thereof.
Figure 13B:
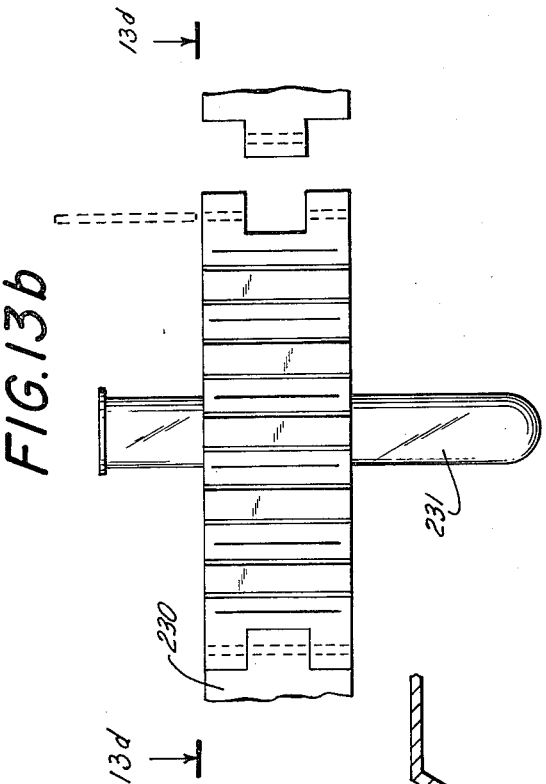
FIGS. 13a–13d are fragmentary side elevation views of a portion of the conveyor system of the automatic clinical analyzer showing the sample tubes in position.
Figure 13D:
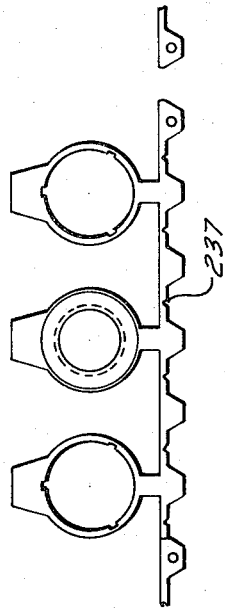
Figure 13A:
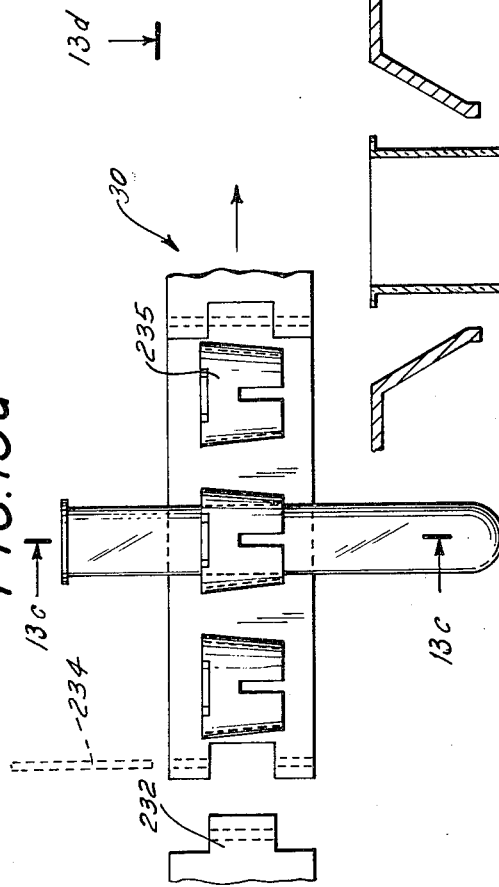
Figure 13C:
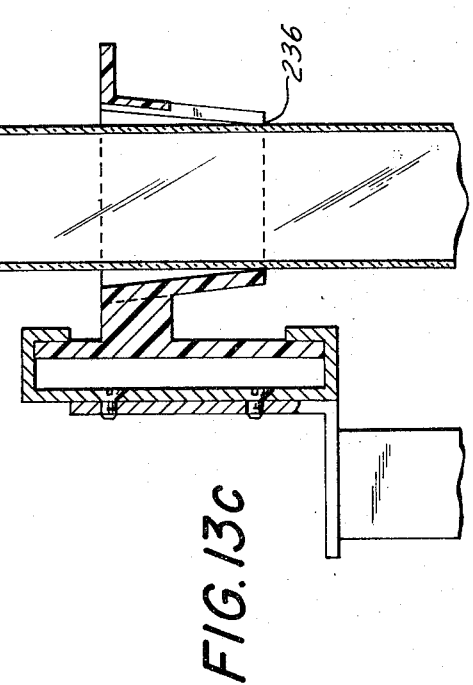

FIGS. 8–10 are directed to the overall mechanical drive mechanism for driving the analyzer in a timed sequence so that it indexes at predetermined timed intervals.

As shown in FIG. 8, turntable 190 upon which samples are mounted during the testing process in analyzer 20 is shown in position adjacent to conveyor means 30. Conveying apparatus 30 is driven by a timing pulley 191 which is connected in its lower end to a convenient conveyor drive means. A sample tube 192 as carried by a portion of the conveyor is shown in position for transferring blood serum to reaction cups positioned on the turntable 190. The drive means which drives all of the system including the conveyor is centered around a central stationary shaft 193 which is rigidly mounted to the base of the housing of analyzer 20. A stationary mounting plate 194 is fixed to the housing about stationary shaft 193 so as to assist in retaining and properly positioning the moving parts of the system. Journaled about stationary shaft 193 adjacent to the base of the analyzer is the reagent drive gear 195 which is a rotatable Geneva-type gear. Positioned above Geneva gear 195 and journaled about the gear housing is indexing gear 196 for indexing the platen which carries the reagent cups holding the aliquot sample during the testing process. As previously discussed, the speed of rotation and at which this drive gear 196 moves with respect to the system so that the top platen 197 containing the reagent cups indexes accordingly is predetermined depending upon the time sequence of the whole system. The stationary housing 198 of analyzer 20 retains all of the discussed moving and stationary parts in position with respect to one another. Above top platen 197 and fixed in position to the top portion of stationary shaft 193 is a stationary stop plate 199. Plate 199 is present to permit the reagent arms to be mounted in stationary position thereon to extend therefrom over the turntable in proper location with respect to the test being conducted. Immediately below stationary plate 199 is rotatable indexing plate 200 which is indexed so as to be coordinated with the reagent drive Geneva gear 195 to facilitate operation of dispensing of the proper reagents at the proper time in the testing sequence. As shown, rotatable plate 200 is journaled so as to be rotatable about stationary shaft 193.

FIG. 9 depicts how the above discussed vertical drive arrangements are connected to the motor which drives the moving portions of analyzer 20 including conveyor system 30. A drive motor 201 is employed for the driving purposes. One side 202 of the drive shaft is connected to the pumps employed in the system as will be discussed in detail below to pump fluid into and out of position with respect to the turntable. The other side 203 of the drive motor shaft is connected by means of double gears 204 and 205 so as to change direction of the driving force to a horizontal drive gear 206. Thereafter the driving force from drive gear 206 is transferred vertically downward to a lower Geneva type gear 207 and similarly upwardly to another Geneva type drive gear 208. These Geneva gears are used to provide the indexing means for the system so that the continuous movement of drive motor 201 can be controlled so that movement of respective parts will take place only at predetermined intervals and for a predetermined amount of movement. As shown, Geneva gear 207 acts as a control on rotation of the reagent drive 195 while upper Geneva gear 208 acts as a control on the turntable platen drive 196. In this manner, both the reagent dispensing and the turntable rotation are controlled by their respective Geneva gears and in that manner are indexed to occur only at predetermined and opposite intervals of time. It should be kept in mind that when the conveyor is being moved with respect to the remainder of analyzer 20 it is also indexed with the indexed controlled movements of the turntable, the reagent dispensers and other moving portions of the system. To accomplish this, belt 209 is connected to timing pulley 210 above Geneva gear 208 so that as platen 197 is controlled by gear 196 and Geneva gear 208 simultaneously Geneva gear 208 controls belt 209 and thereby indexes the conveyer in timed sequence with the platen.

As shown in FIG. 8 and as discussed above, the reagent arms 211 extend from the top stationary horizontal member 199 about the circumference of turntable 190. Reagent arms 211 are manually rotatable around so that any one of the arms can be brought to the front of the machine for ready access. If it is desirable, the reagent arms can be mounted so that they can slide out on slides. This would naturally facilitate changing of the reagent containers. The Geneva gears 207 and 208 are 180° out of phase for proper indexing. In this manner one can operate the platen as discussed above while the other operates the reagent dispensers so that when the platen is not moving there is a timed slot in which you can dispense reagent. Also, as previously discussed, the pump drive is connected to the other side of the shaft of the motor. This is for a matter of convenience in that the pump operation is then independent of the Geneva drives.

Tray Dispenser

The receptacle for receiving the aliquot samples on the turntable from the sample container is in the form of a disposable plastic tray 212. FIGS. 11 and 12 are directed to the mechanism which supplies these trays to turntable 190 for use. Each tray is of a disposable plastic material and once it has been utilized for a series of samples and completes its travel through the analyzer 20, it is disposed of by a tray ejection apparatus 140. The ejection apparatus will be discussed in greater detail below. The tray contains two rows of six reaction wells making a total of twelve reaction wells per tray. Since an aliquot of a sample of blood serum may be positioned in each reaction well, up to twelve different tests may be conducted on a sample by the use of a tray 212 in one trip through the analyzer testing cycle. In FIG. 11 a tray 12 is shown in position to receive a sample with the required aliquots being positioned in each reaction cup. FIG. 12 shows the mechanism in detail for releasing a tray onto platen 197 of turntable 190 as it is needed. As shown, a stack of trays are stored above the rotating platen 197 until the release mechanism is triggered at which time a new tray 212 will be dropped into position on the platen. The platen 197 contains a series of openings 214 to receive the reaction wells from the tray being dropped as the tray is lowered in position. As the reaction well 213 falls into place in openings 214, the flanged portion 215 of the tray 212 engages with the upper surface of platen 197 to retain the tray in position on the turntable. It should be noted that the outer surface of each reaction well 213 is tapered from top to bottom to facilitate its entry into an opening 214.

Microswitches (not shown) sense the presence of a sample container at the proper location with respect to the turntable. At that time the microswitches actuate a pair of solenoids which have arm extensions that are movable vertically to release a tray to be dropped into position on platen 197. Solenoids 216 and 217 operate simultaneously so that when solenoid 216 is activated, its arm arrangement 218 moves up simultaneously with the arm arrangement 219 of solenoid 217. The end of arm 218 remote from solenoid 216 is connected to plunger 219. Similarly, the end of arm arrangement 219 remote from solenoid 217 is connected to plunger 220. Extending horizontally from plunger 219 are a pair of vertically spaced pins 221 and 222. Similarly, plunger 220 has a pair of vertically spaced horizontal pins extending therefrom and can be seen in FIG. 12 as pins 223 and 224. Pins 221–224 are mounted in corresponding slots 221a–224a respectively. These are diagonal slots in horizontally slidable hold and release blocks. In this manner, pin 221 is mounted in a slot in sliding block 225. Pin 224 is mounted in sliding block 226. Pin 223 is mounted in sliding block 227 and pin 224 is mounted in sliding block 228. It should be noted that the slots in blocks 225 and 227 are perpendicular to the diagonal slots in blocks 226 and 228. Therefore, when the solenoid arms 218 and 219 are moved upward and correspondingly plungers 219 and 220 are moved upward, the arrangement between the respective pins and slots will cause blocks 225 and 227 to move inwardly so that the tips extending therefrom will engage with the undersurface of the stack of trays and hold the stack above blocks 225 and 227 in position. Simultaneously, blocks 226 and 228 will be moved away from the trays and bringing the inwardly extending tips of blocks 226 and 228 away from contact with the lowest tray 212 in the stack thereby permitting one tray to fall into position on platen 197. Thereafter, a spring (not shown) is employed to return the plungers 219 and 220 to their initial positions whereby the lowermost tray will be brought into contact with blocks 26 and 28. The tray dispensing mechanism is then ready for the next dispensing of a tray when a sample container is sensed on the conveyor system in proper position for actuating of the dispensing means.

Conveyor System

The conveyor system analyzer 20 can be best seen in FIG. 7 and 13a–d. As seen in FIG. 7, the conveyor apparatus 30 is designed to travel in a track which brings it into communication with the turntable arrangement and particularly the serum dispensing apparatus 60. Thereafter the conveyor system carries the sample containers to the OCR reading station and from there to a point after which they may be removed for disposal. The actual conveying belt 230 is constructed of a plastic material and is connected in sections so that a section of belt can be replaced at any time and disposed of if required. The belt sections are connected by means of a tab 232 extending from one end portion thereof and the other end portion of each containing a recess 233. A vertical hole through tab 232 can be aligned with corresponding vertical holes through the solid portion above and below recess 233. Thereafter a pin 234 can be extended through the aligned openings to lock two adjacent sections of belt 230 together. Each section of belt contains a number of holding cups 235 which are tapered in configuration to permit introduction of a sample container 231 from one end thereof and which will retain the container in position by engagement with the lower end thereof and the side walls of the tube. This point of engagement 236 is facilitated by the elastic type of plastic material employed for belt 230. As the tube 231 is extended down through cups 235, the side walls of the cup are somewhat extended so that an elastic load is placed on the cups at point 236. Thereafter when the tubes are released the tendency of the side walls of plastic cups 235 to return to their normal configuration will cause an engagement between cups 235 and tubes 231 at point 236 and retain the tubes in position. It should be kept in mind that although belt 230 is of a plastic material the pins 234 may be of a steel material to assure a positive engagement between each section of conveyor materials. Additionally, to assist in providing the most flexible type of conveyor belt for the change in direction in the conveyor path and facilitate handling of the sample tubes, grooves 237 are molded along the length of belt 230 so as to provide a living hinge effect to the plastic belt material. This adds to the flexibility and ease of handling of the plastic conveyor belt. It should also be noted that the tops of the serum containers 231 are open to permit removal of the blood serum when it is properly positioned at the serum dispensing station adjacent to turntable 190.

Heating Bath

Figure 15:
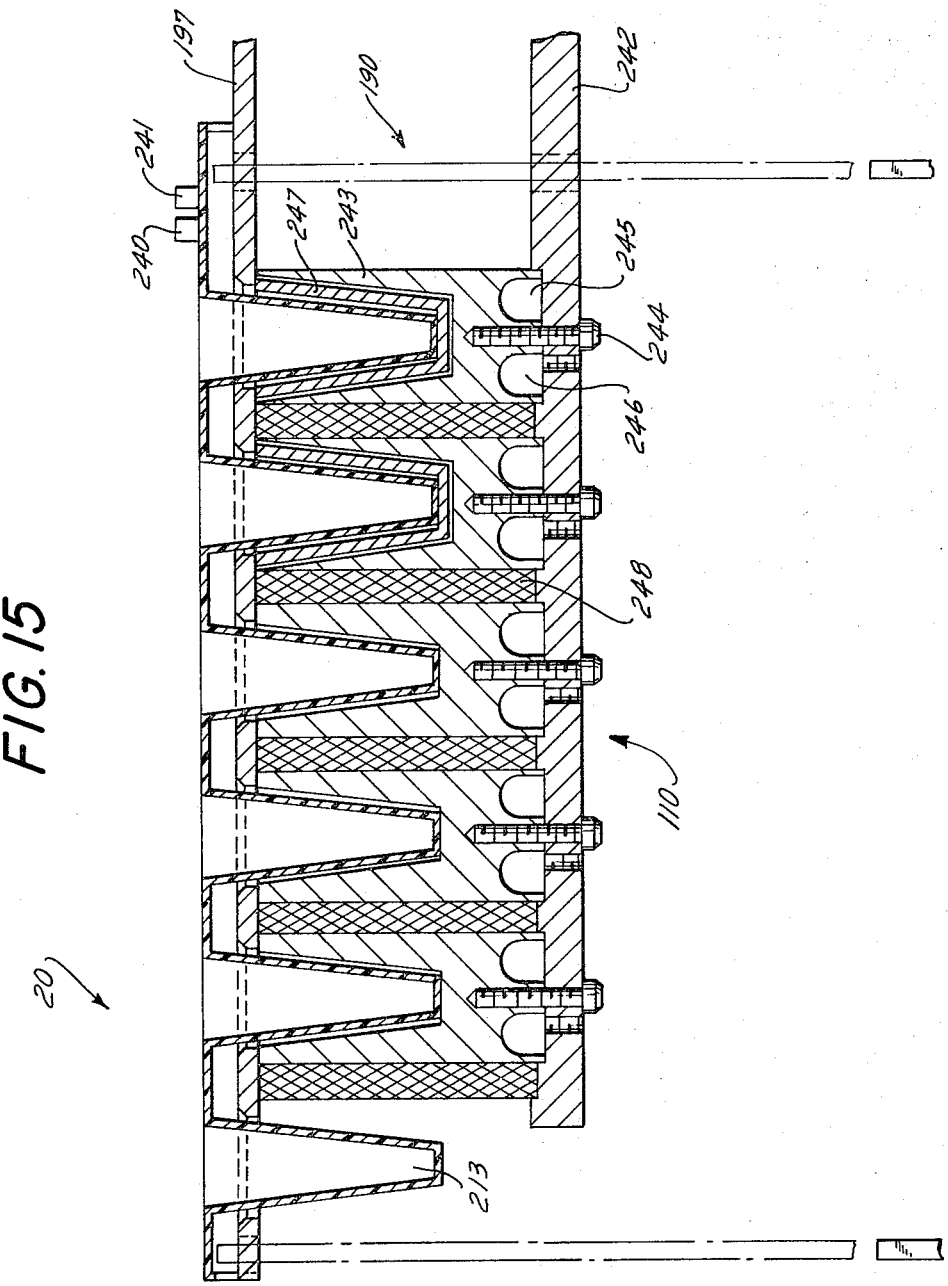
FIG. 15 is a fragmentary partially sectional side elevation view of the automatic clinical analyzer showing the heating bath portion thereof.

As can be seen from the drawings, the heating bath 110 is located within turntable 190 beneath upper platen 197. It may be noted in viewing FIGS. 15 and 16 that cam buttons 240 and 241 are positioned on the upper surface of the outer flange portion of each tray for the purpose of triggering the reagent dispensing apparatus when a tray containing aliquot samples in its reaction cups is in position with respect to an appropriate reagent arm. The buttons 240 and 241 act in a camming manner to initiate operation of the reagent mechanism. Heating bath 110 has a base 242 of fiberglass and epoxy or any similar insulating material. Each of the twelve wells 243 is surrounded by an aluminum ring which is fastened to the base 242 by means of threaded screws 244. Each aluminum ring has a channel 245 at its base for heating purposes and a similar channel adjacent thereto 246 for cooling purposes. The wells are layed out similar to the respective trays in regard to the reaction wells. Therefore there are two rows of six wells to receive each tray. The inner two sets of opposing wells which number four in all have individual wells 247 inside of and concentric to the aluminum rings 243. The remaining eight wells are merely surrounded by the aluminum rings 243 and contain no inner cup or reaction well 247. An air space 248 is provided between each pair of aluminum rings 243 for insulation purposes.

Figure 14:
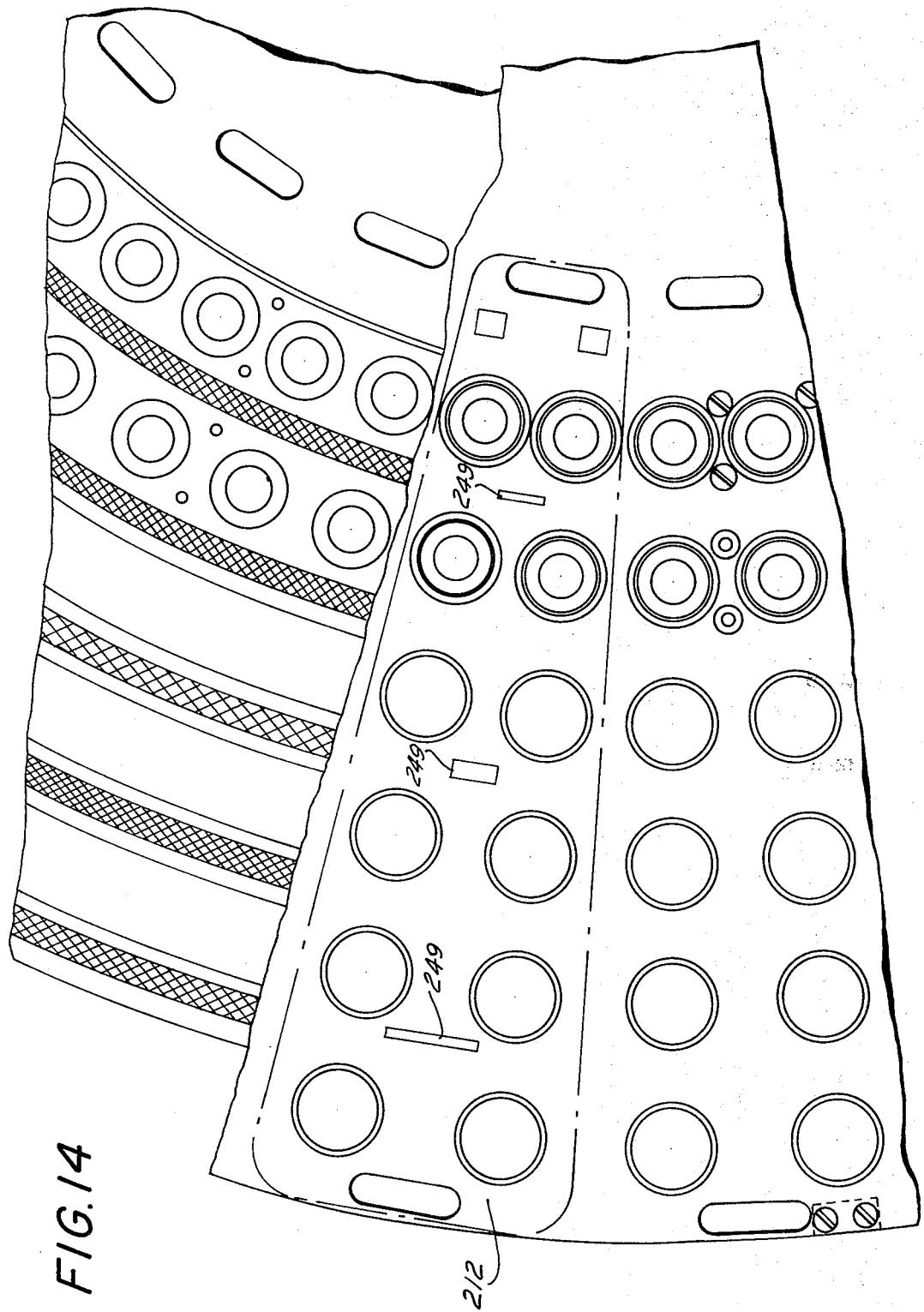
FIG. 14 is a fragmentary partially sectional top plan view of the automatic clinical analyzer showing the heating bath portion thereof.

Returning to consideration of the upper surface of the tray structure once again, separator buttons 249 project upwardly from the upper surface of each tray 212 and act as separators when the trays are stacked in dispensing appartus 40 to facilitate the dispensing of each individual tray onto turntable 190. These separator buttons can be most readily observed in FIG. 14 of the drawings.

The outer pair of reaction cups 213 which corresponds to the outermost cup in each row of six of the tray is not located within an aluminum insulating ring of heating bath 110. Therefore, these two outermost cups are exposed to room temperature and are not subjected to any artificial heating and cooling conditions. The heating bath itself is affixed to platen 197 and moves accordingly so that the wells formed by aluminum rings 243 are aligned with the openings in the platen and are in position to receive the reaction cups 213 of each tray 212. With the additional separate cups 247 inside of aluminum rings 243 on the inner two pairs of openings, the heating bath is designed to heat with increasing temperatures beginning with room temperature at the outermost periphery of the turntable and increasing the temperature as we move toward the center of rotation. Therefore, the outside cups 213 contain no insulating material around them. The next three pairs of cups contain aluminum rings around them and the inner two pairs contain aluminum rings and additional insulating cups between the aluminum rings and the reaction cups 213. As stated above, the aluminum rings 243 are fixed in a convenient manner to the plastic platen 197. A cooling coil extends through each channel 246 in the base of the ring adjacent to the fiberglass epoxy base. Chilled water is run through the cooling coil and an electrical current is passed through a heating coil which extends through channels 245 formed by the base of the aluminum rings 243 and the fiberglass epoxy base 242. The heating bath is desired to provide the desired incubation time for the reagent and blood serum mixtures appropriately positioned in aliquot amounts in the reaction cups of tray 212. In this manner the desired tests can be conducted while the serum and reagent mixture is rotating on the turntable into a position where it is readily picked up by the colorimetry system as will be discussed in detail below.

Serum Tip Pick-Up And Tip Cassette Apparatus

Figure 16:
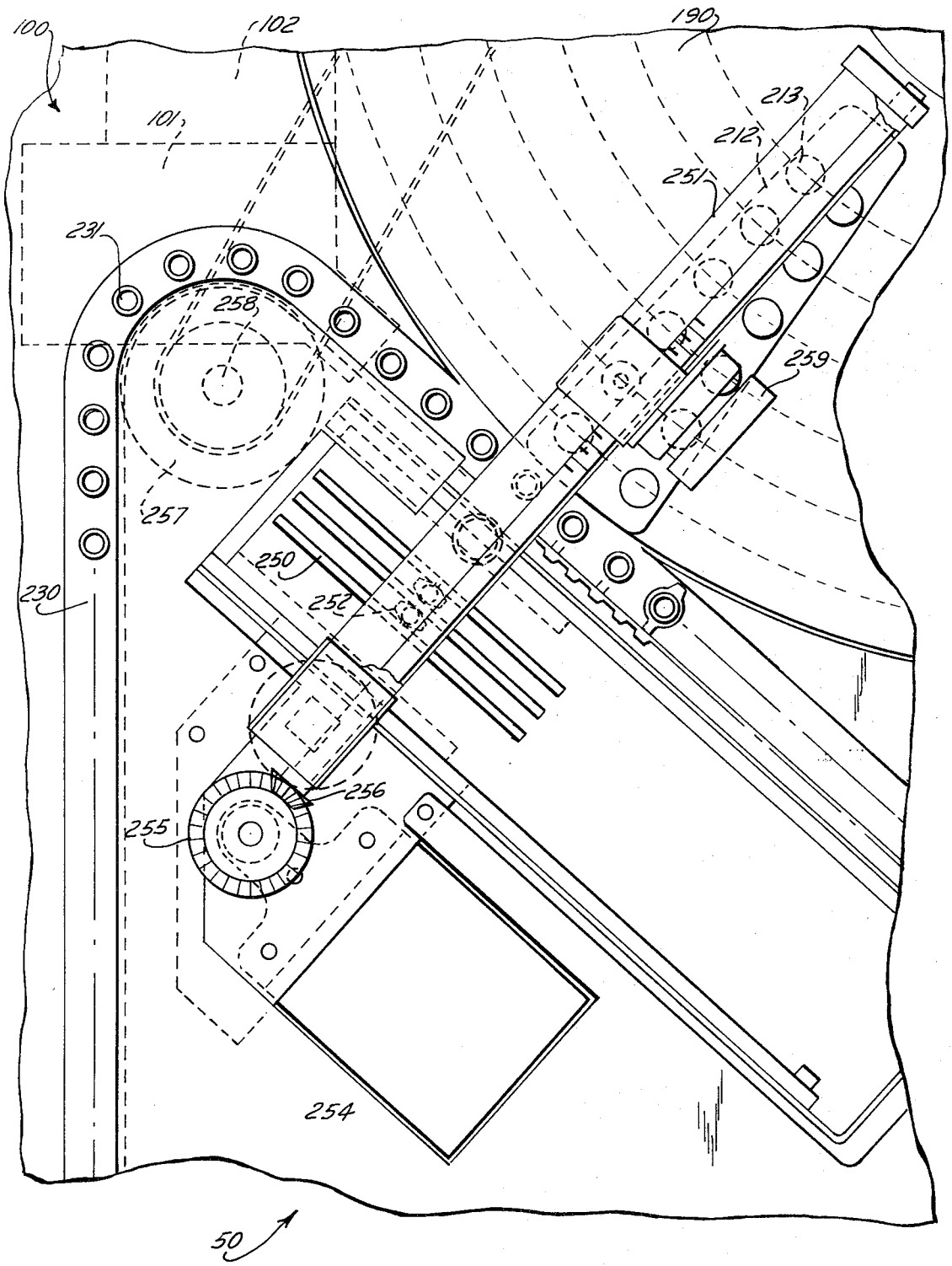
FIG. 16 is a fragmentary top plan view of the automatic clinical analyzer showing the portion which provides tips for the pick-up head part thereof.

The means for supplying a disposable serum tip to the serum dispensing apparatus upon each transfer of a sample from a sample container to the reaction cups of a tray is shown in detail in FIGS. 16–21c of the drawings. As shown in FIG. 16, the disposable tip cassette 250 is mounted beneath the serum dispensing arm 251 and contains a multiplicity of disposable tips 252 for introduction into the serum dispensing mechanism. Cassette 250 is annular in shape and contains two circular rows of tips 252 with a convenient number of tips in each circular row. For purposes of this embodiment, there are thirty tips in each circular row on the cassette 250. Immediately adjacent to where cassette 250 is mounted is an ejection chute 253 for disposal of each tip 252 after it has been used to transfer one blood sample to the required reaction cups in a given tray. A drive motor 254 is employed to drive the dispensing mechanism radially by means of a lead screw connected to the motor through beveled gears 255 and 256. The cassette in 250 is spaced from turntable 190 so as to permit conveyor 230 to pass therebetween. In this manner, as shown a sample tube 231 can be aligned with a disposable tip 252 and a tray 212 beneath dispensing arm 251. The conveyor is driven by means of belt 209 which is connected to drive pulley 257 which rotates about shaft 258 in driving the conveyor. Eject chute 253 is also aligned with tray 212, a sample container 231 and a disposable tip 252 in cassette 250 and is positioned between container 231 and cassette 250. With the arrangement as shown as will be discussed in greater detail below, the serum dispensing apparatus may be activated so that a disposable tip is picked up by the dispensing apparatus and then the serum is drawn into the disposable tip on the apparatus and dispensed into the various reaction wells 213 of tray 212 in the desired aliquot samples. Thereafter, the dispensing arm will return to position over the eject chute where ejection apparatus will remove the used tip 252 from the remainder of the dispensing apparatus and dispose of it down ejection chute 253. At that point, a new sample container 231 can be brought into position by the timed drive means and the cycle can be repeated once again. A pick-up and dispenser motor 259 is connected to the serum dispensing means so that the fluid may be withdrawn from the sample container and aliquoted into the reaction cups as desired. The sample container 231 which has just had blood removed therefrom will continue along on the conveyor system until it comes into position for identification at the OCR apparatus 100 station. At that point as shown in FIG. 16 in box form and as will be discussed in greater detail below, the sample container 231 is rotated until it is in proper alignment by the rotating mechanism 101. In the proper position, the optic system 102 of the OCR will be in position to identify the indicia thereon so that the optical character read-out system can record the identification of material which is thereafter stored until the test results have been obtained.

Figure 17:
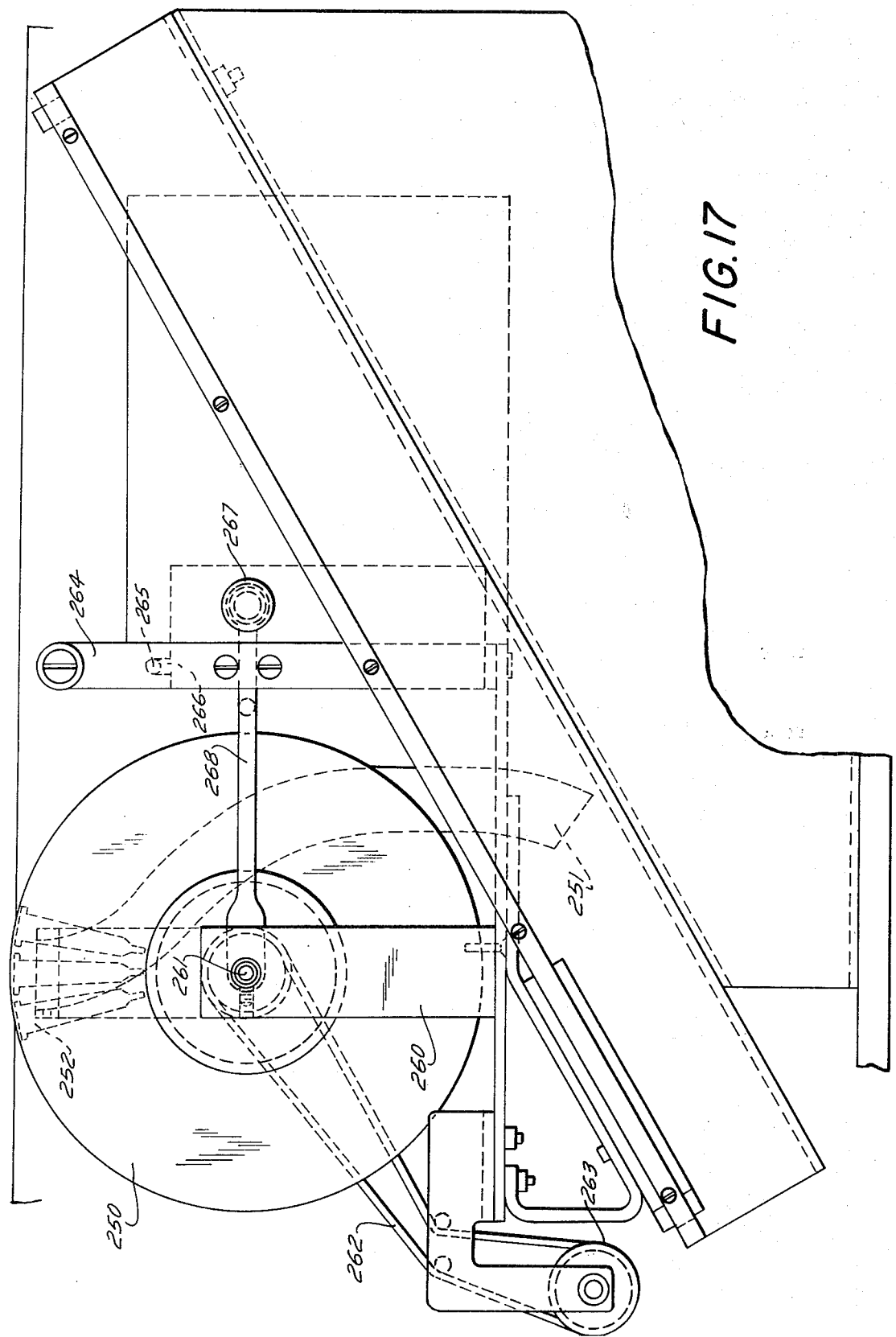
FIG. 17 is a fragmentary side elevation view of the automatic clinical analyzer showing the tip dispensing portion thereof.
Figure 18:
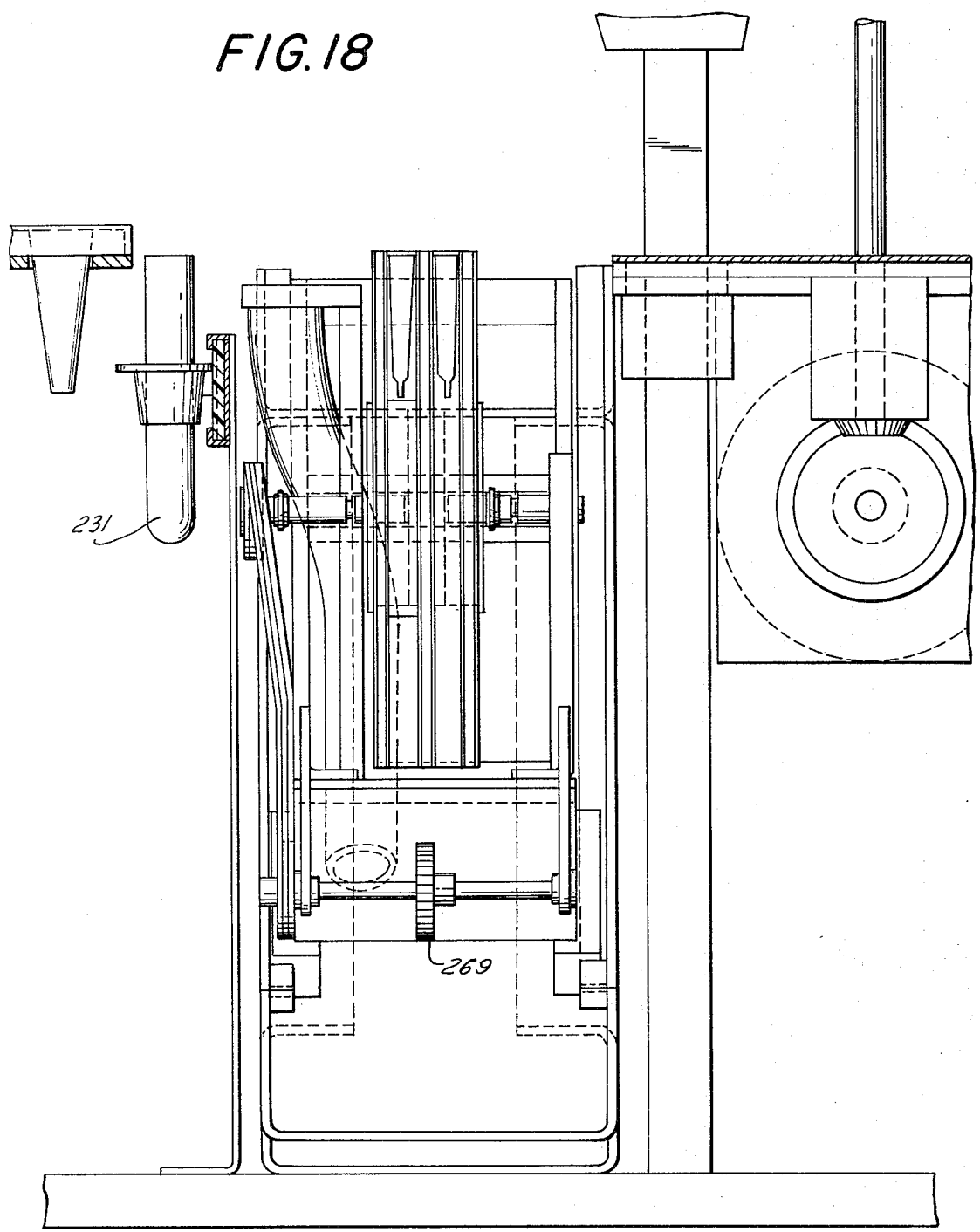
FIG. 18 is a fragmentary side elevation view of the automatic clinical analyzer showing the tip dispensing portion thereof and tip ejection portion thereof.

In FIG. 17 it can be seen how cassette 250 containing tips 252 are mounted to support bracket 260. In this manner, the cassette can be rotated about axle 261 so that each tip contained on the cassette is brought into alignment with the serum dispensing mechanism. The cassette is driven by means of belt 262 which is driven by drive pulley 263. Drive pulley 263 is indexed by means of identification of a new sample container 231 at the pick-up point.

A handle 264 is provided to facilitate lifting of the entire assembly to remove a cassette when it is empty of tips and to refill it with a new supply of tips. In the closed position handle 264 is retained by means of pin 265 which sits in notch 266 of handle 264. Additionally, a release button 267 is provided in connection with a pair of proposed jaws 268 whereby when the release button is activated the jaws 268 can be separated and the cassette 250 can be removed for replacement of a new supply of tips 252. The cassette driving gear 269 as previously discussed is indexed so that it is coordinated with the appearance of a sample container 231 at the serum pick-up point. The cassette drive will be off the main drive or alternatively it may be driven by any other drive means associated with analyzer 20.

Turning to FIGS. 20a to 21c, it can be seen how the disposable tips 252 are mounted on cassette wheel 250. The tips are supplied in long continuous strips 270 in double rows with each tip 252 being integral with the continuous base strips 271 by means of a small connection strip 272. The top flanges of tip 252 have an integral connection 272 on opposing sides. Since two rows of strips are mounted together on cassette 250, there are three elongated continuous strips 271 in parallel relationship with a row of tips mounted between each of two of the continuous strips 271. In the central portion of the continuous length of tips 270 are centering slugs 273. Each long length of connecting strip 271 has a centering slug 273 so that the supply of tips 270 can be properly located on cassette 250. At each end of the disposable tip layout 270 are three parallel openings 274. Each opening 274 is located at the end of one of the three continuous strips 271 of layout 270. Therefore, when layout 270 is positioned on cassette 250 in a circumferential relationship, openings 274 at one end of layout 270 will become aligned with openings 274 at the other end of layout 270. Thereafter, a pin 275 is passed through the aligned openings 274 and corresponding openings 276 in cassette 250 so as to mount layout 270 upon cassette 250. Each pin 275 has an enlarged head 277 to prevent passage of the pin entirely through layout 270 to thereby affix layout 270 to cassette 250. Naturally when all of the tips 252 and individual layout 270 have been utilized, the pins can be removed and the remaining plastic portion of layout 270 can be replaced by a new layout containing a new supply of tips. A cutting mechanism (not shown) is used in a convenient manner to cut integral portions 272 connecting tips 252 to strips 271 prior to rotation of the cassette to present the tip to be utilized at the pick-up station.

Serum Dispensing Apparatus

Figure 22:
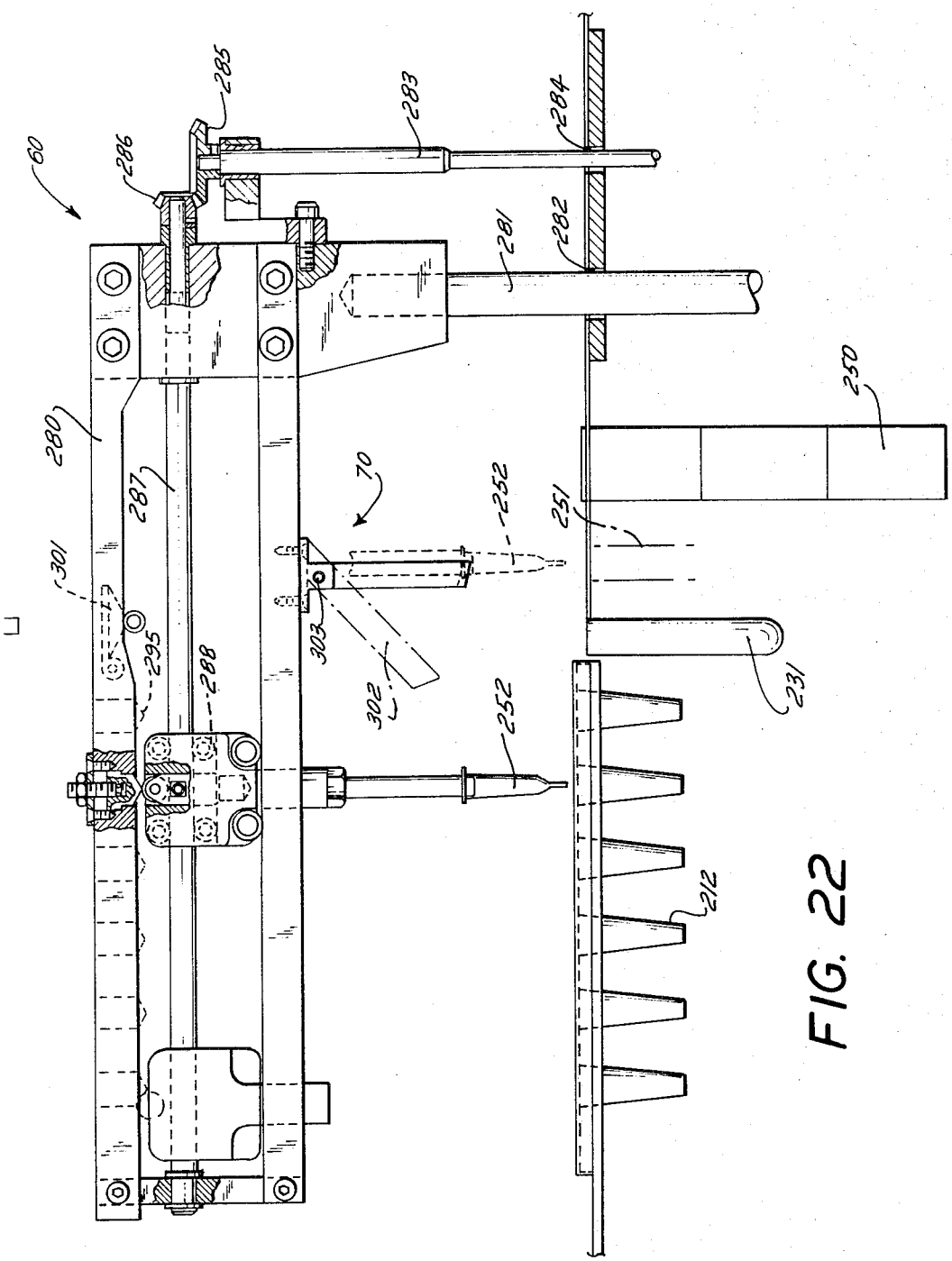
FIG. 22 is a fragmentary partially sectional side elevation view of the pick-up head and aliquot dispensing portion of the automatic clinical analyzer.
Figure 23:
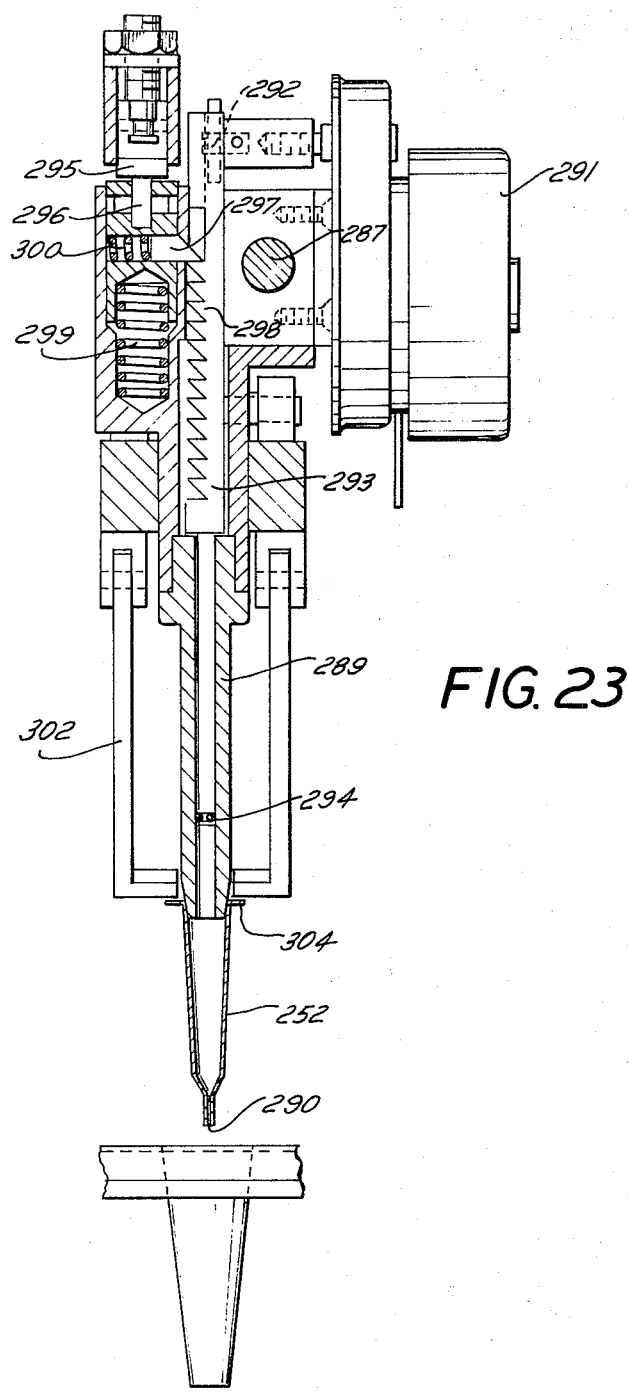
FIG. 23 is a fragmentary partially sectional end elevation view of the aliquot dispensing portion of the automatic clinical analyzer.

FIGS. 22 and 23 are directed particularly to the serum dispensing apparatus 60. The main dispensing arm 280 is mounted in fixed position on a vertical reciprocally movable bar 281. Bar 281 passes through opening 282 in analyzer 20 and is driven vertically by a motor drive (not shown). Similarly, horizontal drive shaft 283 is mounted in opening 284 of analyzer 20 so that it may be reciprocally moved in a vertical direction by means of the same motor drive. At the upper end of horizontal drive shaft 283 is a beveled gear 285 which meshes with beveled gear 286 connected to the lead screw 287 which horizontally moves the serum pick-up and dispening housing 288. At initiation of the serum and dispensing operation, the housing 288 is positioned above container 231. Prior to its positioning at that location it picks up a tip 250 from cassette 252 as previously discussed. Tip 252 frictionally engages with the lower tapered portion of barrel 289 of housing 288. Barrel 289 is open at its forward tip so as to communicate with the interior of tip 252. Similarly, tip 252 has a narrow open end 290 through which the serum may be taken in and dispensed.

When tip 252 is positioned above container 231 and serum dispensing is to commence, the entire assembly 60 is lowered including bars 281 and 283 until tip 252 is immersed in the serum contained in container 231. Thereafter, motor 291 drives rack and pinion mechanism 292 to draw plunger 293 upward. Mounted on the forward end of plunger 293 is a casket 294 to seal the plunger at that point with the interior walls of barrel 289. Therefore, as plunger 293 is withdrawn a vacuumn is created in the lower portion of barrel 289 and consequently in tip 252 so that serum is drawn into disposable tip 252. The amount shown, ratchet surface 298 is located on the drawal of plunger 293 by means of motor 291.

Gear arrangement 285 and 286 then rotates lead screw 287 to drive housing 288 horizontally. Tray 212 is aligned with housing 288 so that as housing 288 is moved horizontally it will come into alignment with a reaction cup of tray 212. Simultaneously, a cam 295 will be contacted by wheel 296 on housing 288. The cam surface 295 is such that wheel 296 will be rotated and depressed so that pawl 297 in housing 288 will be displaced from ratchet 298 so as to permit plunger 289 to lower a predetermined amount. As shown, ratchet surface 298 is located on the upper portion of plunger 289. As wheel 296 is depressed by cam 295 so as to permit pawl 297 to be displaced, a load will be placed on spring 299 located in an appropriate recess in housing 288. Therefore, when wheel 296 passes from engagement with a cam 295, the bias spring will unload so as to return wheel 296 to its normal relaxed position. Another spring 300 is located in a recess behind pawl 297 in housing 288 so that upon withdrawal of plunger 289 to draw fluid into tip 252, pawl 97 can be displaced horizontally against spring 300 to permit removal of plunger 289. Thereafter, when the upward movement of plunger 289 is complete, spring 300 will return pawl 297 into engagement with ratchet surface 298 in readiness for the dispensing operation to follow. As shown, a cam 295 is positioned over each receptacle in tray 212 so that as housing 288 is moved horizontally by lead screw 287 it will sequentially come in contact with each of a row of cams 295. As wheel 296 contacts each cam 295, a predetermined amount of serum will be dispensed from tip 252 by the lowering of plunger 289 so that a desired aliquot of serum is then positioned in each reaction well of tray 212. If desired, the six wells in one side of each tray 212 may be filled by moving housing 288 one complete length along lead screw 287 and the opposing six wells can be filled by returning housing 288 in the opposing direction. Naturally, the tray would have to be indexed so that the second row of wells are in alignment with tip 252 for the return trip of housing 288 along lead screw 287. In any event, after the dispensing operation is complete and housing 288 has been returned past alignment with tray 212 and the turntable it will come in contact with an additional cam surface 301 mounted on dispensing apparatus 60 which is interconnected with hinged arm arrangement 302 which forms a portion of tip eject mechanism 70. The hinged arm arrangement 70 is free at its lower end and pinned to the apparatus at its upper end 303 so that it may be pivoted to engage its lower end with the upper circumferential flange 304 of tip 252 and force tip 252 from its frictional engagement with the lower end of barrel 289. At is point, the tip is immediately over disposal chute 251 so that it will fall through the opening in disposal chute 251 to a waste collection point. Then, the housing 288 is positioned in relation to cassette 250 so that it may once again be lowered into engagement with a new cassette tip for use with a new sample container 231 for the successive patient's test. It should be kept in mind that the normal position of hinged arm 302 is substantially vertically downward due to gravitational forces. Engagement with cam 301 displaces hinged arm 302 so that it will force tip 252 from engagement with barrel 289. Naturally thereafter, gravity will return the hinged arm to its normal downwardly extending relaxed position. As previously stated in regard to the dispensing and pick-up mechanisms 60 and the tip removal mechanism 70, all operations are indexed with respect to the main drive so that the sequence described above with regard to these mechanisms are in timed sequence with those previously discussed and those to be discussed below.

The resultant serum dispensing mechanism 60 is designed for dispensing multiple aliquots of serum rapidly and with high precision into multiple reaction cups from a sample presented at the dispensing station. In sequence, the dispenser lowers and picks up a disposable plastic molded tube with a small aperture called a "serum dispensing tip." The plastic tip may be constructed of a common plastic material such as polyolefin. The tip holds a serum which is to be dispensed. The dispensing arm moves over the sample container and lowers to insert the serum tip into the serum and then aspirates enough serum for the dispensing cycle into the serum tip. The aspiration is accomplished by removing the plunger past a seal to reduce the air pressure inside the serum tip. The plunger is not wetted by the serum to avoid cross contamination of sequential samples. The plunger is moved by an electro-mechanical actuator. The dispensing arm then moves over the twelve reaction cups at a rate of approximately 0.6 seconds between dispensing cycles. During the course of movement over the twelve cups the plunger is advanced by twelve cams, one for each cup, which advances the rod a precise pre-selected amount. These amounts are multiples of approximately ten microliters, for example ten, twenty, thirty, forty, fifty and sixty microliters, as determined by the number of teeth on a precision rack which advances the plunger. One tooth is equivalent to ten microliters. The pawl, driven by the cams, moves over the rack to engage or advance the rack an integral number of teeth toward a fixed mechanical stop for the pawl. Thus the metering rod is advanced one to six teeth on the rack. Thereafter, the dispensing arm moves past the tip stripping lever or arm which removes the serum tip from the forward end of the plunger. The arm then moves past a margin shot lever which advances the plunger a small amount, for example, four teeth for the purpose of providing an extra volume of serum in the serum tip on the next dispense cycle to allow for internal residue. Appropriate limit switches and coordination with the central programming means enables the arm to sequence automatically in the horizontal and vertical directions as desired.

In the dispensing system employed herein each of the twelve aliquots is independently selectable. Therefore each aliquot may be a predetermined amount from, for example, ten to sixty milliliters. The selection is readily adjustable by readily interchanging the cam means employed. A rapid and precise dispensing of aliquots is accomplished and no wash-out, rinse or blow off is required subsequent to the dispensing cycle. The aspiration of serum is automatically just enough to provide for the volume dispense plus the small internal residue in the disposable serum tip. As the metering cams are changed, the aspirated volume changes automatically. The accuracy and precision are determined by one part which is the plunger and rack and pawl assembly. Therefore, there are no precision cams or adjustments needed to obtain precision. Reasonable cam wear has no effect on the dispensing operation. An air shield is provided to isolate the air volume inside the serum tip from ambient temperature changes and effects. This avoids air volume changes which in turn affect the serum volume in the tip and ultimately the serum volume which is dispensed. Naturally, this feature contributes to accuracy and precision. In addition, a reversible low speed stepper motor, for example 72 r.p.m., is used directly on the 60 cycle 110 volt AC line to translate the dispenser. This type of motor avoids the need for any gear reduction system to get the appropriate revolutions per minute. It is synchronous to give a precision velocity to the dispenser and has virtually no coast after removal of power which permits accurate positioning of the dispenser without an auxiliary brake or a dynamic breaking system being necessary.

Diluent Dispensing Apparatus

The diluent dispensing apparatus and related mixing apparatus is disclosed and depicted in FIGS. 24a and 24b. The diluent dispensing and mixing apparatus 80 is located in fixed position with respect to the turntable and is positioned substantially next to the serum pick-up and dispensing apparatus 60. In this manner, as a tray containing samples leaves the serum dispensing apparatus 60 it next comes into alignment with the diluent dispensing and mixing apparatus 80 which is the normal next sequence in operations in the testing of blood serum. Alternatively, it is contemplated that the diluent dispensing step may precede the serum dispensing operation.

The diluent dispense arm 310 is mounted in fixed position by means of support 311 on analyzer 20. It is located adjacent to the serum dispensing apparatus 60 and in the path of the rotating turntable so that the tray containing serum after it leaves the aliquoting station is then indexed into alignment with the overhead diluent dispensing arm 310. A separate piece of flexible tubing 312 is held in position by arm 310 so that the forward tip thereof is in alignment with a respective reaction cup in the tray. The appropriate fluid can then be pumped through each piece of flexible tubing 312 into the reaction cup. For example, where desired, distilled water or de-ionized water can be pumped into a particular reaction cup. Also, certain reagents such as cholesterol and glucose can be pumped into the reaction cup in a similar manner. The pump which is not shown in FIG. 24 is triggered by the presence of a tray in alignment with diluent dispensing arm 310. The clutching system previously discussed is responsive to presence of the tray by means of a cam and a microswitch (not shown). The clutch arrangement is such that the pump is either triggered to cooperate with the clutches in order to pump fluid from the reaction cups to the colorimetry or to pump diluent into the reaction cups to mix with the serum. A convenient common type of diluent storage container is located on analyzer 20 and is connected to the flexible tubes 312 in order to provide a sufficient supply of diluent for operation of the analyzer.

OCR Mechanical Apparatus

FIGS. 25a–26b are directed to the mechanical and optical features of the OCR system for reading and storing the indicia located on the exterior of a container 231.

Figure 25A:
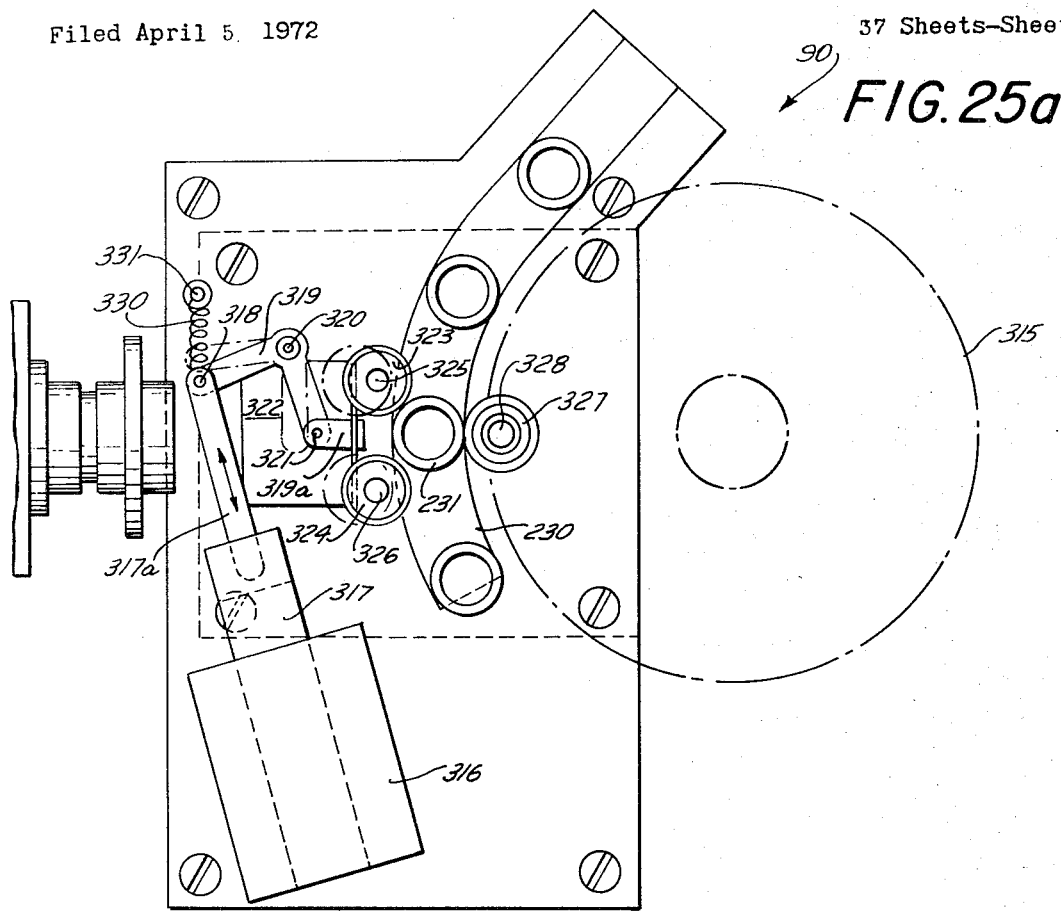
FIGS. 25a and 25b are fragmentary top plan and side elevation views respectively of the conveyor portion of the automatic clinical analyzer in position with respect to the optical character read-out portion thereof.
Figure 25B:
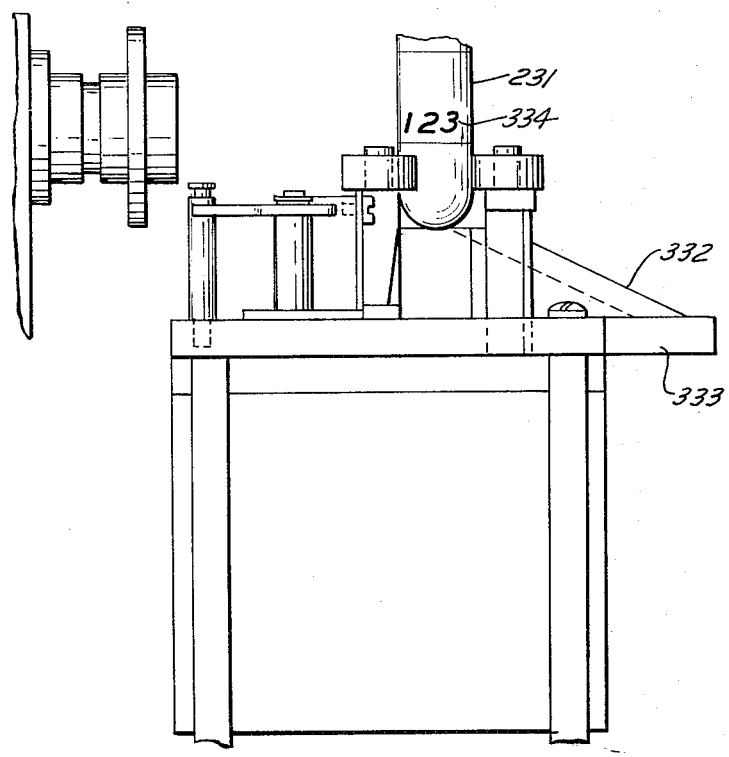

After conveyor 230 has brought a sample container 231 from the serum dispensing position a predetermined distance, it is indexed into alignment with the OCR optical and mechanical station where the indicia on the exterior of sample container 231 is collected for identification and storage. It should be kept in mind that at this point, the serum which is undergoing the testing procedure in analyzer 20 has been removed from container 231 and the operation at OCR station 90 is merely to identify the samples being tested in analyzer 20 which are taken from the particular sample tube 231 now located at the OCR station 90. When container 231 reaches the position shown in FIG. 25a, the intermittent indexing system of the analyzer 20 stops the container at that position and appropriate microswitch (not shown) activates solenoid 316. Solenoid arm 317 is connected at its end distal from the solenoid to arm 317a which in turn is connected at movable pivot point 318 to L-bracket 319. The central portion of L-bracket 319 is mounted on a fixed pivot 320 to permit its rotational movement about that point 320. The other end of L-bracket 319 is interconnected with push rod 319a at movable pivot point 321. This assembly is mounted to support bracket 322. Mounted on support bracket 322 are a pair of aligned idler wheels 323 and 324. Idler wheel 323 is rotatably mounted about axle 325 and similarly, idler wheel 324 is rotatably mounted about axle 326. In the non-activated position, the idler wheels are retracted as shown in dotted lines on FIG. 25a so as to permit conveyor 230 to move and to bring an appropriate sample container 231 into the stopped position in alignment with the idler wheels and a drive wheel 327 located on the opposite side of container 231 and in between idler wheels 323 and 324. Drive wheel 327 is rotatably mounted about drive shaft 328 which is driven by motor 315. When sample container 231 is appropriately aligned with drive wheel 327 it will be contacted by the drive wheel and will also be aligned with the optical reading portion 329 of the OCR system 90. It should also be noted that pivot point 318 which is movable and which interconnects L-bracket 319 with arm 317a also is connected to one end of a spring 330. The opposite end of spring 330 is fixed at point 331 to the supporting structure 333 of the system. Spring 330 acts to retract the above discussed interconnected elements and idler wheels 323 and 324 so that normally conveyor 230 will be permitted to move with respect to apparatus 90. As shown in FIG. 25b, a ramp 332 is provided to facilitate movement of each sample container 231 and to the elevated proper position with respect to the optical lens of optics portion 329 so that characters 334 on the container can be read and identified.

In operation, when solenoid 316 is activated, solenoid arm 317 is drawn downwardly as shown by the arrows and arm 317a is similarly moved in the same direction causing L-bracket 319 to pivot and causing push rod 319a and interconnected support bracket 332 to move idler wheels 323 and 324 into engagement with sample container 231. In that position, the container 231 is ready to be rotated by drive wheel 327 and idler wheels 323 and 324 until characters 334 on container 231 are brought into position to be read by the lens of optics portion 329. Once the information is picked up, solenoid 316 is deactivated permitting spring 330 to return the interconnected arm structures to their normal position thereby also returning idler wheels 323 and 324 to their initial position out of alignment with conveyor 230. In this manner, the sample container 231 may be moved out of the stop position and the next sample container 231 may be indexed into position for OCR identification.

Figure 26A:
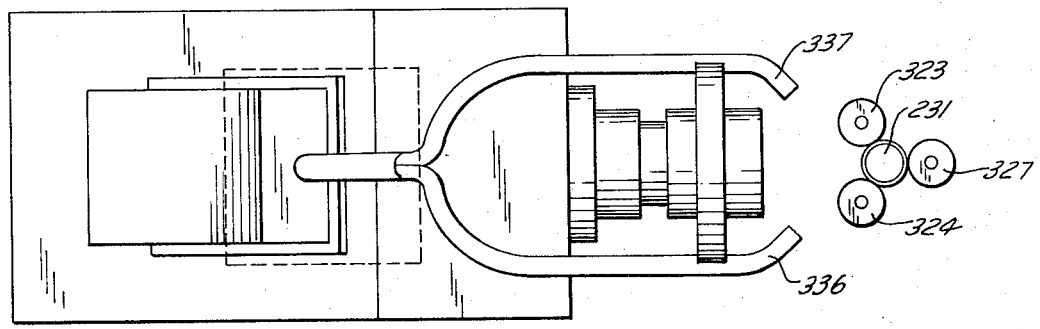
FIGS. 26a and 26b are top plan and sectional side elevational views respectively of the optical portion of the optical character read-out part of the automatic clinical analyzer.
Figure 26B:
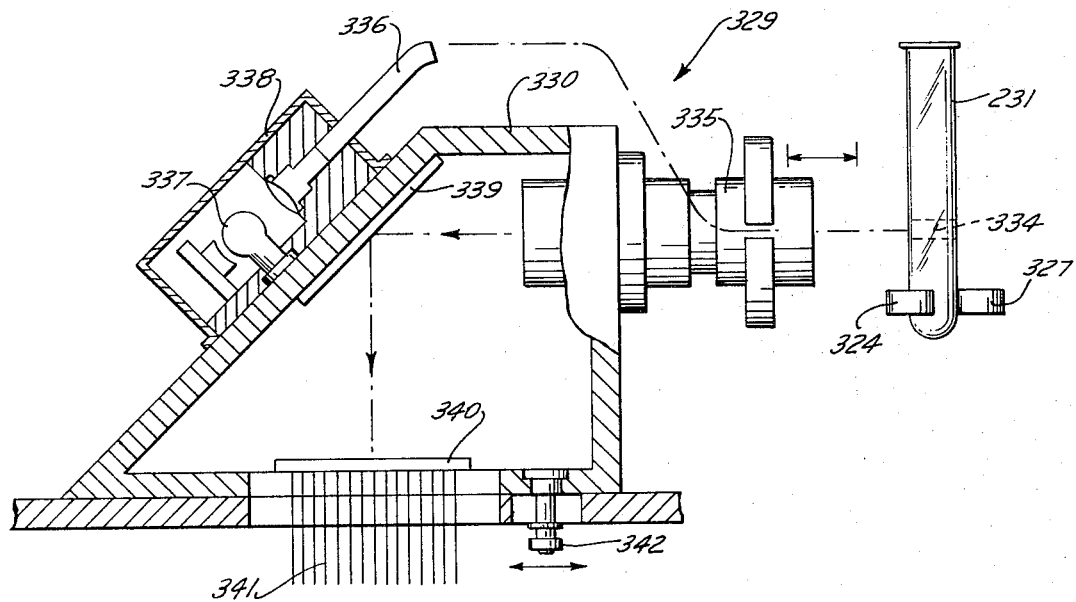
Figure 27:
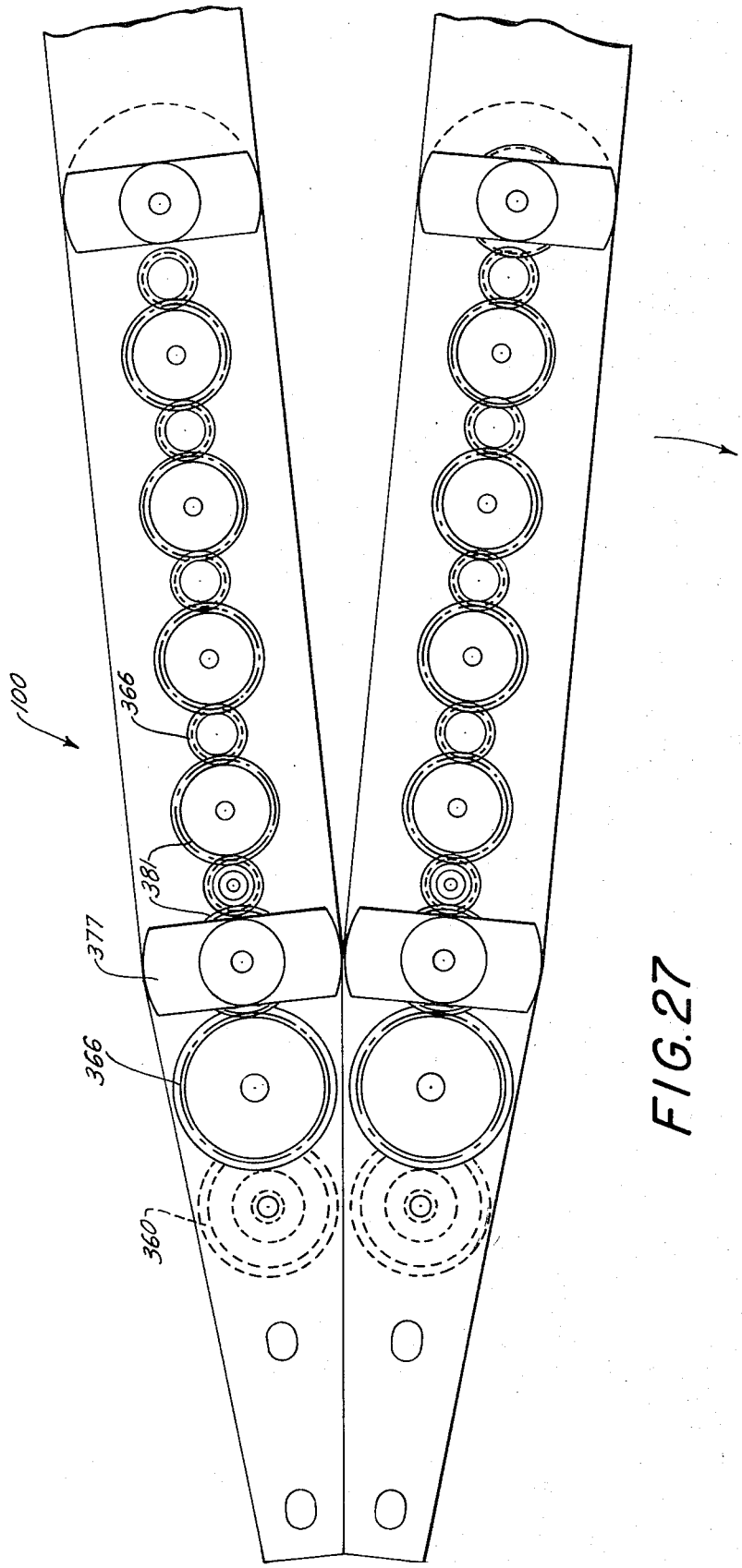
FIG. 27 is a fragmentary top plan view of a reagent portion of the automatic clinical analyzer.

The actual optical portion of the OCR system is best shown in FIGS. 26a and 26b. As previously discussed, the optical portion 329 of the OCR system is aligned with container 231 so that when wheels 323, 324 and 327 rotate container 231 the indicia 334 thereon will be brought into alignment with the lens assembly 335 of the optical system. A light source 337 in housing 338 provides light through the fiber optic light pipes 336 and 337 which are directed at container 231 at the approximate point where indicia 334 will appear. The reflected image is then directed at lens assembly 335, passes therethrough and is directed upon mirror 339 in optics housing 330. The light is then reflected from mirror 339 onto the rear of the phototransistor matrix 340. Thereafter, as shown in FIG. 26b the many phototransistors react appropriately by means of leads 341 to activate the trigger circuit and record and store the information which has been collected from tube 231. An adjusting screw 342 is located on housing 330 in order to properly align the optic system with container 231 if it is necessary. Mirror 339 is oscillated slightly about its center axis to enable scanning of the image position. The oscillation is provided by a standard oscillating motor which can be of any convenient type such as a little vibrating motor which will oscillate the mirror by no more than five or six degrees. The mirror oscillates sinusoidally in a fixed, narrow arc enabling it to scan the printed character 334 plus or minus one-half character height. The oscillating mirror thus compensates for vertical misalignments of the character. Matrix 340 is composed of judicially placed phototransistors 341 differentiating between light and dark areas of the magnified print plane on container 231.

Reagent Dispensing Apparatus

The reagent dispensing and mixing apparatus 100 is best depicted in FIGS. 27–29b. As previously discussed, a predetermined number of reagent dispensing apparatus are radially positioned about and above the surface of turntable 190. For a particular test, the reagent for that task would be properly positioned on the turntable so that at the appropriate time in the circumferential travel of a sample contained in a sample tray it will come into alignment with the appropriate reagent dispensing arm. At that point, an appropriate cam on the tray will activate a microswitch and will cause reagent dispenser 100 to dispense a proper amount of reagent into the proper reaction well in the tray. As shown in FIG. 28, the cam 345 of a tray will contact wheel 346 and activate the serum dispenser. Wheel 346 is rotatably mounted about axle 347. Pin 347 is journaled in yoke 348 the rear end of which extends into tubular member 349. Yoke 348 is held in position by means of pin 350 extending through aligned openings in tubular member 349 and yoke 348. Seated on the upper surface of yoke 348 is a compression spring 351. In turn, the upper end of compression spring 351 is held in position by disc 352 slidably housed in tubular member 349. Engaging with the upper surface of disc 352 is vertical pin 353. Pin 353 is rotatably housed in tubular member 349. A compression spring 354 surrounds pin 353 being seated at its lower end on an annular shoulder 355 extending horizontally from pin 353. The upper end of compression spring 354 is seated against the annular shoulder 356 formed by the walls of tubular member 349. The undersurface of annular shoulder 355 is retained in chamber 357 of tubular member 349 are the lower shoulder 358 formed by internal surfaces of tubular member 349. Mounted on the upper end of pin 353 is the lower portion 359 of a clutch. A drive gear 360 which is driven by the reagent drive is mounted to pin 353 so that when the drive gear is driven pin 353 and clutch portion 359 will be rotated. A vertical hanging support bracket 361 mounts reagent drive gear 360 to the reagent arm 362. A threaded plug 363 extending into a threaded recess in arm 362 accomplishes the attachment. In vertical alignment with clutch portion 359 is a second clutch portion 364 which is mounted to a vertical drive pin 365. Mounted about the upper portion of pin 365 in fixed position is an idler gear 366 which is designed to engage with the micrometer dispensing apparatus 367 for dispensing a predetermined amount of reagent. The micrometer dispensing apparatus is mounted about a lead screw so that upon rotation of idler gear 366 the lead screw will be rotated and micrometer dispensing apparatus 367 will be lowered to dispense fluid. Clutch portion 364, pin 365 and idler gear 366 are interconnected so that rotation of one of those members will cause rotation of the other two. The idler gear 366 is held in position by means of a threaded nut 368 which is engaged with the threaded outer upper surface of pin 365.

In operation, when a tray is properly position with respect to the reagent dispensing apparatus 100, the cam 345 on the tray will engage with wheel 346 and force it upward. This in turn forces pin 348 upward against the force of compression spring 351 which pushes disc 352 and pin 353 also in an upward direction causing clutch portion 359 to engage with clutch portion 364. The upward movement of member 348 is facilitated by the freedom of movement of horizontal pin 350 in the horizontal opening in tubular member 349. After engagement of clutch portion 359 with clutch portion 364 the reagent drive gear will cause rotation of the interconnected clutch portions and in turn cause rotation of pin 365 and idler gear 366 so that the lead screw of micrometer dispensing means 367 is rotated causing reagent to be dispensed. The system is indexed so that the dispensing will occur at a predetermined rate for a predetermined time until cam 345 becomes disengaged from wheel 346 which causes springs 354 and 351 to return the vertical aligned members to their initial positions and the consequent disengagement of clutch portion 359 and 364 which stops rotation of the lead screw of micrometer dispensing means 367 and dispensing of reagent of fluid.

The reagent fluid is contained in a disposable reagent container 369 which may be of a common plastic material and which has a collar 370 at its upper end for engagement with an appropriate flange on arm 362. The lower portion of reagent container 369 has a reduced portion 371 which terminates in a small diameter tip 372 which is open at the forward end for passage of reagent fluid from container 369 into the appropriate reaction cup in a tray. When the reagent in a container 369 is exhausted, the container may be replaced by a new container full of reagent material in an easy and efficient manner by merely removing container 369 from its interference fit with arm 362.

A screw adjustment means 373 is present about yoke member 348 to provide for an adjustment of the above discussed vertical assembly should the height of the cam on an entering tray be altered for any reason. Naturally adjustment may be necessary for other readily foreseeable reasons.

Figure 29A:
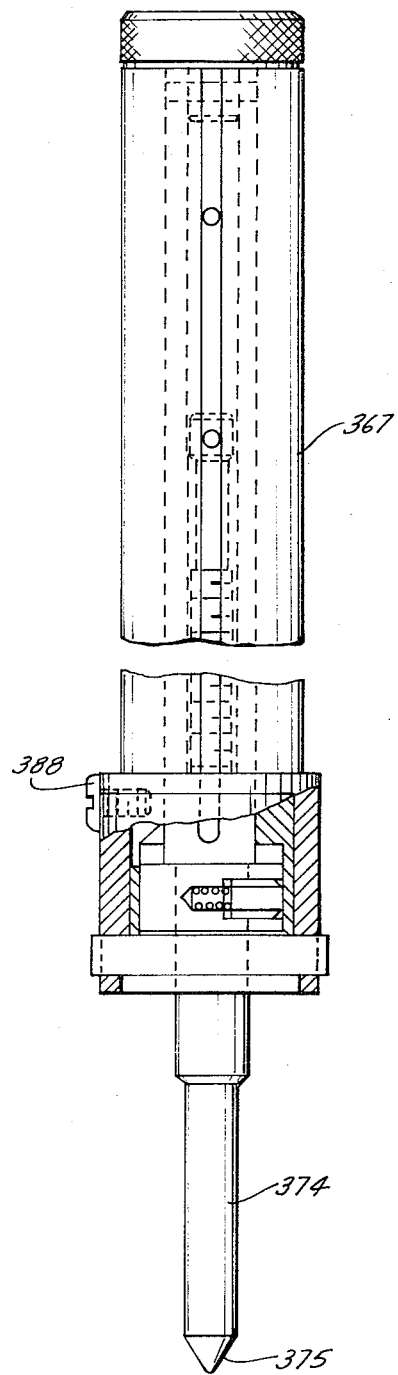
FIGS. 29a and 29b are fragmentary partially sectional side and end views respectively of a reagent dispensing portion of the automatic clinical analyzer.
Figure 29B:
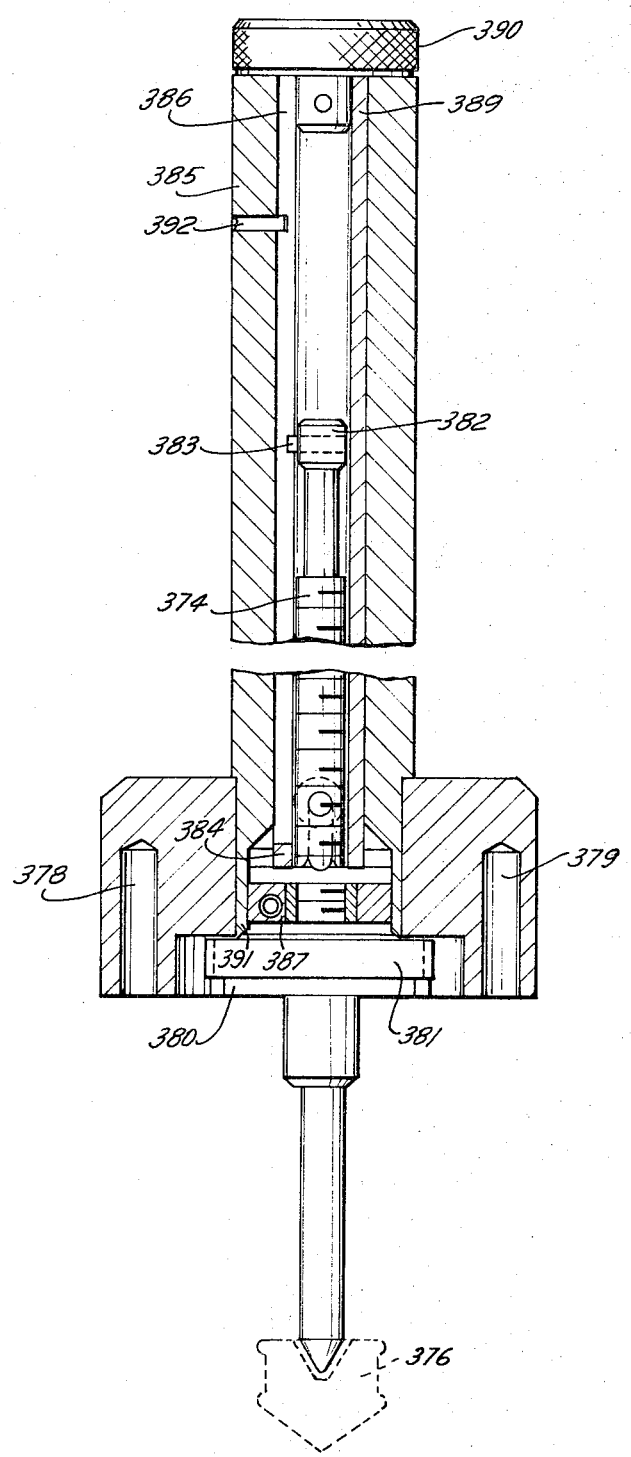

The micrometer screw drive assembly 367 can be best seen in FIGS. 29a and 29b. The lower portion of the micrometer means 367 is in the form of a drive screw 374 having a conical tip 375 for interengagement with an appropriate recess in a stopper 376 sealingly positioned within the barrel of reagent container 369. The drive screw or plunger 374 applies the downward force during the dispensing operation. Base 377 is seated on arm 362 and is screwed thereto by means of screws extending through arm 362 and into recesses 378 and 379 of base 377. A recess 380 is positioned in the undersurface of base 377 and mounted therein is a drive gear 381 which is positioned for engagement with idler gear 366 so that when idler gear 366 is rotated drive gear 381 of micrometer drive means 367 is also rotated. Passing through drive gear 381 in threaded interengagement therewith is drive or lead screw 374. At the upper end of lead screw 374 is a knob 382 having a pin 383 contained therein and extending horizontally therefrom. The extending portion of pin 383 is designed to engage with stop 384 mounted in the lower portion of micrometer housing 385. In this manner, the downward extension of lead screw 374 is limited by the eventual engagement between pin 383 and stop 384. Housing 385 contains a central chamber 386 which has an enlarged portion at the lower end thereof for reception of a half nut 387. The housing or collar 385 is seated at its lower end against stop 388. Stop 388 as shown is merely a threaded screw extending through an opening in base 377. A slidably cylinder 389 is housed about lead screw 374 within collar 385 and is attached at its upper end to a knob 390.

One half of the half nut 387 is connected to the drive gear 381. The other half of half nut 387 is free to fall away under the influence of a spring.

In operation, when drive gear 381 is engaged by idler gear 366 and is rotated thereby half nut 387 in engagement therewith an in turn in threaded engagement with lead screw 374 will cause lead screw 374 to rotate and lower and thereby force stopper 376 downward in container 369 thereby dispensing the fluid. The amount of fluid dispensed is dependent upon the extent to which drive gear 381 is rotated. When the container 369 is empty of reagent, and it is desired to replace the container with a new one drive screw or plunger 374 may be quickly withdrawn upward its full length without the necessity of having to thread lead screw 374 through its entire length through half nut 387. Knob 390 is merely turned until it is moved upward away from collar 385 and collar 385 can be slid upward thereby freeing half nut 387 with which it had formerly been engaged at its lower end portion. Half nut 387 may then fall open to the full width of the recess in which it is contained and disengaged from threaded engagement with the lead screw. Knob 390 and attached lead screw and slidable interconnected portion 389 may then be withdrawn up to its full height and a new container may then be mounted to arm 362 with conical tip 375 in engagement with the corresponding recess in a stopper 376 of a new container 369. Thereafter, collar 385 may be once again lowered until it forces half nut 387 together again around lead screw 374 in threaded interengagement therewith in position for dispensing. It should be noted that the lower edge of collar 385 is tapered at 391 to facilitate ease of re-engagement with the outer surface of half nut 387. In this manner, half nut 387 may be more easily and effectivelf re-assembled about the threaded portion of lead screw 374. To prevent the slidable portion 389 and lead screw 374 from being completely removed from collar 385 an upper stop 392 is provided. Upper stop 392 is mounted in collar 385 and extends inwardly therefrom to engage with pin 383. It should be noted that the lower portion of collar 385 is dimensioned so as to substantially mate with an appropriate opening in base 377. Similarly the lower inner diameter of collar 385 is designed to contain the half nut in mated engagement therewith with the half nut in turn in mated engagement with the outer surface of the threaded portion of lead screw 374.

Lead screw 374 does not rotate, half nut 387 rotates when driven by drive gear 381. Lead screw 374 merely threadedly follows the rotating threads of half nut 387 so that it is thereby driven in a vertical direction. In regard to reagent dispensing operation, naturally as we previously discussed the entire system is indexed of the main drive and therefore synchronization of this stage of operation of analyzer 20 is controlled by the main drive so that the time testing apparatus is closely controlled.

Pump System

The pumping system 395 utilized to pump diluent into the diluent dispensing apparatus 80 and to also pump the mixture from the reaction cups in a tray into the colorimetry system for analysis is depicted in FIGS. 30, 31a, and 31b. A bank of six pumps 396 is shown. On each machine, two pump sections will be required for each channel with one being used for the diluent dispensing and the other to pump fluid into the colorimeter. Therefore, on a twelve-channel machine with twelve reaction wells, it will be necessary to have four banks of six pumps for a total of twenty-four pump mechanisms 396. The type of pump depicted is an eccentric drive type with an up and down sliding arrangement for the pumping action. Each pump 396 includes an outlet pump cylinder 397 in which slidably mounted therein is a piston 398. At the lower end of piston 398 is an O-ring seal 399 appropriate adjusting mechanisms are employed (not shown) and are well known with pumps of this type utilized in the art. The pumping system shown is a common type of vertical pumping arrangement for fluid systems. A pumping drive means 400 which is an eccentric type of drive is interconnected with drive bracket 401. Bracket 401 is slidably journaled about fixed shafts 402 and 403. Shafts 402 and 403 are fixed in position at the top to bracket 404 mounted on analyzer 20 and at the lower portion to pump housing 405 which contains the bank of pump cylinders 397. Brackets 404 and 405 are stationary along with shafts 402 and 403. Drive bracket 401 is interconnected with the group of six piston housings 406 each of which is interconnected with a piston 396. The interconnection is accomplished by means of a horizontal pin 406 extending from piston 396 into a vertical slot 408 in piston housing 406. Upward movement of bracket 401 caused by the eccentric drive motor 400 will in turn move piston housing 406 upward and in turn piston 396 upward and draw fluid into the lower portion of the piston cylinder 397. Thereafter, upon further movement of eccentric drive motor 400 the appropriate interconnected portions of the pump will be appropriately moved and fluid will be pumped from lower portion of piston chamber 397 out through an appropriate orifice.

As shown in FIG. 31a, eccentric pump drive means 400 includes the drive shaft 409 interconnected with a rotary member 410 which has eccentrically mounted thereon disc 411. Arm 412 interconnects disc 411 with a second disc 413 which is attached to drive bracket 401. It can be readily seen how rotation of member 410 will cause a vertical reciprocal motion of interconnected members 411, 412, 413 and 401 and on to include piston housing 406 and piston 396.

At the lower end of the pump housing 405 is an intake valve 414. This is a common type of one-way ball valve with a spring normally seating the ball in position so that no fluid may enter until piston 396 is withdrawn at which time the lower end of piston cylinder 397 will become evacuated because of the seal between O-ring 399 and the walls of piston cylinder 397. Pressure will then unseat ball valve 414 and fluid will be drawn into the lower portion of piston cylinder 397 until the difference in pressure has been equalized. At that time the spring 415 will re-seat ball 416 of valve 414 retaining the fluid within piston cylinder 397. Thereafter, a downward stroke of piston 396 will force fluid out through one-way exhaust valve 415. This will occur due to the compression of the fluid in chamber 397 which will force ball 417 against the force of spring 418 and unseat the ball in valve 415 thereby providing a passageway for the exit of the fluid. When all the fluid has been exhausted, spring 418 will re-seat ball 417 in valve 415 once again sealing off piston chamber 397 for the next upward stroke of piston 396 to once again draw fluid in through intake valve 414. This is a common type of pump and naturally any other common type of pump to transfer fluid will operate satisfactorily for transferring diluent into the reaction cups or fluid from the reaction cups into the colorimetry system.

Colorimeter

Figure 32:
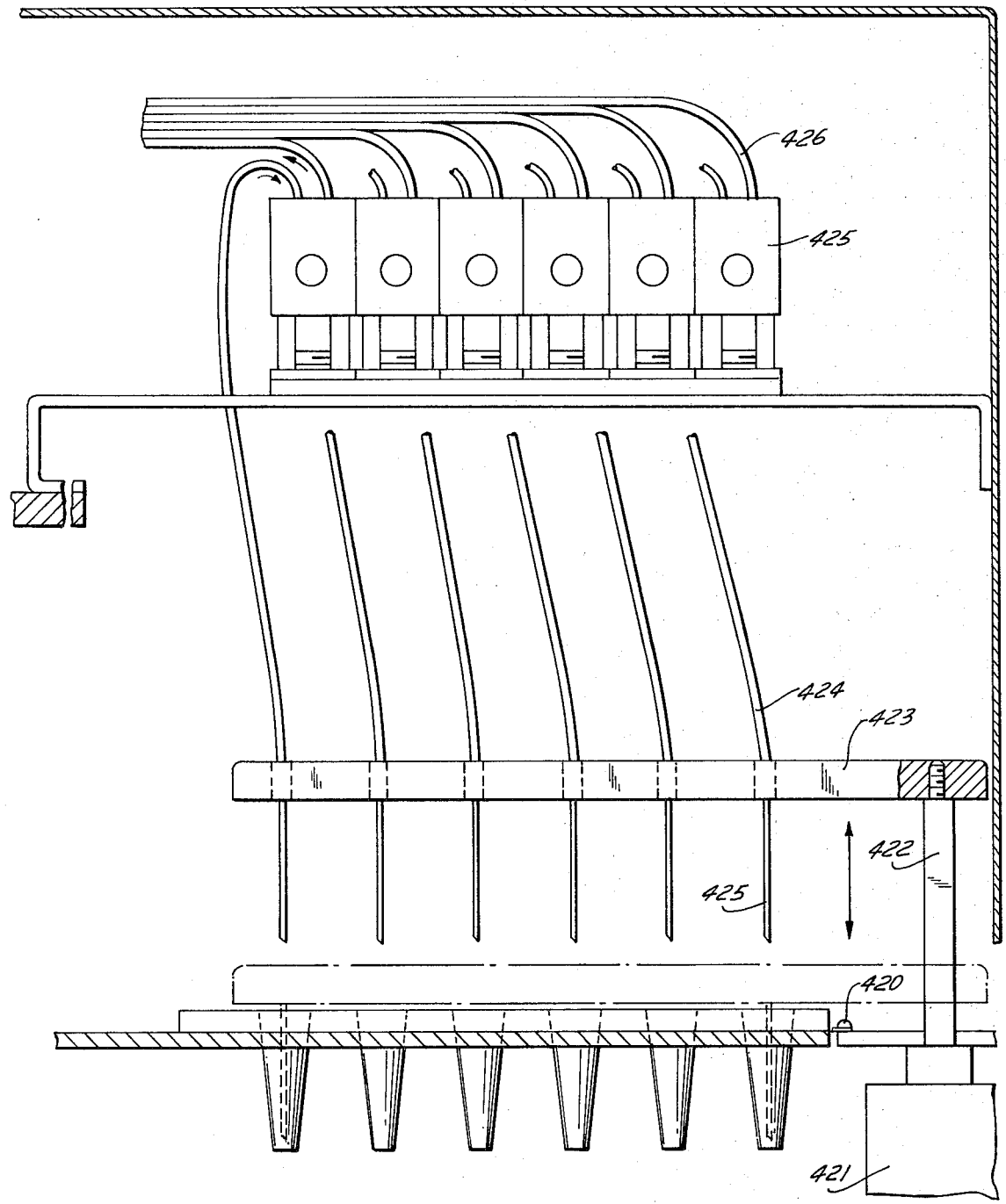
FIG. 32 is a fragmentary side elevation view of the means for transferring fluid from reaction cups to the testing means as part of the automatic clinical analyzer.
Figure 33A:
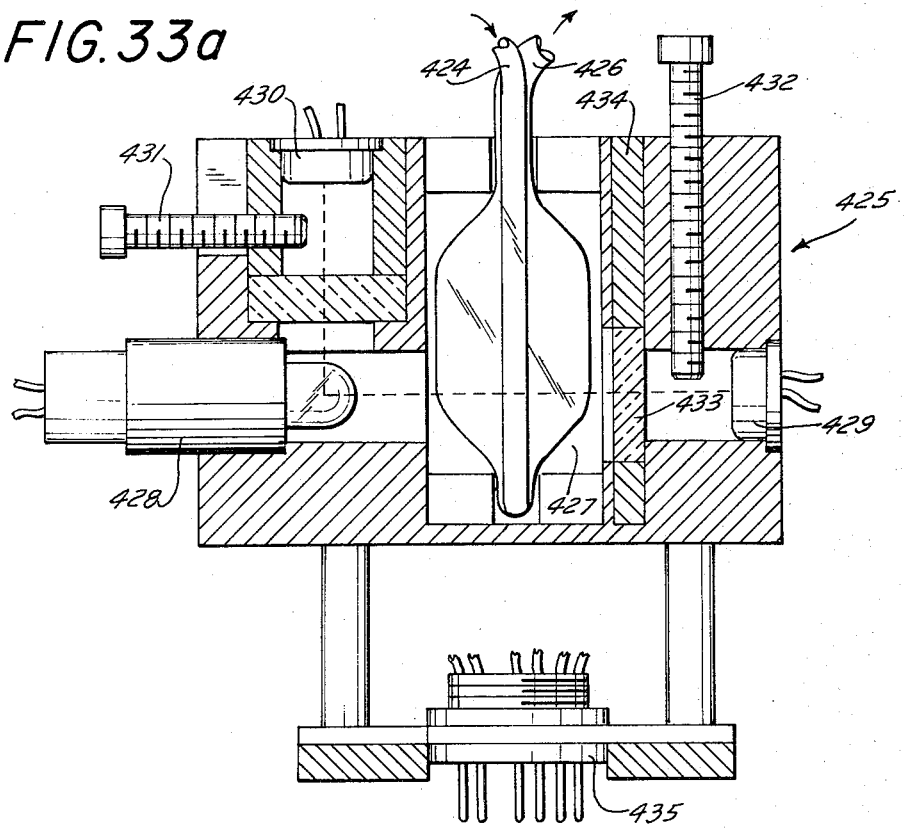
FIGS. 33a and 33b are respectively a fragmentary sectional side elevation view and a top plan view of the testing means portion of the automatic clinical analyzer.
Figure 33B:
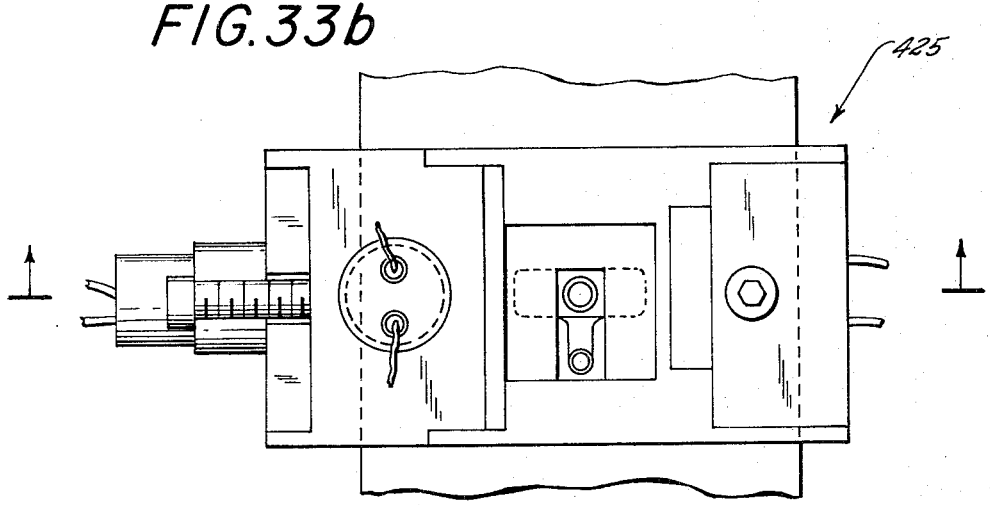

The colorimeter employed with the analyzer 20 may be one of many common types of colorimetry systems. The embodiment shown in FIGS. 32 and 33a and 33b represents one type of colorimeter system which has been found to work effectively with the embodiment of this invention. As shown, the action of the colorimetry system is triggered by the presence of a tray indexed beneath the appropriate pick-up tubes. A microswitch 420 is contacted by the tray and the reciprocal drive means for the colorimetry system is actuated. A common type of reciprocal drive means 421 is employed to lower arm 422 and interconnected tube holding bracket 423. Tube holding bracket 423 contains an intake tube 424 for each reaction cup in mounted position. In this manner when arm 423 is lowered by reciprocating device 421 the tips 425 of each tube 424 will extend into the reaction cups as shown in dotted lines in FIG. 32 so that the sample contained therein may be removed for testing by the colorimeter. The pump system previously described then withdraws the aliquoted samples in each respective reaction cup through each respective tube 424 into a colorimeter 425 for testing. After it has passed through the colorimeter 425 it continues on to pump 426 in a manner previously described and passes through the pump for disposal. The actual testing occurs as the fluid is transferred from tube 424 through colorimeter 425 before it exits into tube 426. As can be seen from FIG. 32, a colorimeter system may be employed for each aliquoted mixture in each sample cup so that all samples in a tray may be tested simultaneously to obtain information for the entire test sample removed from a particular container 231 as previously described. As previously discussed in regard to the programmer, all tests are read out sequentially so that the value for each test can be independently recorded.

FIGS. 33a and 33b shows the details of the colorimeter flow cell 425. As previously discussed, fluid passes from tube 424 through flow cell portion 427 of colorimeter 425 and out through tube 426 to the pump and waste. In colorimeter 425 in alignment with the flow cell for reading purposes is an illuminating lamp 428 and aligned therewith a photocell 429. Photocell 429 is designed to measure the sample. At right angles to the alignment between lamp 428 and photocell 429 is a reference photocell 430 so that the comparative difference of light can be measured between what photocell 429 receives and what reference photocell 430 receives. A threaded shutter mechanism 431 is present to adjust the amount of light which can be received by the reference photocell 430. Similarly, as shutter 432 is present in threaded engagement with the structure of colorimeter 425 to adjust the amount of light which can be received by the measuring or sample photocell 429. An appropriate filter 433 is mounted in colorimeter 425 for the test to be conducted by that particular colorimeter for that particular aliquot sample. It is well known that interchanging of filters enables one to do a number of different tests with a single colorimeter. A common type of filter holder mechanism 434 is employed to keep the filter in proper position with respect to flowcell 427 and in proper alignment with sample photocell 429, lamp 428 and tube 424. A support means and power supply 435 is connected to the housing portion of colorimeter 425 to facilitate its proper use. As previously discussed, the test results from each colorimeter is sequentially passed into the programmer portion of analyzer 20 for coordination with the stored data of the sample being tested for an appropriate readout of each test result with the identification number for that sample.

Tray Ejection Mechanism

Figure 34:
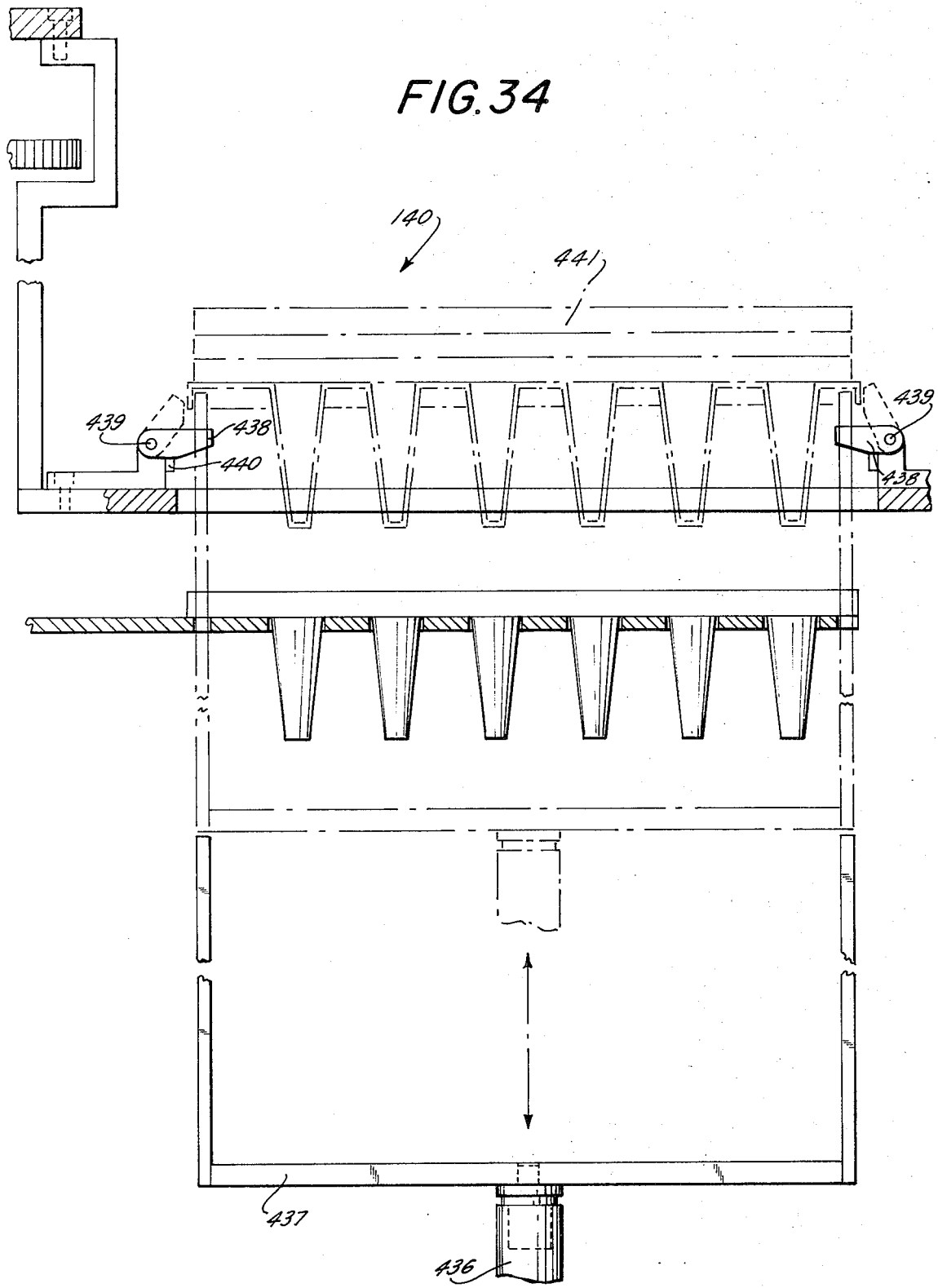
FIG. 34 is a fragmentary partially sectional side elevation view of the tray ejection portion of the automatic clinical analyzer.

The tray ejection mechanism 140 is best shown in FIG. 34 of the drawings. After the fluid has been withdrawn from all of the reaction wells in the tray by the colorimetry testing apparatus, the tray is then indexed to a tray eject station where drive means 436 which is interconnected with the drive means for the colorimeter arm 421 drives a U-shaped fork lift 437 upward through appropriate openings in the turntable to engage with the outward extending portions of the used tray. The fork lift 437 continues upward until the tray is stacked as the lowest tray in a stack of trays. This is accomplished by moving the used tray upward until it by-passes a pair of hinged gates 438. Gates 438 are pivotal about a pin 439 so that they may move upward and away from the path of travel of the tray. When the work lift is lowered, gravity will return gates 438 to their normal horizontal position where the lower surface thereof will rest on shoulder 440. The stack of trays will drop into contact with the upper surface of gates 438 and will be held in that position above the turntable and out of the way of travel of the turntable as the analyzer proceeds on. Thereafter, when the stack has reached a predetermined height, it may be removed from engagement with the upper surface of gates 438 and disposed of. The stack 441 is thus bottom loaded to increase in height until removal thereof is desirable. The fork lift will naturally be reciprocally lowered to its rest position below the turntable and in a position which will not interfere by normal indexing rotation of the turntable during operation of the analyzer.

Operation of the OCR

Figure 35:
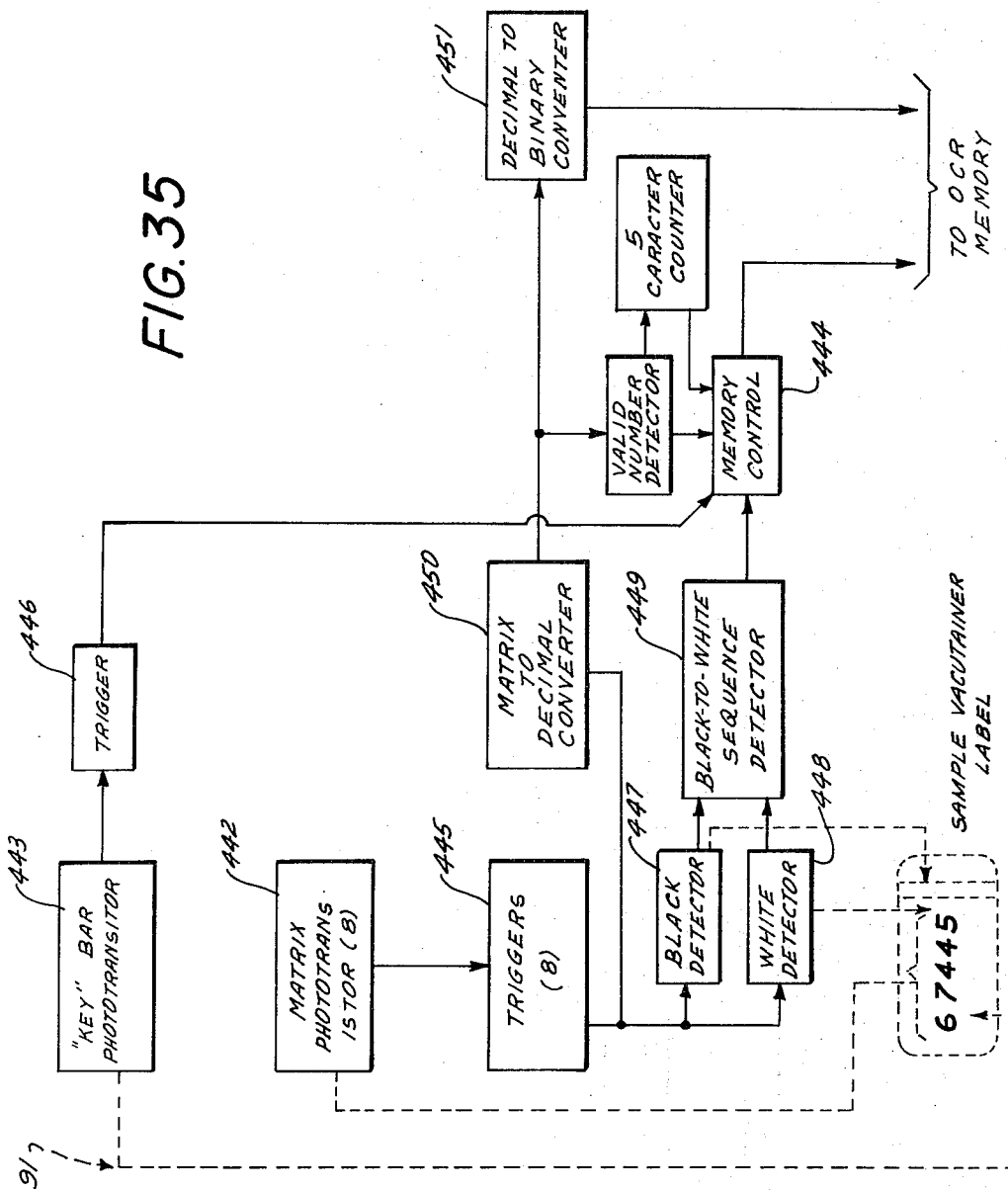
FIG. 35 is a sequential block diagram of the digital display and programmer system portion of the automatic clinical analyzer.

The optical character recognition system identified by the reference numeral 91 in FIG. 2 is shown in greater detail in FIG. 35. The system includes a matrix which is basically a printed circuit board with a number of phototransistors. In the depicted embodiment there are nine photo transistors. The photo transistors are arranged in such a fashion that they look at significant portions of numerals for the purpose of detecting light and dark areas. There is a matrix of eight photo transistors 442 for the light and dark detection and a key transistor 443 in connection with the memory control 444 of the system. The photo transistor signal is discriminated by a corresponding trigger circuit for each photo transistor which amplifies the signal and gives a usable digital output. The eight triggers 445 are connected to eight matrix photo transistors 442 and an additional trigger circuit 446 is connected in line with the key bar photo transistor 443. The trigger circuits 445 are connected to both the black detector 447 and the white detector 448 which in turn are connected to the black and white sequence detector 449 which feeds the memory control 444. The matrix detection is transmitted to the matrix to decimal convertor 450 where the decimal result in transmitted to the decimal to binary convertor 451 with the resultant binary signal being transmitted to the OCR memory for future use.

As previously stated, the trigger circuit output is transmitted to the matrix to decimal convertor or character synthesizer 450. The output of convertor 450 will have a true logic output depending upon the numerical character. All matrix points are looked at and the right true and false voltage condition is selected to provide an output representing the appropriate character. This signal is then passed to decimal to binary convertor 451 for ultimate transmittal to the memory structure. Only a single number is decoded at a time and therefore each specific number must be stored until the entire five or six digit reference is collected. A timing sequence is employed to detect when the first number of the series is being collected. Initially, all of the triggered outputs of the eight transistors on the matrix are scanned. The matrix is designed to distinguish between white and black and the trigger mechanisms are appropriately responsive. As the indicia bearing medium is rotated, initially white is the only color encountered and the matrix responds appropriately. In order to assist the actual triggering of the reading mechanism by the matrix, a black square is positioned on the indicia bearing medium before the sequence of numbers. When this black square is brought into contact with the reading matrix, a latch or flip lock is actuated to start the reading cycle. Then the matrix sees all white after the black square and a second flip lock is actuated which in effect says that it is now permissible to read the numbers. Thereafter the first number is encountered and goes through the above discussed matrix process to ultimate binary conversion and storage. The reading of the numerals is in a conventional manner and stored in sequence. A choice of numerals for any particular system is a matter of preference.

Once all of the numbers on a particular indicia bearing medium are in storage the results are transmitted to the further storage area in the programmer. From there it can be later retrieved for use with the test results for the particular sample. The OCR system can then be utilized to repeat for each individual sample container having indicia bearing medium thereon as previously discussed.

Colorimeter Circuitry

Figure 36:
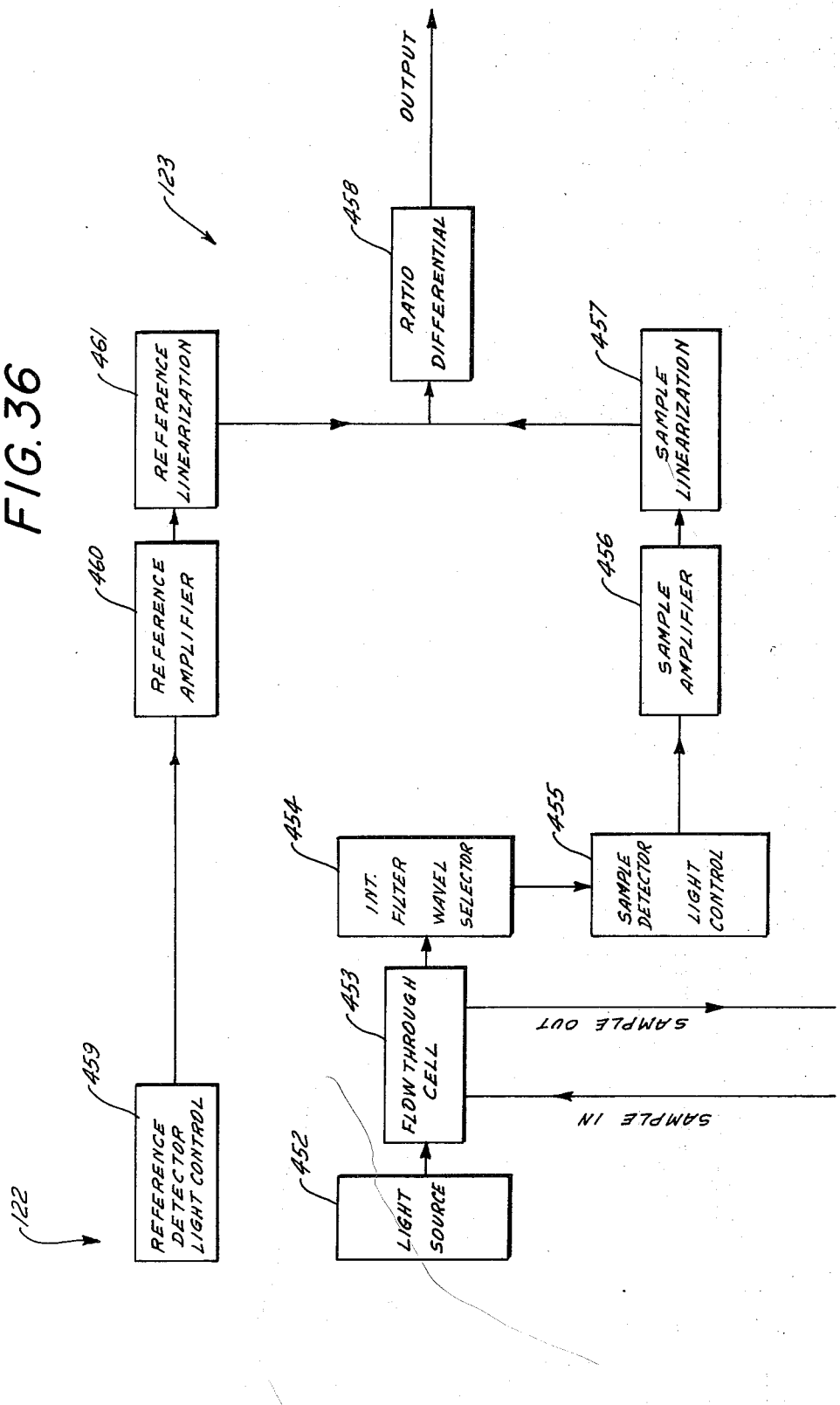
FIG. 36 is a display format for the optical character read-out portion of the automatic clinical analyzer.
Figure 37:
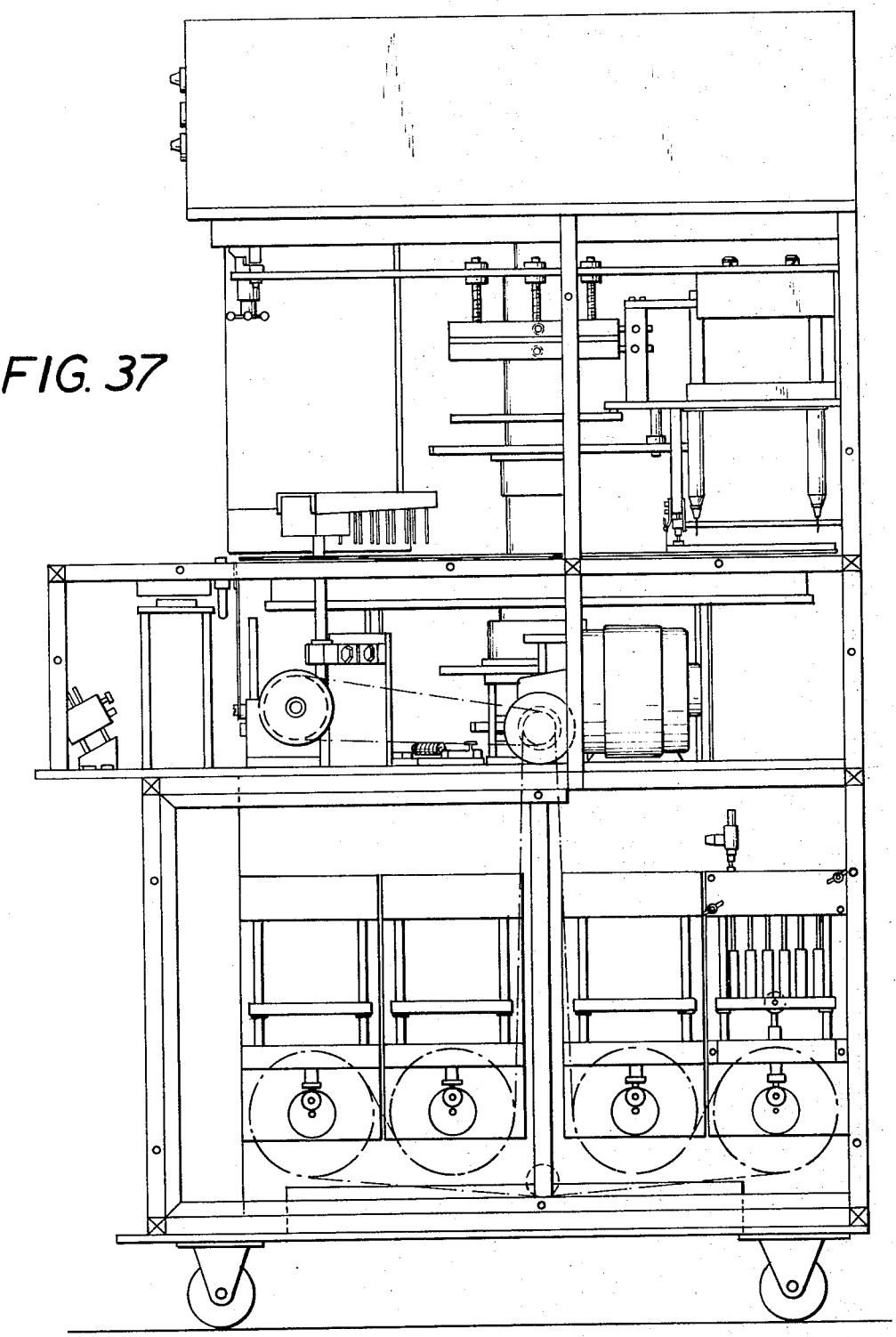
FIG. 37 is a side elevation view of the analyzer with the side removed.

A conventional type of colorimeter is employed with the system to anlyze the samples and obtain test data. FIG. 36 shows an example of the circuitry for each individual sample as it is collected. The actual flow cell 122 circuitry is shown on the left side of FIG. 36 and the final colorimeter circuits 123 are shown on the right side of FIG. 36 to the resultant output. The information on the circuitry is shown on the left side of FIG. 36 and the final colorimeter circuits 123 are shown on the right side of FIG. 36 to the resultant output. The information and circutry travels from left to right in FIG. 36. The flow cell itself includes a light source 452 directed onto a flow through cell 453 for the sample. The arrow shows the direction of flow of the fluid sample from the reaction well as it passes through flow through cell 453. An appropriate filter 454 for the proper wave length is selected to correctly assure that the light reading for a particular test is passed to the sample detector 455. The detected signal is passed to amplifier 456 for amplification purposes and is then transmitted to a sample linearization station 457 from where it is fed into a ratio differential detector 458. At station 458 the ratio between the signal from detector 455 in comparison to a reference signal is determined to provide the resultant reading. For this purpose, a reference detector light control 459 is employed to provide a signal which is amplified by reference amplifier 460 from where it is passed to a reference linearization station 461 which is connected to the ratio differential station 458 to get the ultimate reading of the colorimeter for a particular test.

Thus, the above discussed objectives of the invention, are effectively attained.

What is claimed is:

1. A completely automated clinical analyzer for automatically transporting an identifiable sample of fluid to be tested to a distribution point where the sample is aliquoted to a series of reaction locations for conducting a series of desired tests in the same sample and accumulating the results of the tests and coordinating the test results with the identifiable sample without the use of manual operations in the operational sequence comprising:

means for conveying at least one identifiable sample tube to a pick-up station;

means for conveying said tube from the pick-up station to an identification station;

means for providing a plurality of reaction cups adjacent to the pick-up station;

means for transferring predetermined aliquots of the sample into the reaction cups;

means for dispensing diluent into the reaction cups and for mixing said diluent and said aliquots therein;

means for dispensing a predetermined number of reagents into predetermined reaction cups and for mixing said reagents and the aliquots in the respective reaction cups;

means for retaining said mixture of aliquots and reagents in the respective reaction cups for a predetermined incubation period;

identifying and storage means for identifying said tube at said identification station and for storing the identification information;

pump means to remove the mixture from said reaction cups sequentially after the desired incubation time;

testing means connected to said pick-up means to receive and test the mixture from the reaction cups;

read-out means responsive to the test results from said testing means to cooperate with said storage means in coordinating said identified tube with the appropriate test results therefor and to transmit the resultant data for read-out;

time drive means on said analyzer interconnected with said conveying means, said reaction cup providing means, said transferring means, said diluent dispensing and mixing means, said reagent dispensing and mixing means, said retaining means, said identifying and storage means, said pump means, said testing means, and said read-out means to provide synchronized interaction therebetween thereby permitting automatic handling and testing of an identifiable sample of fluid by said analyzer;

means for automatically analyzing a plurality of samples in successive sequence at predetermined intervals of time;

heating means on the analyzer for cooperation with the retaining means to assist in incubating the mixture for the desired period of time;

the reaction cup providing means including a tray dispenser to automatically dispense a tray containing a desired number of reaction cups therein into position to be brought by said analyzer adjacent to said pick-up station to receive the aliquots of fluid;

the transferring means including a fluid pick-up head having a removable disposable tip on the fluid contacting end thereof, tip providing means adjacent to the pick-up head positioned so that the head engages and retains a tip prior to and during the transferring of the predetermined aliquots into said reaction cups;

tip eject means on the analyzer and associated with the pick-up head to remove the tip from the pick-up head after the aliquots of fluid have been transferred to the reaction cups; and ejection means on the analyzer for removing the tray from the analyzer after the mixture contained therein has been transferred to the testing means.

2. The invention in accordance with Claim 1 wherein said conveying means includes an endless belt, individual holding means on said belt for a tube containing a fluid sample, said belt being directed into position for transferring fluid from said sample container into the reaction cups and positioned so as to permit the sample container to thereafter be carried to the identification station, said conveying means being in timed sequence with the remaining portion of said analyzer controlled by said timed drive means.

3. The invention in accordance with Claim 1 wherein said means for dispensing a predetermined number of reagents into predetermined reaction cups includes a plurality of radial arms of predetermined spaced intervals, the arms being arranged above a rotatable turntable, means on each of said arms for removably mounting a container of reagent, means mounted on said arm in communication with the reagent container to dispense a predetermined amount of reagent from the container into a reaction well at a predetermined time.

4. The invention in accordance with Claim 1 wherein said identifying and storage means includes means for rotating the fluid sample container having indicia contained thereon, scanning the container with a matrix of photo transistors as the container is rotated to detect data contained thereon, a first converter means connected to said matrix of photo transistors to convert the information detected by the matrix of photo transistors to a decimal equivalent, a second conversion means connected to the first conversion means to convert the decimal equivalent into a binary equivalent, transfer means to transfer the binary equivalent to an optical character read-out memory center.

5. The invention in accordance with Claim 1 wherein said means for transferring predetermined aliquots of sample into the reaction cups includes a radial arm extending above a rotating turntable containing the reaction cups, the radial arm being stationary and having its distal end extending above a fluid sample container holding station, means for vertically reciprocating a serum pick-up means into and out of a sample container at the sample container holding station to store a predetermined amount of fluid in the sample dispensing arm, means to horizontally translate the portion of said serum dispensing arm radially with respect to said turntable to sequentially bring the storage portion of said serum dispensing arm above each of a plurality of reaction cups, means associated with said serum dispensing arm for dispensing a predetermined amount of fluid from the storage portion of said serum dispensing arm into each of the plurality of reaction cups in sequence, and means to return said storage portion of the serum dispensing arm into position at the fluid sample holding station after all of the stored fluid has been dispensed.

6. A method for automatically transporting an identifiable sample of fluid to be tested to a distribution point where the sample is aliquoted into a series of reaction locations for conducting a series of desired tests in the same sample and accumulating the results of the tests and coordinating the test results with an identifiable sample as part of an automatic clinical analyzer comprising:

conveying at least one identifiable sample tube to a pick-up station;

conveying said tube from the pick-up station to an identification station;

providing a plurality of reaction cups within a tray adjacent to the pick-up station;

transferring predetermined aliquots of the sample into a disposable tip and from the disposable tip into the reaction cups and thereafter disposing of the tip and providing a new tip and a new tray for use with a further sample;

dispensing diluent into the reaction cups and mixing said diluent and said aliquots therein;

dispensing a predetermined number of reagents into predetermined reaction cups and mixing said reagent and the aliquots in the respective reaction cups;

retaining said mixture of aliquots and reagents in the respective reaction cups for a predetermined incubation period;

identifying said tube at said identification station and storing the identical information automatically;

removing the mixture from said reaction cups sequentially after the desired incubation time;

disposing of the tray containing the reaction cups after the mixture has been removed therefrom;

receiving and testing the mixture removed from the reaction cups;

coordinating the test results with the appropriate identified tube and transmitting the resultant data for readout; and performing the above steps in a synchronized and automatic manner thereby permitting automatic handling and testing of an identifiable sample of fluid by said analyzer.

7. An automatic tray dispenser for use with an automatic clinical analyzer for use in dispensing a tray of reaction wells to said automatic clinical analyzer upon demand comprising:

at least one horizontally reciprocal first cam surface normally positioned to hold a plurality of vertically stacked trays in a predetermined location with respect to an automatic clinical analyzer;

said cam surface being adapted to be automatically horizontally shifted into disengagement with said plurality of vertically stacked trays;

at least one second horizontally reciprocal cam surface associated with each said first cam surface and normally positioned adjacent to and disengaged from said plurality of stacked trays;

said second horizontally reciprocal cam surface being adapted to be automatically shifted horizontally into engagement with the plurality of vertically stacked trays above the lowest tray;

each cam surface being mounted on a vertical shaft, each cam surface having a diagonal slot therethrough, a lateral pin extending from the vertical shaft into the diagonal slot so that when the shaft is vertically reciprocated the pin will slide in the diagonal slot and horizontal reciprocate the cam surface, and the diagonal slot in one cam surface being opposed to the slot in the other cam surface so that reciprocal movement of the vertical shaft will cause simultaneous opposing horizontal reciprocal movement of the cam surfaces;

automatic shifting means on said tray dispenser responsive to the automatic clinical analyzer so that when said shifting means is activated in response to said automatic clinical analyzer said first and second cam surfaces will be shifted from their normal position thereby releasing the lowest tray in said plurality of vertically stacked trays while retaining the remainder of said trays in vertically stacked position with the released tray being directed to said automatic clinical analyzer for use;

return means on said tray dispenser to return said shifting means to the deactivated position and thereby returning said first and second cam surfaces to the normal position; and a pair of opposing first cam surfaces, a pair of opposing second cam surfaces, a pair of opposing shifting means, and a pair of opposing return means on the tray dispenser being in synchronous relationship on opposing sides of said vertically stacked plurality of trays.

8. Serum dispensing apparatus for use with an automatic clinical analyzer in automatically transferring a volume of serum from a container into a plurality of reaction wells in the analyzer in predetermined aliquot amounts comprising:

drive means adapted to be connected to the analyzer and being responsive to a predetermined signal therefrom to drive said serum dispenser;

serum tip supply means associated with said dispenser for supplying a disposable serum tip of predetermined volume to the dispenser;

a vertically reciprocal dispenser arm connected to said drive means and adapted to be mounted on the analyzer;

a dispenser head on said dispenser arm and adapted to be translated with respect to said arm and to hold the disposable tip thereon;

a plurality of spaced cam surfaces on said arm adapted to be brought into communication with said dispenser head at predetermined intervals during translation thereof;

means on said dispenser head responsive to said cam surfaces to dispense a predetermined aliquot of serum from the disposable tip on said dispenser head;

suction means connected to said dispenser to draw a predetermined amount of serum into the disposable tip on said dispenser head when activated;

eject means on said dispenser for removing a serum tip from the dispenser when serum has been aliquoted from the dispenser tip in a predetermined fashion;

control means associated with said serum dispenser to activate said dispenser arm and dispenser head to mount a serum tip on said dispenser, collect a predetermined amount of serum in said tip, dispense desired aliquots of serum into a plurality of reaction wells and eject the tip from said dispenser thereafter in a predetermined manner;

a radial arm adapted to be mounted above a rotating turntable on the analyzer with reaction cups contained on the turntable;

the radial arm being stationary and having its distal end adapted to be positioned above a fluid sample container holding station;

means for vertically reciprocating the dispenser arm into and out of a sample container to store a predetermined amount of fluid in the disposable tip on the dispenser arm;

means to horizontally translate the portion of the dispenser arm containing the disposable tip radially with respect to the turntable of the analyzer to sequentially bring the tip above each of a plurality of reaction cups; and means to return the dispenser head into its original position after the proper aliquots of fluid have been dispensed.

9. An optical character recognition system adapted to be used with an automatic clinical analyzer for identifying and storing information contained in indicia located on a fluid sample container comprising:

means for rotating the fluid sample container having indicia contained thereon;

scanning the container with a matrix of photo transistors as the container is rotated to detect data contained thereon;

trigger means responsive to a signal on the rotating container which is detected by the matrix of photo transistors to initiate detection of the necessary data on the rotating container for identification purposes;

a first converter means connected to said matrix of photo transistors to convert the information detected by the matrix of photo transistors to a decimal equivalent;

a second conversion means connected to the first conversion means to convert the decimal equivalent into a binary equivalent; and transfer means to transfer the binary equivalent to an optical character read-out memory center.

10. A reagent dispenser for use with an automatic clinical analyzer as means for dispensing a predetermined number of reagents into predetermined reaction cups on said analyzer:

at least one radial arm adapted to be mounted above a turntable on said analyzer;

means on said arm for removably mounting a disposable container of reagent;

means mounted on said arm in communication with the reagent container to dispense a predetermined amount of reagent from the container into a reaction well at a predetermined time; and the dispensing means for dispensing the predetermined amount of reagent includes a lead screw and clutch arrangement whereby advancement of the lead screw provides highly controlled micrometer-like accuracy in the amount of reagent dispensed at a predetermined point in time.

11. Tray ejection means adapted to be associated with an automatic clinical analyzer for removing a tray of used reaction wells from said analyzer after the tray has been utilized:

the tray containing flanges thereon for grasping and removal thereof after use;

a vertically reciprocal fork adapted to be mounted beneath an automatic clinical analyzer and positioned so that a used tray in said analyzer comes into alignment therewith;

drive means responsive to said analyzer to drive said fork upward into engagement with the flanged edges of said tray and move said tray vertically upward out of engagement with said analyzer;

retention means positioned above said fork to receive said removed tray and retain said tray in position above said analyzer when said drive means returns said fork to the initial position beneath said analyzer turntable; and access means to said retention means to permit grasping and removal of the trays held thereon when desired.

References Cited

UNITED STATES PATENTS

| Number | Date | Name | Class |
|---|---|---|---|
| 3,476,515 | 11/1969 | Johnson et al. | 23—253 X |
| 3,532,470 | 10/1970 | Rochte | 23—253 |
| 3,533,744 | 10/1970 | Unger | 23—259 X |
| 3,540,858 | 11/1970 | Rochte et al. | 23—253 X |
| 3,565,582 | 2/1971 | Young | 23—253 X |
| 3,578,412 | 5/1971 | Martin | 23—253 X |
| 3,617,222 | 11/1971 | Matte | 23—253 X |
| 3,622,279 | 11/1971 | Moran | 23—259 X |

RONALD E. SERWIN, Primary Examiner

U.S. Cl. X.R.

23—253 R, 259; 141—130; 73—425.6; 235—151.35

UNITED STATES PATENT OFFICE
CERTIFICATE OF CORRECTION

PATENT NO. : 3,832,135
DATED : August 27, 1974
INVENTOR(S) : R. J. Drozdowski et al It is certified that error appears in the above-identified patent and that said Letters Patent are hereby corrected as shown below:

Col. 3, line 14, "same" should be --sample--.

Col. 3, line 29, "automatic" should be --automated--.

Col. 3, line 41, after "stored" --identification information and coordinate it with the-- has been omitted and should be added.

Col. 7, line 8, after "amount" --of-- has been omitted.

Col. 18, line 7, after "amount", "shown, ratchet surface 298 is located on the drawal of plunger 293 by means of motor 291" should read --of serum is predetermined by the amount of withdrawal of plunger 293 by means of motor 291--.

Col. 18, line 58, "at is" should be --at this--.

Col. 19, lines 37 & 38 "provinding" should be --providing--.

Col. 22, line 54, "position" should be --positioned--.

Col. 24, line 11, "effectivelf" should be --effectively--.

Col. 30, line 19, Claim 6, "identical" should be --identification--

Signed and Sealed this twenty-sixth Day of August 1975

[SEAL]

Attest:

RUTH C. MASON
Attesting Officer

C. MARSHALL DANN
Commissioner of Patents and Trademarks